(12) United States Patent
Vorbach et al.

(10) Patent No.: US 10,908,914 B2
(45) Date of Patent: Feb. 2, 2021

(54) ISSUING INSTRUCTIONS TO MULTIPLE EXECUTION UNITS

(71) Applicant: Hyperion Core, Inc., Los Gatos, CA (US)

(72) Inventors: Martin Vorbach, Lingenfeld (DE); Frank May, Munich (DE); Markus Weinhardt, Osnabrueck (DE)

(73) Assignee: Hyperion Core, Inc., Los Gatos, CA (US)

( * ) Notice: Subject to any disclaimer, the term of this patent is extended or adjusted under 35 U.S.C. 154(b) by 0 days.

(21) Appl. No.: 16/560,895

(22) Filed: Sep. 4, 2019

(65) Prior Publication Data

US 2020/0241879 A1 Jul. 30, 2020

Related U.S. Application Data

(63) Continuation of application No. 15/891,094, filed on Feb. 7, 2018, now Pat. No. 10,409,608, which is a (Continued)

(30) Foreign Application Priority Data

Oct. 15, 2008 (EP) .................................... 08018039
Nov. 4, 2008 (EP) .................................... 08019266
(Continued)

(51) Int. Cl.
*G06F 9/38* (2018.01)
*G06F 8/41* (2018.01)
*G06F 9/30* (2018.01)

(52) U.S. Cl.
CPC ............ *G06F 9/3836* (2013.01); *G06F 8/443* (2013.01); *G06F 9/3001* (2013.01);
(Continued)

(58) Field of Classification Search
None
See application file for complete search history.

(56) References Cited

U.S. PATENT DOCUMENTS 4,608,631 A * 8/1986 Stiffler .................... G06F 13/28
710/113
5,019,968 A  5/1991 Wang et al.
(Continued)

FOREIGN PATENT DOCUMENTS

EP         1061439         12/2000
EP         99304659.8      12/2000
(Continued)

OTHER PUBLICATIONS

EPO, European Search Report received for EP Application No. 15187352.8, dated Feb. 11, 2016, 15 pages.
(Continued)

*Primary Examiner* — Eric Coleman
(74) *Attorney, Agent, or Firm* — IP Spring

(57) ABSTRACT

A single chip sequential processor comprising at least one ALU-Block, where said sequential processor is capable of maintaining its op-codes while processing data such as to overcome the necessity of requiring a new instruction in every clock cycle.

12 Claims, 34 Drawing Sheets

Related U.S. Application Data continuation of application No. 14/830,704, filed on Aug. 19, 2015, now Pat. No. 9,898,297, which is a continuation of application No. 13/123,527, filed as application No. PCT/EP2009/007415 on Oct. 15, 2009, now Pat. No. 9,152,427.

(30) Foreign Application Priority Data

| Nov. 19, 2008 | (EP) | ................................... | 08020167 |
|---|---|---|---|
| Jan. 15, 2009 | (EP) | ................................... | 09000492 |
| Mar. 16, 2009 | (EP) | ................................... | 09003744 |
| Jul. 7, 2009 | (EP) | ................................... | 09008859 |

(52) U.S. Cl.
CPC ........ *G06F 9/3012* (2013.01); *G06F 9/30065* (2013.01); *G06F 9/30123* (2013.01); *G06F 9/30134* (2013.01); *G06F 9/30189* (2013.01); *G06F 9/381* (2013.01); *G06F 9/3859* (2013.01); *G06F 9/3867* (2013.01); *G06F 9/3885* (2013.01); *G06F 9/3887* (2013.01); *G06F 9/3889* (2013.01); *G06F 9/30043* (2013.01)

(56) References Cited

U.S. PATENT DOCUMENTS

| 5,086,500 | A |   | 2/1992 | Greub |   |
|---|---|---|---|---|---|
| 5,123,108 | A |   | 6/1992 | Olson et al. |   |
| 5,243,698 | A |   | 9/1993 | May |   |
| 5,317,726 | A | * | 5/1994 | Horst | G06F 11/0724 714/12 |
| 5,369,737 | A |   | 11/1994 | Gholizadeh et al. |   |
| 5,381,533 | A |   | 1/1995 | Peley et al. |   |
| 5,682,491 | A |   | 10/1997 | Pechanek et al. |   |
| 5,699,537 | A |   | 12/1997 | Sharangpani et al. |   |
| 5,752,070 | A | * | 5/1998 | Martin | G06F 7/5052 712/33 |
| 5,764,946 | A | * | 6/1998 | Tran | G06F 9/3844 711/118 |
| 5,832,288 | A |   | 11/1998 | Wong |   |
| 5,870,619 | A | * | 2/1999 | Wilkinson | G06F 15/8007 712/20 |
| 5,887,129 | A |   | 3/1999 | Day et al. |   |
| 6,023,757 | A |   | 2/2000 | Nishimoto et al. |   |
| 6,096,091 | A |   | 8/2000 | Hartmann |   |
| 6,148,395 | A |   | 11/2000 | Dao et al. |   |
| 6,397,324 | B1 | * | 5/2002 | Barry | G06F 9/3004 711/149 |
| 6,629,264 | B1 |   | 9/2003 | Sicola et al. |   |
| 6,725,334 | B2 |   | 4/2004 | Barroso et al. |   |
| 7,046,685 | B1 |   | 5/2006 | Matsuoka et al. |   |
| 7,141,727 | B1 |   | 11/2006 | Appenzeller et al. |   |
| 7,146,486 | B1 |   | 12/2006 | Prokopenko et al. |   |
| 7,171,535 | B2 |   | 1/2007 | Naoi |   |
| 7,415,700 | B2 |   | 8/2008 | Pomaranski et al. |   |
| 7,428,138 | B2 |   | 9/2008 | Mosley et al. |   |
| 7,617,383 | B2 | * | 11/2009 | Moore | G06F 7/785 712/202 |
| 7,856,246 | B2 |   | 12/2010 | Forsell |   |
| 9,183,662 | B1 |   | 11/2015 | Sams et al. |   |
| 2002/0019926 | A1 | * | 2/2002 | Huppenthal | G06F 15/7867 712/15 |
| 2003/0070059 | A1 |   | 4/2003 | Dally et al. |   |
| 2003/0172248 | A1 |   | 9/2003 | Streltsov |   |
| 2004/0017700 | A1 |   | 1/2004 | Demone |   |
| 2004/0250023 | A1 |   | 12/2004 | Urabe et al. |   |
| 2005/0050303 | A1 |   | 3/2005 | Rosner et al. |   |
| 2005/0066056 | A1 | * | 3/2005 | Dominic | H04L 69/16 709/245 |
| 2005/0240930 | A1 |   | 10/2005 | Amamiya et al. |   |
| 2005/0278720 | A1 | * | 12/2005 | Wybenga | G06F 9/30123 718/100 |
| 2006/0095720 | A1 |   | 5/2006 | Biles et al. |   |
| 2006/0176756 | A1 |   | 8/2006 | Davis et al. |   |
| 2007/0079303 | A1 |   | 4/2007 | Du et al. |   |
| 2007/0138623 | A1 |   | 6/2007 | Maveety et al. |   |
| 2007/0194807 | A1 |   | 8/2007 | Reblewski et al. |   |
| 2007/0239971 | A1 |   | 10/2007 | Gupte et al. |   |
| 2008/0016327 | A1 |   | 1/2008 | Menon et al. |   |
| 2008/0095695 | A1 |   | 4/2008 | Shanov et al. |   |
| 2009/0006821 | A1 |   | 1/2009 | Mera et al. |   |
| 2009/0031104 | A1 |   | 1/2009 | Vorbach et al. |   |
| 2009/0113178 | A1 |   | 4/2009 | Kim et al. |   |
| 2009/0146690 | A1 |   | 6/2009 | Vorbach et al. |   |
| 2009/0228688 | A1 |   | 9/2009 | Ingle et al. |   |
| 2010/0049947 | A1 |   | 2/2010 | Chang et al. |   |
| 2010/0131577 | A1 |   | 5/2010 | Gangalakurti et al. |   |
| 2010/0287342 | A1 |   | 11/2010 | Greenberg et al. |   |

FOREIGN PATENT DOCUMENTS

| WO |   | 2004/114128 | 12/2004 |
|---|---|---|---|
| WO | PCT/IB2004/050964 |   | 12/2004 |
| WO |   | 2006/082091 | 8/2006 |
| WO | PCT/EP2006/001014 |   | 8/2006 |
| WO |   | 2010/142432 | 2/2010 |
| WO |   | 2010/043401 | 4/2010 |
| WO |   | 2011/079942 | 7/2011 |
| WO |   | 2012/003997 | 1/2012 |
| WO |   | 2012/167933 | 12/2012 |

OTHER PUBLICATIONS

"ARM Architecture Reference Manual", Copyright 1996-1998, 2000, 2004, 2005; ARM Limited, 2005, 1138 pages.
"Classic RISC Pipeline", Wikipedia, https://en.wikipedia.org/wiki/Classic_RISC_Pipeline, XP55373206, Nov. 15, 2011, 8 pages.
"IEEE Standard Verilog Hardware Description Language", IEEE Std. 1364-2001, Sep. 28, 2001, 879 pages.
"MacahC Compiling to Micro-Parallel Architectures", Department of Computer Science and Engineering, University of Washington, Jun. 7, 2006, 2 pages.
"Multicore-Programmierung: CUDA RapidMind", Feb. 4, 2009.
"Nvidia G80 Architecture and CUDA Programming", Course CDA 6938, University of Central Florida, 2011, 27 pages.
"NVIDIA Quick Review", NVIDIA Programming Guide.
"Place and Route for//Coarse-Grained Reconfigurable Architectures", SPR. Schedule. Department of Computer Science and Engineering University of Washington.
"SPR: Schedule, Place and Route for // Coarse-Grained Reconfigurable Architectures", UW Embedded Research Group, Department of Computer Science and Engineering, University of Washington, Jun. 7, 2006, 2 pages.
Agarwal, et al., "Clock rate versus IPC: The end of the road for conventional microarchitectures", vol. 28. No. 2. ACM, 2000, 12 pages.
Aho, et al., "Compliers: Principles, Techniques, & Tools; Second Edition", ISBN: 0-321-48681-1, 2007, 1038 pages.
Balise, , "Overview of Nvidia GeForce 6 Series Architecture and More", University of Texas at El Paso, 2008, 19 pages.
Becker, et al., "Scalable Processor Instruction Set Extension", IEEE Design & Test of Computers, IEEE Service Enter, New York, NY, US, vol. 22, No. 2, Feb. 1, 2005, pp. 136-148.
Bouwens, et al., "Architectural Exploration of the ADRES Coarse-Grained Reconfigurable Array", Reconfigurable Computing: Architectures, Tools and Applications; [Lecture Notes in Computer Science; LNCS], Springer, Berlin, Heidelberg, Mar. 27, 2007, pp. 1-13.
Bouwens, et al., "Architectural Exploration of the ADRES Coarse-Grained Reconfigurable Array", Reconfigurable Computing: Architectures, Tools, and Applications; Springer, Berlin Heidelberg, Mar. 27, 2007, pp. 1-13.
Buchty, , "Multicore-Programmierung; CUDA, RapidMind", Vorlesung HPR, Feb. 4, 2007, 38 pages.

(56) References Cited

OTHER PUBLICATIONS

Burger "Scaling to the End of Silicon with EDGE Architectures", IEEE Computer Society, Jul. 2004, pp. 44-55.
Carroll, et al., "Designing a Coarse-grained Reconfigurable Architecture for Performance and Power Efficiency", Hardware and Embedded Systems Lab, CSE 505.
Carroll, et al., "Designing a Coarse-grained Reconfigurable Architecture for Power Efficiency", Department of Energy NA-22 University Information Technical Interchange Review Meeting, 2007.
Carroll, et al., "Designing a Coarse-grained Reconfigurable Architecture for Power Efficiency", Department of Computer Science and Engineering; Department of Electrical Engineering, University of Washington, 2007, 11 pages.
Coons, et al., "A spatial path scheduling algorithm for EDGE architectures", ACM Sigplan Notices. vol. 41. No. 11. ACM, 2006, 12 pages.
Dandamudi, et al., "Fundamentals of Computer Organization and Design", ISBN 10:038795211X; ISBN: 13:978-0387952116, Sep. 22, 2002, 1066 pages.
EPO, Summons to Attend Oral Proceedings Pursuant to Rule 115(1) EPC for European Patent Application No. 12829118.4, dated Jul. 11, 2017, 6 pages.
WIPO, International Search Report and Written Opinion for International Patent Application No. PCT/IB2012/002997, dated Jul. 2, 2013, 6 pages.
Fan, et al., "Bridging the computation gap between programmable processors and hardwired accelerators", High Performance Computer Architecture. HPCA 2009. IEEE 15th International Symposium on. IEEE, 2009, 10 pages.
Franklin, et al., "A fill-unit approach to multiple instruction issue", Proceedings of the 27th annual international symposium on Microarchitecture. ACM, 1994, pp. 162-171.
Goulding-Hotta, et al., "The GreenDroid Mobile Application Processor: an Architecture for Silicon's Dark Future", University of California, San Diego; IEEE Computer Society, 2011, 10 pages.
Gratz, et al., "Implementation and evaluation of on-chip network architectures", Computer Design. ICCD 2006. International Conference on. IEEE, 2006, 8 pages.
Hrishikesh, et al., "The optimal logic depth per pipeline stage is 6 to 8 F04 inverter delays", ACM SIGARCH Computer Architecture News. vol. 30. No. 2. IEEE Computer Society, 2002, 11 pages.
Jacob, , "Cache Design for Embedded Real-Time Systems", Electrical & Computer Engineering Department; University of Maryland at College Park, 1999, 9 pages.
Jahr, et al., "The Grid ALU Processor", L'Aqula, Italy ACACES 2008 Poster Abstracts, Publisher: Academia Press, ISBN: 978903821288, 2008, 4 pages.
Jones, , "22C:116, Lecture Notes, Sep. 8, 1995", University of Iowa Department of Computer Science, Sep. 8, 1995, 4 pages.
Joram, , "Untersuchung und Vorstellung moderner Grafikchiparchitekturen", Hauptseminar Technische Informatik, Jun. 4, 2008, 18 pages.
Joram, , "Untersuchung und Vorstellung moderner Grafikparchitekturen", Hauptseminar Technische Informatik, Jun. 4, 2008.
Keckler, et al., "A wire-delay scalable microprocessor architecture for high performance systems", IEEE International Solid-State Circuits Conference (ISSCC), 2003.
Kim, et al., "An adaptive, non-uniform cache structure for wire-delay dominated on-chip caches", Acm Sigplan Notices. vol. 37. No. 10. ACM, 2002, 12 pages.
Kwok, et al., "Register File Architecture Optimization in a Coarse-Grained Reconfigurable Architecture", Field-Programmable Custom Computing Machines, 2005. FCCM 2005. 13th An Nual IEEE Symposium on Napa, CA, USA, Apr. 18-20, 2005, 119 pages.
Lee, et al., "Reconfigurable ALU array architecture with conditional execution", International Soc. Design Conference (ISOOC) [online] vol. 25., Oct. 2004, 5 pages.
Macah, , "AC-Level Programming Language for Kernel Accelerators", Department of Computer Science and Engineering, University of Washington.
Maher, et al., "Merging head and tail duplication for convergent hyperblock formation", Proceedings of the 39th Annual IEEE/ACM International Symposium on Microarchitecture. IEEE Computer Society, 2006, 12 pages.
McDonald, et al., "TRIPS processor reference manual", Computer Science Department, University of Texas at Austin, Mar. 10, 2005, 194 pages.
Mei, et al., "ADRES: An architecture with tightly coupled VLIW processor and coarse-grained reconfigurable matrix", Field Programmable Logic and Application. Springer Berlin Heidelberg, 2003, pp. 61-70.
Mei "DRESC: a retargetable compiler for coarse-grained reconfigurable architectures", IEEE 10 International Conference on Field-Programmable Technology (FPT). Proceedings (Cat. No. 02EX603), 2002, pp. 166-173.
Mosaic, , "Defining Hybrid Micro-Parallel Architectures", Department of Computer Science and Engineering, University of Washington.
Mosaic, , "Developing power efficient, coarse grained, reconfigurable architectures and tools", Department of Computer Science and Engineering, University of Washington.
Mosaic, , "Hybrid Micro-Parallel Type Architecture", Department of Computer Science and Engineering, University of Washington.
Muchnick, , "Advanced Compiler Design & Implementation", Morgan Kaufman Publishers, ISBN-13:978-1-55860-320-2, 1997.
Nagarajan, et al., "A design space evaluation of grid processor architectures", Proceedings of the 34th annual ACM/ IEEE international symposium on Microarchitecture. IEEE Computer Society, 2001, 12 pages.
Nagarajan, et al., "Static placement, dynamic issue (SPDI) scheduling for EDGE architectures", Proceedings of the 13th International Conference on Parallel Architectures and Compilation Techniques. IEEE Computer Society, 2004, 11 pages.
Nau, , "Streaming Processors", EE 663, Mar. 4, 2008, 16 pages.
Nickolls, , "Nvidia GPU Parallel Computing Architecture and CUDA Programming Model", http://www.developer. nvidia.com/CUDA, Nvidia Corporation, 2007, 12 pages.
Nickolls, et al., "Scalable Parallel Programming with CUDA", ACM Queue, Apr. 28, 2008, 10 pages.
Nickolls, et al., "Scalable Parallel Programming with CUDA view issue", Topic: GPU Computing, Apr. 28, 2008.
Ozawa, et al., "A Cascade ALU Architecture for Asynchronous Super-Scalar Processors", IEICE transactions on electronics 84.2, 2001, pp. 229-237.
PGI Insider, , 21 The PGI Accelerator Programming Model on NVIDIA GPUs Part 1, Jun. 2009.
Probell, et al., "What Choices Make a Killer Video Processor Architecture", Global Signal Processing Expo and Conference, Ultra Data Corp, 2004, 4 pages.
Sangild, , "Programming Graphic Cards for Scientific Applications", part 2 "CUDA Quick Overview, NVIDIA 12 Programming Guide".
Computer Science Department, University of Geneva http://cui.unige.ch/-chopard/GPGPU/, 2007.
Sankaralingam, et al., "Distributed microarchitectural protocols in the Trips prototype processor", Microarchitecture. MICR0-39. 39th Annual IEEE/ACM International Symposium on. IEEE, 2006, 12 pages.
Sankaralingam, et al., "Exploiting ILP, TLP, and OLP with the polymorphous TRIPS architecture", Computer Architecture. Proceedings. 30th Annual International Symposium on. IEEE, 2003, 16 pages.
Sankaralingam, et al., "Routed Inter-ALU Networks for ILP Scalability and Performance", In Proceedings of the 21st International Conference on Computer Design, Oct. 2003, pp. 170-177.
Sankaralingam, et al., "TRIPS: a Polymorphous Architecture for Exploiting ILP, TLP, and DLP", University of Texas at Austin, ACM Transactions, Mar. 2004, pp. 62-63.

(56) References Cited

OTHER PUBLICATIONS

Sankaralingam, et al., "TRIPS: A polymorphous architecture for exploiting ILP, TLP, and DLP", ACM Transactions on Architecture and Code Optimization, Vo. 1, Mar. 2004, pp. 62-93.
Sethumadhavan, et al., "Design and implementation of the TRIPS primary memory system", Computer Design. ICCD 2006. International Conference on. IEEE, 2007, 8 pages.
Smith, et al., "Compiling for EDGE architectures", Code Generation and Optimization. CGO2006. International Symposium on. IEEE, 2006, 11 pages.
Smith, et al., "Dataftow predication", Microarchitecture. MICRO-39. 39th Annual IEEE/ACM International Symposium on. IEEE, 2006, 12 pages.
Smith, et al., "TRIPS Application Binary Interface (ABI) Manual", Tech Report TR-05-22. Version A.06, Computer Science Department, University of Texas at Austin, Oct. 10, 2006, 16 pages.
Smith, et al., "TRIPS Intermediate Language (TIL) Manual", Computer Science Department, University of Texas at Austin, Oct. 2, 2006, 28 pages.
Sohm, et al., "Efficient methodology for hand-coding video algorithms for VLIW-type processors", Signal Processing. Image Communication, Elsevier Science Publishers, Amsterdam, NL, vol. 17, No. 4, Apr. 1, 2002, p. 314.
Tanenbaum "Operations Systems: Design and Implementation", Prentice Hall / Pearson International; ISBN-13: 978-0-13-505376-8, 2006.
Tanenbaum, Andrew S. , "Modern Operating Systems", ISBN 10:0136006639; ISBN 13-978-0136006633, 2008, 552 pages.
Tang, , "Practical Introduction to CUDA and GPU", Center for Theoretical Neuroscience, Oct. 9, 2009, 21 pages.
The University of Utah, "L4: Hardware Execution Model and Overview", Jan. 26, 2009, 29 pages.
Thomas, et al., "The Verilog Hardware Description Language", Kluwer Academic Publishers, Norwell, MA; ISBN: 0-7923-8166-1, 1998, 11 Pages.
Uhrig, et al., "A two-dimensional superscalar processor architecture", Future Computing, Service Computation, Cognitive, Adaptive, Content, Patterns. COMPUTATIONWORLD'09. Computation World:. IEEE, 2009, 4 pages.
University of Utah, , "L4: Hardware Execution Model and Overview", Jan. 26, 2009.
USPTO, Non-Final Office Action mailed for U.S. Appl. No. 13/123,527, 7 pages, dated Mar. 25, 2014.
USPTO, Final Office Action mailed for U.S. Appl. No. 13/123,527, 4 pages, dated Oct. 31, 2014.
USPTO, Non-Final Office Action mailed for U.S. Appl. No. 13/123,527, 7 pages, dated Feb. 3, 2015.
USPTO, Notice of Allowance mailed for U.S. Appl. No. 13/123,527, 6 pages, dated May 26, 2015.
USPTO, Final Office Action for U.S. Appl. No. 14/365,617, dated Mar. 1, 2017, 11 pages.
USPTO, Non-final Office Action for U.S. Appl. No. 14/365,617, dated Jul. 1, 2016, 12 pages.
USPTO, Non-final Office Action for U.S. Appl. No. 14/365,617, dated Jun. 28, 2017, 12 pages.
USPTO, First Action Interview, Pre-Interview Communication for U.S. Appl. No. 14/830,704, dated May 1, 2017, 12 pages.
USPTO, Final Office Action for U.S. Appl. No. 14/365,617, dated Dec. 28, 2017, 13 pages.
USPTO, First Action Interview Office Action Summary for U.S. Appl. No. 14/830,704, dated Jul. 17, 2017, 13 pages.
USPTO, Notice of Allowance for U.S. Appl. No. 14/830,704, dated Oct. 10, 2017, 6 pages.
USPTO, Non-final Office Action for U.S. Appl. No. 14/365,617, dated Aug. 23, 2018, 7 pages.
USPTO, Non-final Office Action for U.S. Appl. No. 16/283,754, dated Apr. 6, 2020, 8 pages.
USPTO, Notice of Allowance for U.S. Appl. No. 15/891,094, dated Apr. 10, 2019, 9 pages.
UW Embedded Research Group, , "Macah: a C-Level Programming Language for Kernel Accelerators", Department of Computer Science and Engineering, University of Washington, <<http://www.cs.washington.edu/research/lis/empart/macah.shtml>>, Jun. 7, 2006, 6 pages.
UW Embedded Research Group, , "MacahC: Compiling Micro-Parallel Architectures", Department of Computer Science and Engineering, University of Washington, Jun. 7, 2006.
UW Embedded Research Group, , "Mosaic: Defining Hybrid Micro-Parallel Architectures", of Computer Science and Engineering, University of Washington, Jun. 7, 2006, 3 pages.
UW Embedded Research Group, , "Mosaic: Developing power-efficient coarse-grained reconfigurable architectures and tools", Department of Computer Science and Engineering, University of Washington, Jun. 7, 2006, 3 pages.
UW Embedded Research Group, , "Mosaic: Hybrid Micro-Parallel Type Architectures", Department of Computer Science and Engineering, University of Washington, Jun. 7, 2006, 3 pages.
Van Essen, et al., "Programming Hybrid Sequential I Micro-parallel Computers", Hardware and Embedded Systems Lab, CSE 505, 2005, 23 pages.
Wasson, , "Nvidia's 'Fermi' GPU architecture revealed, GPU computing grabs center stage", http://techreport.com, Sep. 30, 2009, 1 page.
Wolfe, , "The PGI Accelerator Programming Model on NVIDIA GPU's, Part 1", PGI Group, Jun. 2009, 1 page.
Yang, et al., "Exploiting Choice in Resizable Cache Design to Optimize Deep-Submicron Processor Energy-Delay", Proceedings of the 8th International Symposium on High Performance Computer Architecture; Computer Architecture Laboratory, Carnegie Mellon University, School of Electrical and Compute Engineering, Purdue University, 2002, 11 pages.
Yeung, , "A data-driven multiprocessor architecture for high throughput digital signal processing", College of Engineering, University of California (Berkeley), 1996, 163 pages.
Yeung, et al., "TA 6.3: a 2.4 GOPS data-driven reconfigurable multiprocessor IC for DSP", Solid-Slate Circuits Conference. Digest of Technical Papers. 41st ISSCC, IEEE International, 1995, pp. 108-109 and 346.
Ylvisaker, et al., "A Type Architecture for Hybrid Micro-Parallel Computers", 14th Annual IEEE Symposium on Field-Programmable Custom Computing Machines (FCCM '06), 0-7695-2661-6/06, 2006.
Ylvisaker, et al., "A Type Architecture for Hybrid Micro-Parallel Computers", Department of Computer Science and Engineering, University of Washington, {ben8, vanessen, ebeling} @cs.washington.edu, 14th Annual IEEE Symposium on Field-Programmable Custom Computing Machines (FCCM'06), 2006, 10 pages.
Yoder, et al., "Trips Assembly Language (TASL) Manual", Technical Report TR-05-21, Computer Science Department, University of Texas at Austin, Sep. 24, 2003, 30 pages.

* cited by examiner

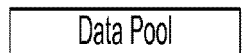
Prior Art
Fig. 1a    Fig. 1b
Fig. 1c    Fig. 1d    Fig. 1e

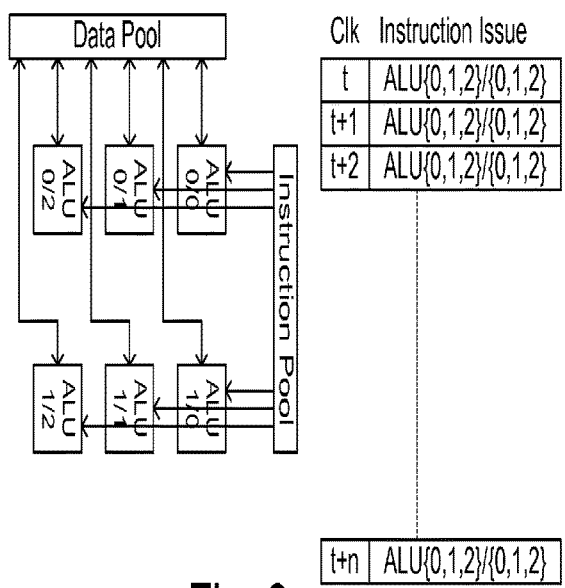
Fig. 3a
(↔ Fig. 1d)
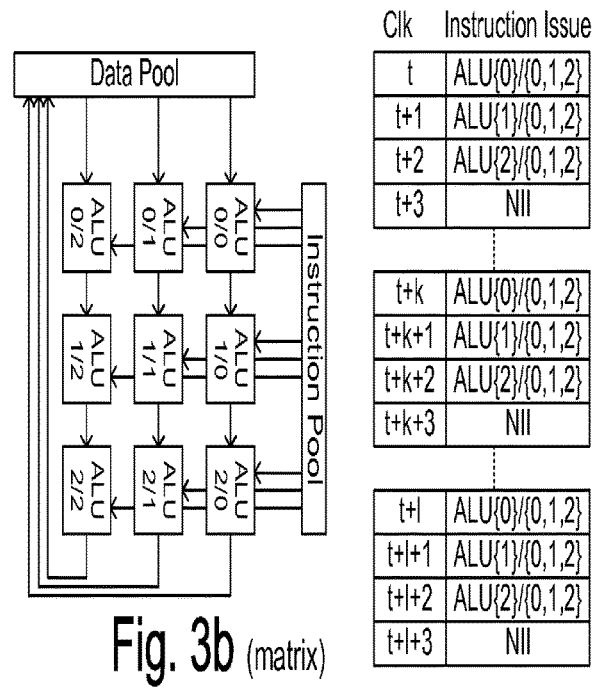
Fig. 3b (matrix)

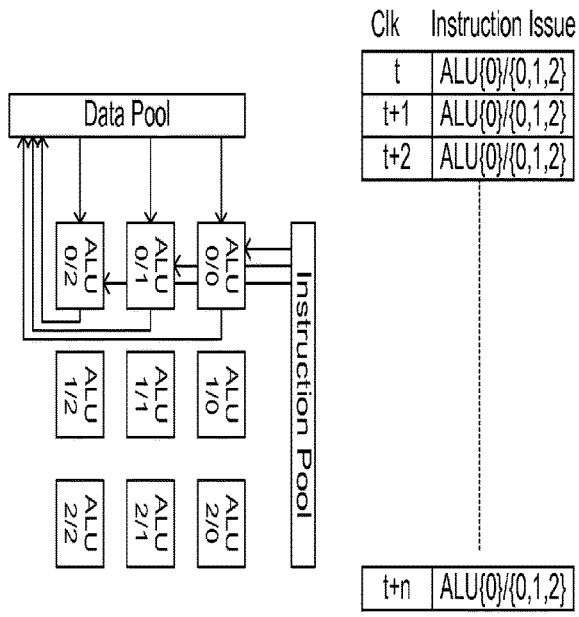
Fig. 3c (superscalar)
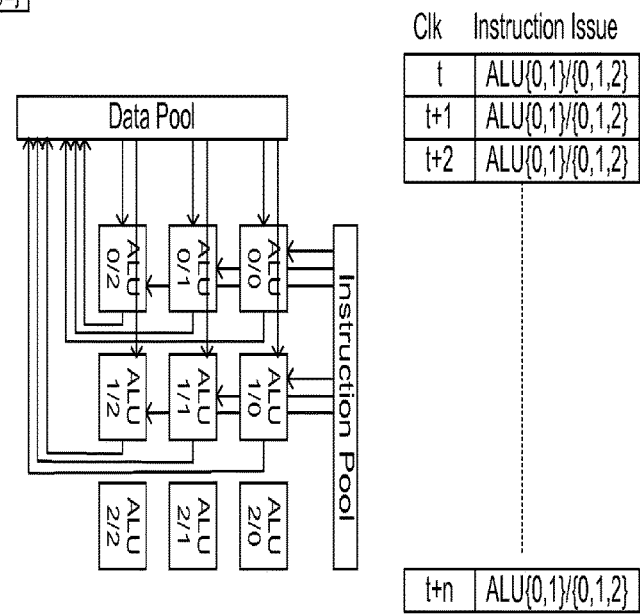
Fig. 3c1 (superscalar, extended)

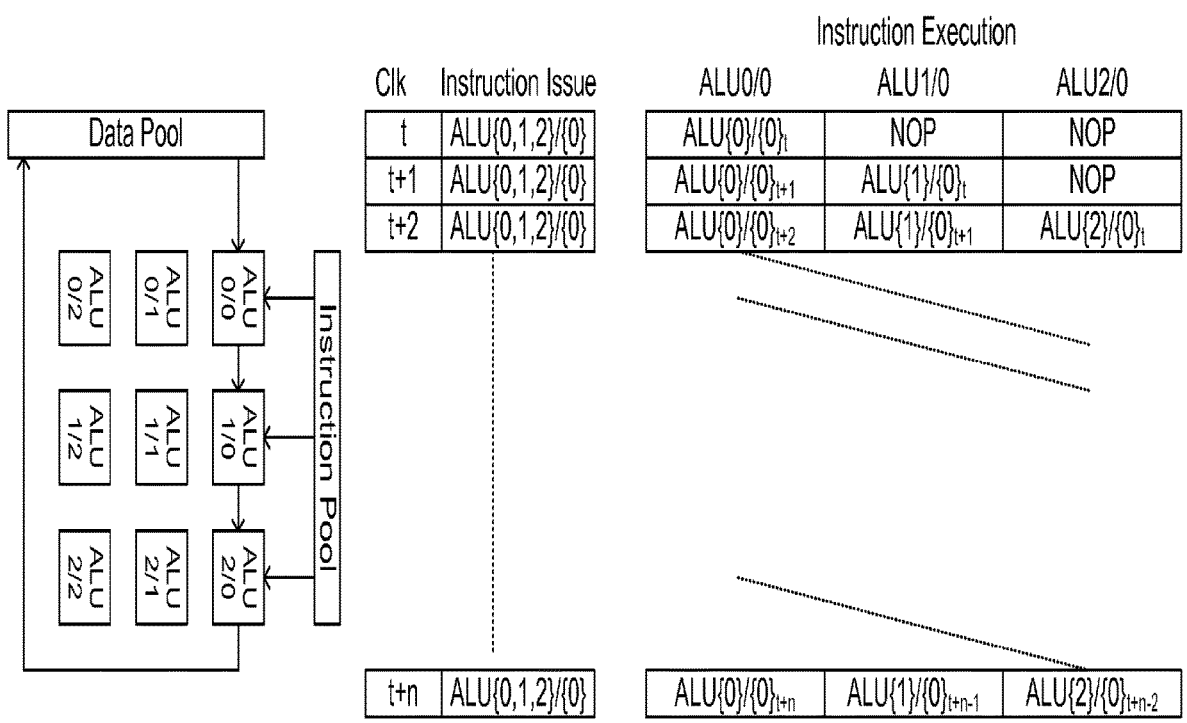
Fig. 3d (vector)

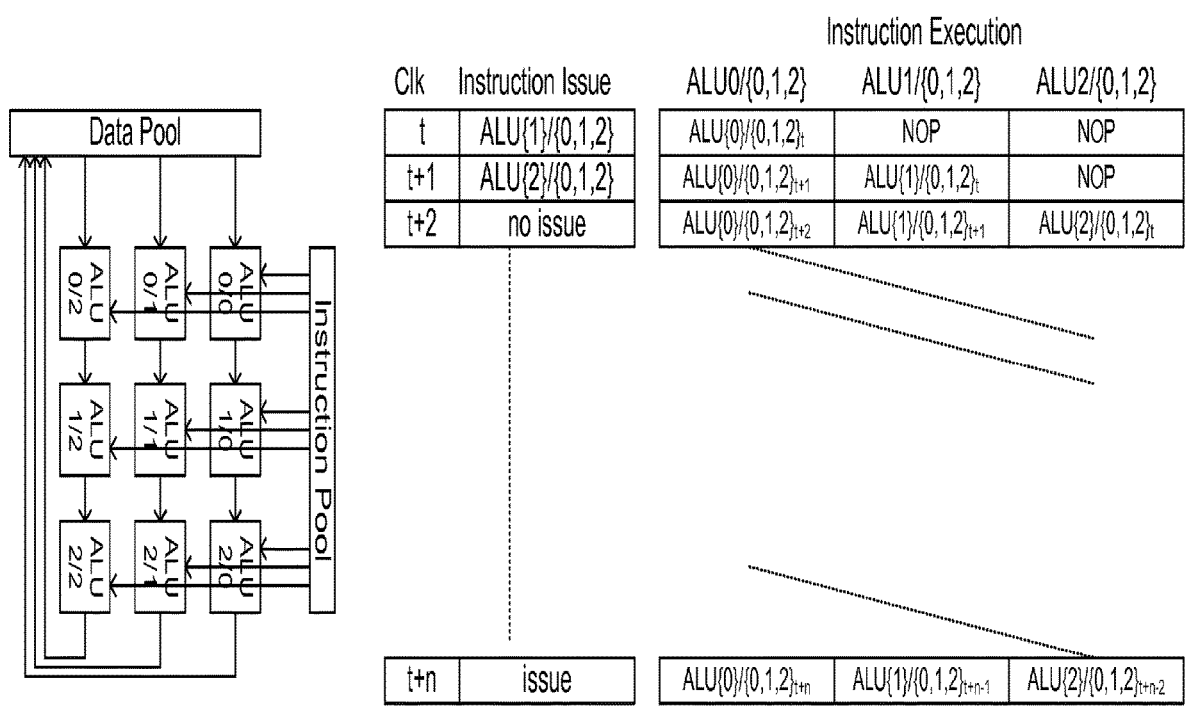
Fig. 3e (hyperscalar)

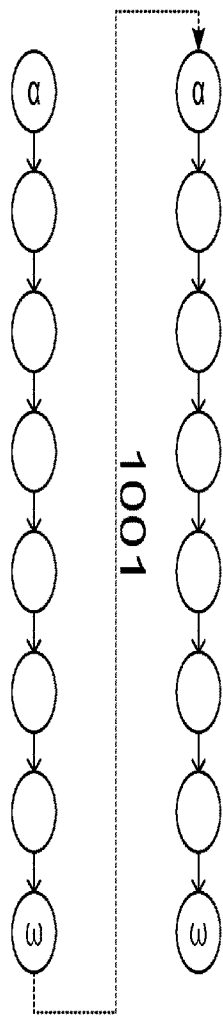
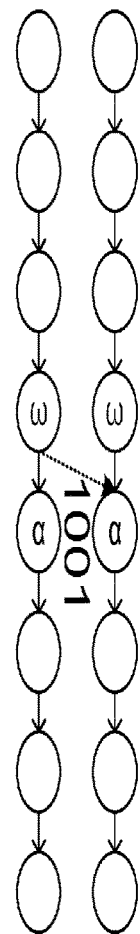
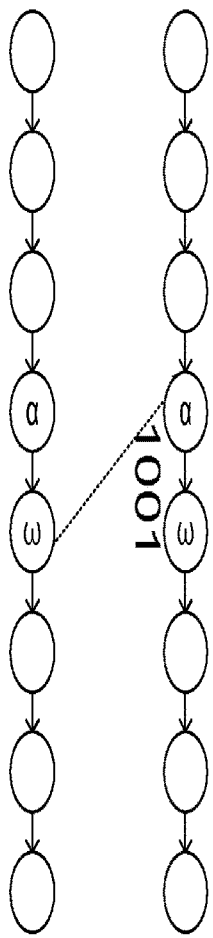
Fig. 10a
p(ω) = 8
p(α) = 1
Fig. 10b
p(ω) = 4
p(α) = 5
Fig. 10c
p(ω) = 5
p(α) = 4

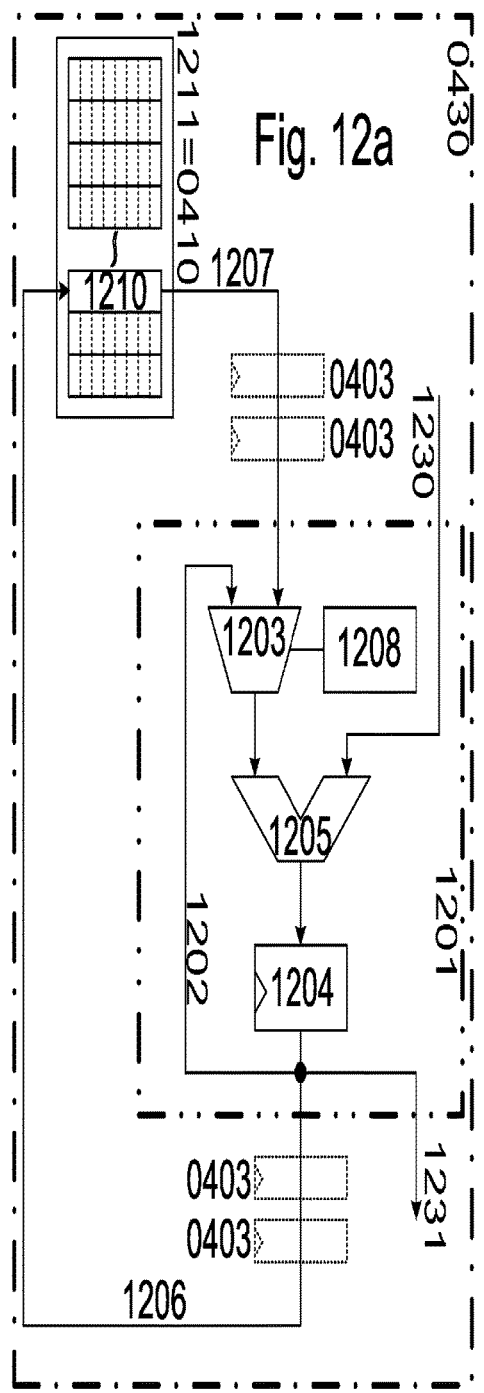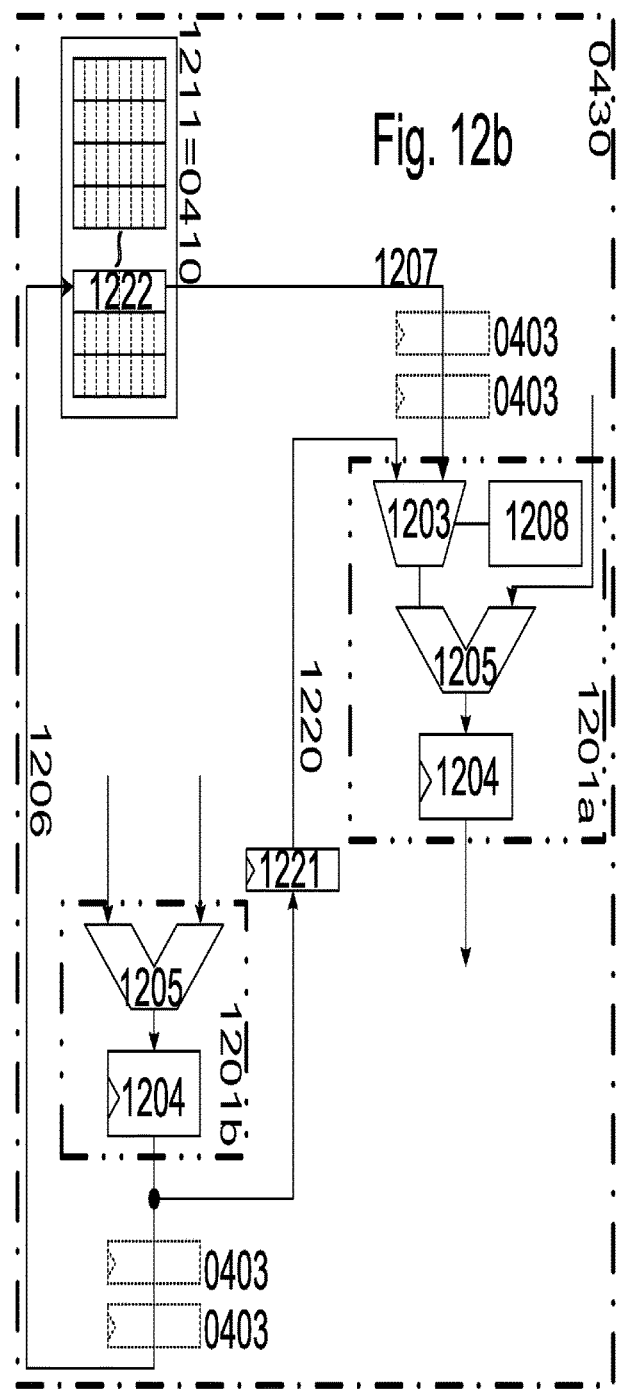

| System | Library | User | Interrupt | Instruction Error | Execution Error |
|---|---|---|---|---|---|
| r00 | r00 | r00 | r00 | r00 | r00 |
| r01 | r01 | r01 | r01 | r01 | r01 |
| r02 | r02 | r02 | r02 | r02 | r02 |
| r03 | r03 | r03 | r03 | r03 | r03 |
| r04 | r04 | r04 | r04 | r04 | r04 |
| r05 | r05 | r05 | r05 | r05 | r05 |
| r06 | r06 | r06 | r06 | r06 | r06 |
| r07 | r07 | r07 | r07 | r07 | r07 |
| r08 | r08 | r08 | r08 | r08 | r08 |
| r09 | r09 | r09 | r09 | r09 | r09 |
| r10 | r10 | r10 | r10 | r10 | r10 |
| r11 | r11 | r11 | r11 | r11 | r11 |
| r12 | r12 | r12 | r12 | r12 | r12 |
| r13 | r13 | r13 | r13 | r13 | r13 |
| r14 | r14 | r14 | r14 | r14 | r14 |
| r15 | r15 | r15 | r15 | r15 | r15 |

Fig. 19

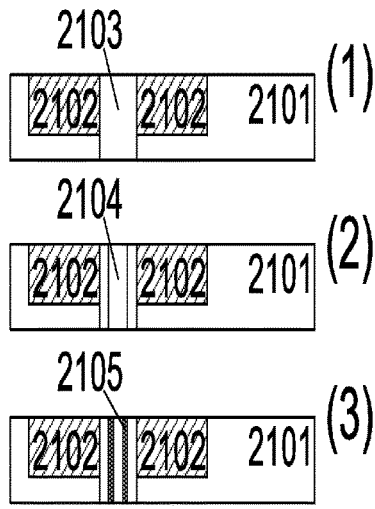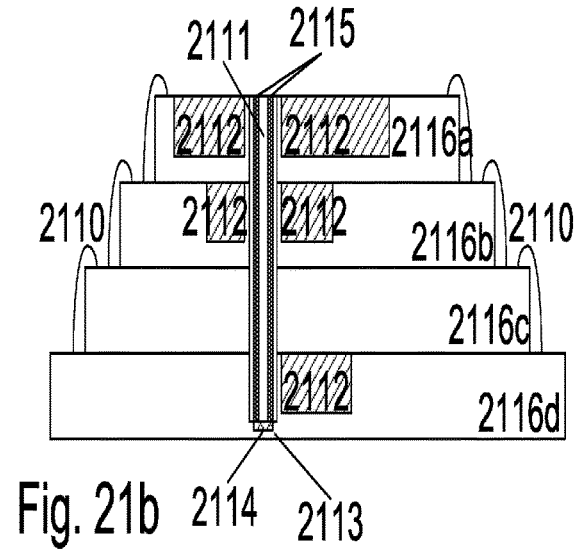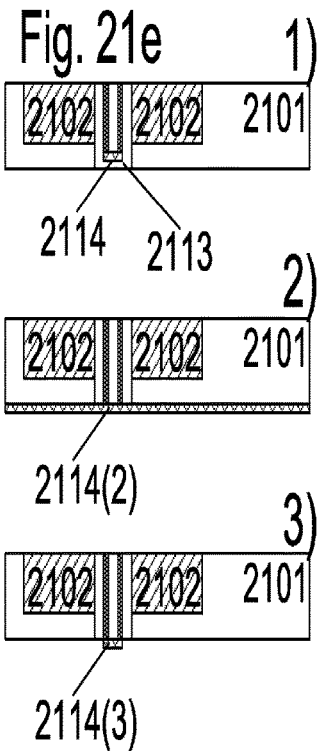

MSB

. . . . . . . . . . . . . . . . . . . . . . . . . . . . . . . . . . . . . . . . . . . . . . . . . . . . . . . . . . . . . . . . . . .

LSB

| Opcode for ALU column 0 | Opcode for ALU column 1 | Opcode for ALU column 2 | Opcode for ALU column 3 | End-of-Code (EOC) |

Fig. 28

MSB

. . . . . . . . . . . . . .SHORT. . . . . . . . . . . . . . . . . . . . . . . . . . . . . . . . . . . . . . . . . .

LSB

| Opcode for ALU column 3 | Opcode for ALU column 2 | compressed | End-of-Code (EOC) | Opcode for ALU column 1 | Opcode for ALU column 0 |

Fig. 29

Uncompressed:

MSB

. . . . . . . . . . . . . .SHORT. . . . . . . . . . . . . . . . . . . . . . . . . . . . . . . . . . . . . . . . . .

LSB

| Opcode for ALU column 3 | Opcode for ALU column 2 | compressed | End-of-Code (EOC) | Opcode for ALU column 1 | Opcode for ALU column 0 |
| Opcode for ALU column 3 | Opcode for ALU column 2 | compressed | End-of-Code (EOC) | Opcode for ALU column 1 | Opcode for ALU column 0 |
| Opcode for ALU column 3 | Opcode for ALU column 2 | compressed | End-of-Code (EOC) | Opcode for ALU column 1 | Opcode for ALU column 0 |

Fig. 30a

Compressed:
SHORT........................................... LSB

| Compressed = 1 | End-of-Code (EOC) | Opcode for ALU column 1 | Opcode for ALU column 0 |
|---|---|---|---|
| Compressed = 1 | End-of-Code (EOC) | Opcode for ALU column 1 | Opcode for ALU column 0 |
| Compressed = 1 | End-of-Code (EOC) | Opcode for ALU column 1 | Opcode for ALU column 0 |
| Compressed = 1 | End-of-Code (EOC) | Opcode for ALU column 1 | Opcode for ALU column 0 |

Fig. 30b

Packed:
MSB
................................................
LSB

| | | Compressed = 1 | End-of-Code (EOC) | Opcode for ALU column 1 | Opcode for ALU column 0 |
|---|---|---|---|---|---|
| Compressed = 1 | End-of-Code (EOC) | Opcode for ALU column 1 | Opcode for ALU column 0 | Compressed = 1 | End-of-Code (EOC) |
| Opcode for ALU column 1 | Opcode for ALU column 0 | Compressed = 1 | End-of-Code (EOC) | Opcode for ALU column 1 | Opcode for ALU column 0 |

Fig. 30c

ISSUING INSTRUCTIONS TO MULTIPLE EXECUTION UNITS

CROSS REFERENCE TO RELATED APPLICATIONS

The present application is a continuation of U.S. patent application Ser. No. 15/891,094, which was filed on Feb. 7, 2018 and titled ISSUING INSTRUCTIONS TO MULTIPLE EXECUTION UNITS, which is a continuation of U.S. patent application Ser. No. 14/830,704, which was filed on Aug. 19, 2015 and titled ISSUING INSTRUCTIONS TO MULTIPLE EXECUTION UNITS (now U.S. Pat. No. 9,898,297), which is a continuation of U.S. patent application Ser. No. 13/123,527, which was filed on Nov. 28, 2011 and titled INSTRUCTION ISSUE TO ARRAY OF ARITHMETIC CELLS COUPLED TO LOAD/STORE CELLS WITH ASSOCIATED REGISTERS (now U.S. Pat. No. 9,152,427), which claims priority to PCT/EP2009/007415, which was filed on Oct. 15, 2009 and titled SEQUENTIAL PROCESSOR COMPRISING AN ALU ARRAY, which claims priority to the following applications:

EP 09008859.2, filed on Jul. 7, 2009;
EP 09003744.1, filed on Mar. 16, 2009;
EP 09000492.0, filed on Jan. 15, 2009;
EP 08020167.6, filed on Nov. 19, 2008;
EP 08019266.9, filed on Nov. 4, 2008; and
EP 08018039.1, filed on Oct. 15, 2008, the contents of all of which are all incorporated herein by reference in their entirety.

INTRODUCTION AND FIELD OF INVENTION

The present invention relates to data processing in general and to data processing architecture in particular.

Energy efficient, high speed data processing is desirable for any processing device. This holds for all devices wherein data are processed such as cell phones, cameras, hand held computers, laptops, workstations, servers and so forth having different processing power.

Data processing generally is done according to software and often, the same kind of data processing needs to be effected on different devices. Since coding software is expensive, it is be desirable to have software which can be compiled to a large number of different platforms having different processing power.

It would be desirable to provide a data processing architecture that can be easily adapted to different processing powers needed while necessitating only minor adaptions to coded software.

It is an object of the present invention to provide at least a partial improvement over the prior art of processing architectures with respect to at least one of data processing efficiency, power consumption and use of the same software coding.

BRIEF DESCRIPTION OF THE DRAWINGS

FIGS. 1a-1e are block diagrams showing examples of four types of processors;

FIG. 3a is a block diagram showing an example of a multiple instruction, multiple data (MIMD) architecture for a processor;

FIG. 3b is a block diagram showing an example of a matrix execution mode;

FIG. 3c is a block diagram showing an example of a superscalar execution mode;

FIG. 3c1 is a block diagram showing an example of an extended superscalar or VLIW execution mode;

FIG. 3d is a block diagram showing an example of a vector execution mode;

FIG. 3e is a block diagram showing an example of a hyperscalar execution mode;

FIGS. 10a, 10b, and 10c are diagrammatic illustrations of loop graphs illustrating handling of a loop-carried dependency;

FIGS. 12a and 12b are block diagrams showing examples of execution of two exemplary Loop-carried dependences on an ALU-Block;

FIG. 17c is a diagrammatic illustration of an example instruction issue unit according to FIG. 17a;

FIG. 19 is a diagrammatic illustration of an example embodiment of a register file;

FIG. 21a is a diagrammatic illustration of an example implementation of a chimney or thermosiphon coupled to a die;

FIG. 21*b* is a diagrammatic illustration of an example implementation of a chimney or thermosiphon for a stack including four dies connected by conventional wire-bonds;

FIG. 21*c* is a diagrammatic illustration of an example implementation of a chimney or thermosiphon for a stack of dies interconnected with bumps;

FIG. 21*d* is a diagrammatic illustration of an example implementation of a chimney or thermosiphon for a stack of dies interconnected with through-silicon-vias (TSVs);

FIG. 21*e* is a diagrammatic illustration of an example implementation of three chimney-or-thermosiphon architectures which may be manufactured for a bottom die;

FIG. 28 is a diagrammatic illustration of an example instruction format including multiple opcodes;

FIG. 29 is a diagrammatic illustration of an example instruction that allows either to supply instructions for four ALU columns or, when compressed, for two ALU columns;

FIGS. 30*a*-30*c* are diagrammatic illustrations of examples showing four compressed instructions that fit the memory area of three uncompressed instructions.

DETAILED DESCRIPTION OF THE DRAWINGS

Figure 2:
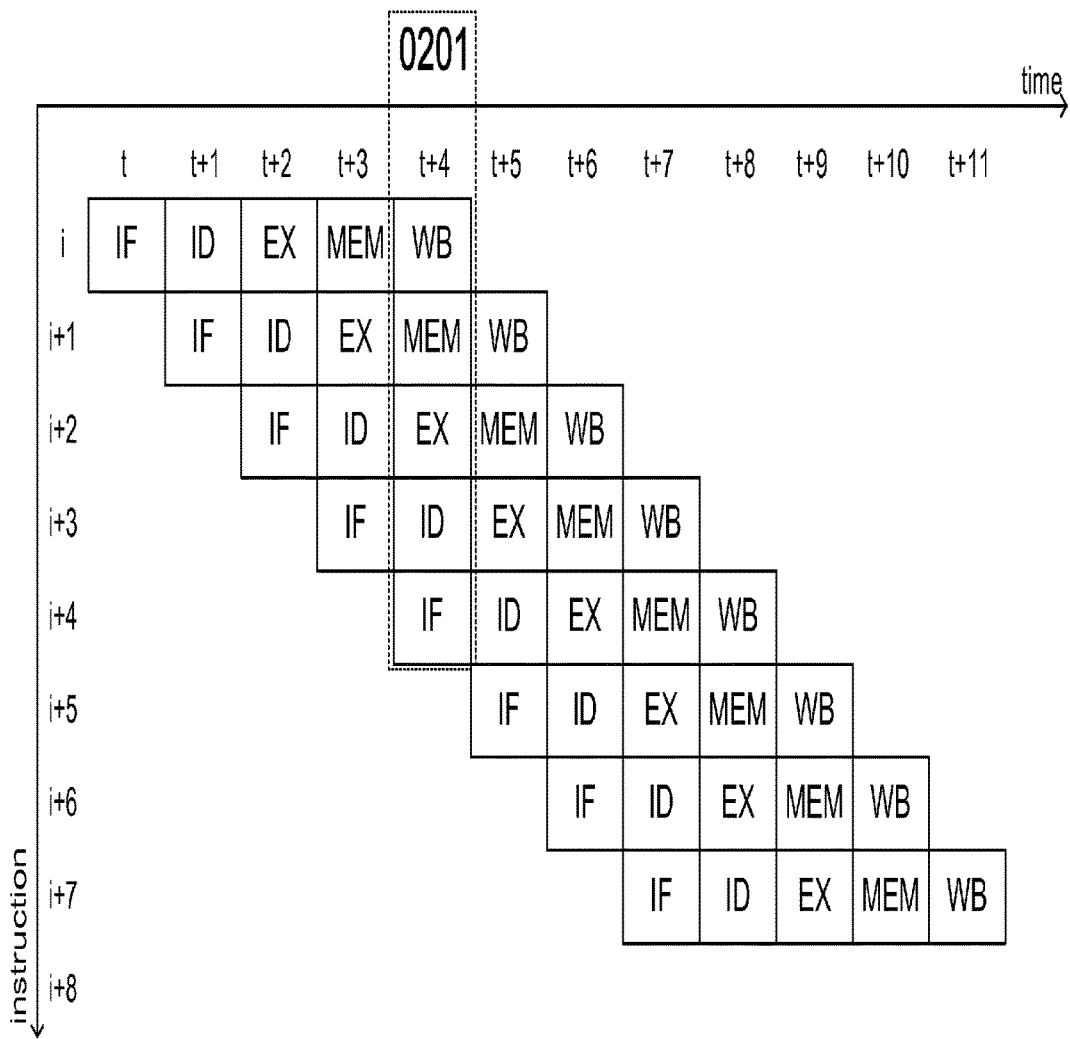
FIG. 2 is a diagrammatic illustration of successive instructions overlapping in execution for a traditional single instruction (SISD) processor.

The present invention describes a new processor architecture called ZZYX thereafter, overcoming the limitations of both, sequential processors and dataflow architectures, such as reconfigurable computing.

It shall be noted that whereas hereinafter, frequently terms such as "each" or "every" and the like are used when certain preferred properties of elements of the architecture and so forth are described. This is done so in view of the fact that generally, it will be highly preferred to have certain advantageous properties for each and every element of a group of similar elements. It will be obvious to the average skilled person however, that some if not all of the advantages of the present invention disclosed hereinafter might be obtainable, even if only to a lesser degree, if only some but not all similar elements of a group do have a particular property. Thus, the use of certain words such as "each", "any" "every" and so forth. is intended to disclose the preferred mode of invention and whereas it is considered feasible to limit any claim to only such preferred embodiments, it will be obvious that such limitations are not meant to restrict the scope of the disclosure to only the embodiments preferred.

It shall also be noted that notwithstanding the fact that a completely new architecture is disclosed hereinafter, several aspects of the disclosure are considered inventive per se, even in cases where other advantageous aspects described hereinafter are not realized.

The ZZYX processor comprises multiple ALU-Blocks in an array with pipeline stages between each row of ALU-Blocks. Each ALU-BLOCK may comprise further internal pipeline stages. In contrast to reconfigurable processors data flows preferably in one direction only, in the following exemplary embodiments from top to bottom. Each ALU may execute a different instruction on a different set of data, whereas the structure may be understood as a MIMD (Multiple Instruction, Multiple Data) machine.

The ZZYX processor is optimized for loop execution. In contrast to traditional processors, instructions once issued to the ALUs may stay the same for a plurality of clock cycles, while multiple data words are streamed through the ALUs. Each of the multiple data words is processed based on the same temporarily fixed instructions. After a plurality of clock cycles, e.g. when the loop has terminated, the operation continues with one or a set of newly fetched, decoded and issued instructions.

The ZZYX processor provides sequential VLIW-like processing combined with superior dataflow and data stream processing capabilities. The ZZYX processor cores are scaleable in at least 3 ways:

1. The number of ALUs can be scaled at least two dimensionally according to the required processing performance; the term multi-dimensional is to refer to "more than one dimension". It should be noted that stacking several planes will lead to a three dimensional arrangement;
2. the amount of Load/Store units and/or Local Memory Blocks is scalable according to the data bandwidth required by the application;
3. the number of ZZYX cores per chip is scalable at least one dimensionally, preferably two or more dimensionally, according to the product and market. Low cost and low power mobile products (such as mobile phones, PDAs, cameras, camcorders and mobile games) may comprise only one or a very small amount of ZZYX cores, while high end consumer products (such as Home PCs, HD Settop Boxes, Home Servers, and gaming consoles) may have tens of ZZYX cores or more.

High end applications, such as HPC (high performance computing) systems, accelerators, servers, network infrastructure and high and graphics may comprise a very large number of interconnected ZZYX cores.

The major benefit of the ZZYX processor concept is the implicit software scalability. Software written for a specific ZZYX processor will run on single processor as well as on a multi processor or multicore processor arrangement without modification as will be obvious from the text following hereinafter. Thus, the software scales automatically according to the processor platform it is executed on.

The concepts of the ZZYX processor are applicable on traditional processors, multithreaded processors and/or multi-core processors. A traditional processor is understood as any kind of processor, which may be a microprocessor, such as an AMD Phenom, Intel Pentium or Xeon, IBM's and Sony's CELL processor, ARM, Tensilica or ARC; but also DSPs such as the C64 family from TI, 3DSP, Starcore, or the Blackfin from Analog Devices.

The concepts disclosed are also applicable on reconfigurable processors, such as SiliconHive, IMEC's ADRES, the DRP from NEC, Stretch, or IPFlex; or multi-processors systems such as Picochip or Tilera. Most of the concepts, especially the memory hierarchy, local memories elements, and Instruction Fetch units as well as the basic processor model can be used in FPGAs, either by configuring the according mechanisms into the FPGAs or by implementing according hardwired elements fixedly into the silicon chip. FPGAs are known as Field Programmable Gate Arrays, well known from various suppliers such as XILINX (e.g. the Virtex or Spartan families), Altera, or Lattice.

The concepts of the ZZYX processor are particularly well applicable on stream processors, graphics processors (GPU) as for example known from NVidia (e.g. GeForce), ATI/AMD and Intel (e.g. Larrabee), and especially General Purpose Graphics Processors (GPGPU) also know from NVidia, ATI/AMD and Intel.

ZZYX processors may operate stand alone, or integrated partially, or as a core into traditional processors or FPGAs; it is noted that any such FPGA integrating a ZZYX processor as disclosed hereinafter will be or have coarse granular elements. While ZZYX may operate as a co-processor or thread resource connected to a processor (which may be a microprocessor or DSP), it may be integrated into FPGAs as processing device. FPGAs may integrate just one ZZYX core or multiple ZZYX cores arranged in a horizontal or vertical strip or as a multi-dimensional matrix.

All described embodiments are exemplary and solely for the purpose of outlining the inventive apparatuses and/or methods. Different aspects of the invention can be implemented or combined in various ways and/or within or together with a variety of other apparatuses and/or methods.

Sequential processors are well known. Since years, deep pipelined ALU paths are in use. Instructions are issued to the pipelined ALU in a way, enabling the execution of multiple subsequent instructions within the pipelined ALU path, operating on different set of data. Classically only one pipelined ALU is implemented. In modern (VLIW/multi-thread/superscalar) processors multiple ALUs are integrated, yet each of them working independently only connected through the Register File.

Also known are SIMD architectures, where Multiple Data is processed by multiple ALUs executing one Single Instruction (Single Instruction Multiple Data).

The structure of the ZZYX processor, comprising Multiple ALU-Blocks, preferably in an array, whereas the ALUs operate pipelined with either a) each executing the same instruction or b) at least some execute different instructions, on either a) different sets of data or b) the same set of data is regarded as a new and inventive kind of multi-core processor. Furthermore the Instruction Issue to multiple ALUs in a pipelined manner, such enabling a column of ALUs or even an array of ALUs to operate pipelined without empty slots (bubbles) is regarded novel.

Another novel aspect is the definition of sequential. While traditional sequential processors operate on single words of data, with a new instruction in every cycle, ZZYX processors may operate on multiple words (a block) of data, but may keep issued instructions for multiple cycles in order to process an inner loop or a part of an inner loop efficiently. Each ALU stage may use the results of any previous ALU stage as operand input and/or data from the Register File.

Although ZZYX processors offer such advanced features for processing large blocks or streams of data, they may operate similar to VLIW machines, just using one row of ALUs and issuing one instruction after another. As an extension to the traditional VLIW concept, not only one single row of ALUs may be used, but multiple ALU rows can implement a pipeline of ALU stages. Furthermore it is possible to implement Multi-Row-Very-Large-Instruction-Words, which use a plurality of ALU rows for the execution of one single instruction without forwarding the data from one ALU row to the next. In this mode, all ALUs get their operands directly from the Register File and the results are directly transmitted to the Register File. No operands are forwarded from one ALU row to a next one. Which model and how many ALU stages are used at a specific point in time is up to the programmer or compiler, which can use the best performing model for processing a specific algorithm or part of an algorithm.

Also known in the prior art are reconfigurable processors. They provide a vast amount of resources, either fine granular (such as FPGAs, e.g. from XILINX, Altera, MorphoSys, Chess, Garp, and others) or coarse granular (such as DPGAs, XPPs, VPUs, e.g. PADDI, Pleiades, PipeRench, PACT XPP, CHAMELEON, DReAM, and others). Common for this type of devices is the (re)configuration defining the operation of each processing unit, which may be fine grained (e.g. CLBs) or coarse grained (e.g. PE, PAE), and the structure of the data network. (Re)Configuration defines the whole architecture of a reconfigurable processor. Therefore the amount of configuration data is rather large (in the range of ten thousands to millions of bytes). This leads to a significant amount of time and energy required for reconfiguration and makes reconfigurable processors inefficient for operating on small amount of data or even worse, sequential operation.

Concepts to overcome the configuration overhead by multiple configuration controllers, shadow reconfiguration or even wave reconfiguration are critical to handle in hardware and in software and are not transparent for the programmer but require extra programming efforts. Mainly the hardware overhead and limited applicability made those concepts inefficient. Both multiple reconfiguration controllers and shadow reconfiguration require additional silicon resources. Wave reconfiguration efficiently works only on a very limited set of applications and even then, the required time for reconfigurations is hundreds of clock cycles. Furthermore it proved impossible to implement virtual "one-cycle" reconfiguration with wave reconfiguration, simply as the amount of registers to be reconfigured becomes larger as the wave spreads. As only one or a very limited number of registers can be reconfigured at one clock cycle, the wave grows fast larger and the amount of register reconfigured trails and is falling back fast.

Another implicit and significant downside of reconfigurable processors is the large and expensive bus system. The approach of configurable busses offers large flexibility but requires place and route tools (P&R), being time consuming, inefficient, and worst, incompatible with software tool chains based on modern programming languages such as C, C++, JAVA or others. Therefore the tools for reconfigurable processors are more like hardware tool chains using hardware description languages (HDL, such as VHDL, Verilog, etc.), Synthesis-like transformations and Place&Route tools instead of common compiler optimization and backend.

It is proven that reconfigurable processors may operate more energy efficient than traditional processors under best case conditions. However both the reconfiguration overhead in terms of resources (including the configurable bus system) and time limits the efficiency in terms of power dissipation and silicon area. Efficient operation is only possible for small algorithmic kernels processing huge amount of data; irregular sequential processing is inefficient in every aspect.

Bottom line reconfigurable computing is only applicable for a limited set of algorithms and even then the area and cost overhead adds further limitations.

A great feature of reconfigurable processors is their adaptability and flexibility. However it has proven critical to design tools capable of handling and exploiting the vast complexity.

Compared to reconfigurable architectures, ZZYX processors have very limited bus systems and a strict data flow direction, preferably in one main direction only (with the optional support for limited feedback capabilities to implement loops), such limiting complexity and overhead in every aspect. Instruction issue (or in the terminology of reconfigurable processors "reconfiguration") occurs in a single clock cycle and is strictly synchronous with the data flow. From a tool perspective the limited complexity of ZZYX processors enables the design of efficient programming tools, and in particular the use of industry standard development chains based on modern programming languages such as C, C++, JAVA or others.

Another significant disadvantage of reconfigurable computing is the limited scalability. While the hardware scales easily from tenth to hundreds or even thousands of processing elements (CLBs, PEs, PAEs, no useful concepts exist for scaling the compiled configuration code (or object code) easily and for using the same code on reconfigurable processors of different sizes. Code must be written explicitly for one specific target device. This makes it impossible to write and reuse code for a wide range of target applications, such as small mobile devices, larger consumer products, and high performance systems, thus significantly increasing the cost of ownership.

The architecture and compiler of the ZZYX processor enables easy scaling of object code for various processor sizes (in terms of silicon area, performance, power dissipation and cost). ZZYX processors are based on replicable blocks of ALUs, so called ALU-Blocks (ABs). It shall be expressively noted, that ALUs and ALUs according to the later described Lynn's Classification, may be identical terms and/or units. Depending on the performance target of the processor a number of ALU-Blocks (ABs) will be implemented. The compiler backend generates code at the granularity of ALU-Blocks (ABs). Loop transformation optimizes and splits inner loops into loop segments. A single loop segment is executed on one ALU-Block (AB) at a time. Multiple loop segments can be executed in parallel on multiple ALU-Blocks (ABs) at time. Also multiple loop segments of the split inner loop can be executed either sequentially on one single ALU-Block (AB) or partially sequential and partially parallel on as many ABs as are provided by the ZZYX processor.

Flynn's Classification of Processor Architectures, VLIW and Super-50 Scalar

Four processor classifications are defined by Flynn, based upon the number of concurrent instruction (or control) and data streams available in the architecture. Those 4 types describe typical processors of prior art as shown in FIGS. 1a-1d. The processors comprise Arithmetic-Logic-Units (ALUs). The execution is defined by a stream if instructions from an Instruction Pool, whereas a new instruction is issued in each clock cycle. Operand data is provided by a Data Pool, results are written back into it.

Single Instruction, Single Data Stream (SISD) (FIG. 1a)

A sequential computer which exploits no parallelism in either the 10 instruction or data streams. Examples of SISD architecture are the traditional uniprocessor machines like a PC or old mainframes.

Single Instruction, Multiple Data Streams (SIMD) (FIG. 1c)

A computer which exploits multiple data streams against a single instruction stream to perform operations which may be naturally parallelized. This architecture is widely used, for example, in array processors, GPUs or in typical microprocessors as Intel Pentium (in the MMX unit).

Multiple Instruction, Single Data Stream (MISD) (FIG. 1b)

Multiple instructions operate on a single data stream. It is a very uncommon architecture which is generally used for fault tolerance. Heterogeneous systems operate on the same data stream and must agree on the result. Examples include the Space Shuttle flight control computer.

Multiple Instruction, Multiple Data Streams (MIND) (FIG. 1d)

Multiple autonomous processors, simultaneously executing different instructions on different data. Distributed systems are generally recognized to be MIMD architectures; either exploiting a single shared memory space or a distributed memory space.

Very Long Instruction Word (VLIW) and Superscalar (FIG. 1e)

This architectures are subversions of MIMD machines. VLIW processors drive the ALU path by one single long instruction, derived from the same program. Superscalar machines provide larger independence between the multiple Processor Units in the ALU path. The specific ALUs may even be driven by different.

Common for the five architectures above is the issue of a new instruction in each clock cycle.

Pipelining

Pipelining is used in a processor to increase the instruction throughput (the number of instructions that can be executed in a unit of time).

Pipelining assumes that with a single instruction (SISD) concept successive instructions in a program sequence will overlap in execution, as shown in FIG. 2 (vertical 'i' instructions, horizontal 't' time). The basic concept for SISD processors can easily be extended to any other type of architecture (e.g. SIMD, For example, the classical RISC pipeline is broken into five stages with a set of registers between each stage.

Stage 1: Instruction fetch (IF)
Stage 2: Instruction decode and register fetch (ID)
Stage 3: Execute (EX)
Stage 4: Memory access (MEM)
Stage 5: Register write back (WB)

A non-pipeline architecture is inefficient because some CPU components (modules) are idle while another module is active during the instruction cycle. Pipelining does not completely cancel out idle time in a CPU but making those modules work in parallel improves program execution significantly.

Processors with pipelining are organized inside into stages which can semi-independently work on separate jobs. Each stage is organized and linked into a 'chain' so each stage's output is inputted to another stage until the job is done. This organization of the processor allows overall processing time to be significantly reduced.

Unfortunately, not all instructions are independent. In a simple pipeline, completing an instruction may require 5 stages. To operate at full performance, this pipeline will need to run 4 subsequent independent instructions while the first is completing. If 4 instructions that do not depend on the output of the first instruction are not available, the pipeline control logic must insert a stall or wasted clock cycle into the pipeline until the dependency is resolved. Techniques such as forwarding can significantly reduce the cases where stalling is required. While pipelining can in theory increase performance over a non-pipelined core by a factor of the number of stages (assuming the clock frequency also scales with the number of stages), in reality, most code does not allow for ideal execution.

It may appear that pipelining is a technique to exploit parallelism, as in t+4 (0201) 5 instructions are executed simultaneously. However, only one instruction delivers a result (WB) per clock cycle. Additionally dependencies between instructions limit the efficiency as the pipeline may stalls due to instruction dependencies. Therefore pipelining is not a technique for exploiting parallelism but for increasing the maximum clock frequency of a processor by partitioning the gate logic into smaller pieces with lower delays from register to register. The bandwidth and throughput increases, the instruction efficiency in terms of executed instructions per clock cycle decreases due to pipeline stalls.

Reconfigurable Computing

Reconfigurable processors are the most radical approach to exploit parallelism within algorithms. A vast array of ALUs, each ALU is capable of operating at a dedicated and specific instruction or a sequence of instructions, are interconnected by a network of configurable interconnections.

Typically reconfigurable processors are capable of being reconfigured at runtime, which means the function of the ALUs and/or the interconnection of the ALUs are changed at runtime.

However the time to reconfigure this type of processors is significant and typically in the range of thousands of clock cycles, which makes frequent reconfiguration inefficient. Therefore reconfigurable processors are not efficient on sequential code, but rather used for streaming applications, where loads of data are processed by a small block of code.

The nature of reconfigurable processors requires a programming model substantially different from the known and established models for sequential processors.

Typically reconfigurable processors have no Register File, but connect directly to memories, due to their approach of block based processing.

The large amount of ALUs and the tremendous overhead for the configurable interconnection network required a large silicon area and makes reconfigurable processors often cost inefficient. The hardware overhead is also limiting the maximum clock frequency and is wasting energy.

Examples of Prior Art

VLIW processors are well established in the market. Major products are Texas Instruments high-end DSPs, but also DSPs from smaller vendors such as Starcore or niche products from companies like ClearSpeed, Equator or BOPS.

Reconfigurable processors are mainly build by PACT XPP Technologies and Mathstar, but for a while quite a few companies such as Chameleon Systems, Morphosys and Quicksilver tried to get those architecture working.

MIMD processors are currently offered by a number of companies, such as Picochip, Tilera, Cradle and Silicon-Hive.

A few others work on merging reconfigurable architectures with traditional RISC or VLIW processors, and have approaches similar to those being described within this patent application. Well known is the ADRES architecture from IMEC, the TRIPS/EDGE architecture from the University of Texas at Austin, in cooperation with IBM and others, and the MOSAIC architecture from Ebeling, University of Washington.

The ZZYX Architecture

FIG. 3a shows the MIMD hh architecture of FIG. 1d again, as is comes closest to the concept of the ZZYX architecture. Additionally the Instruction Issue to the ALUs is shown; in each clock cycle a new instruction is issued to each of the ALUs. An ALU may comprise typical Arithmetic-Logic-Unit functionality, such as add, subtract, multiply, divide, and Boolean functions. Complex operations such as Floating Point can be realized either in one single ALU or by combination of multiple ALUs, in width and/or depth.

A first overview of the ZZYX architecture is shown in FIGS. 3b to 3d. The architecture supports 4 execution modes, which can be freely selected within a given application. If executing an Operation System or Scheduler, each Program and/or Task and/or Thread may use a different execution mode.

Each ALU gets its operand data from the Data Pool and additionally from any of the previous ALUs in the datapath. As data is sent downstream only, the data transfer is called Down-Path thereafter. This is a first major difference to both, MIMD architectures and Reconfigurable Processors. MIMD processors support only the interaction of the ALUs with the Data Pool, but no data transfer between the ALUs. Reconfigurable Processors support any interaction between each of the ALUs, but are not limited to the Down-Path data transfer.

A second significant difference to both, MIMD architectures and Reconfigurable Processors is the Instruction Issue. In the ZZYX architecture an instruction to the ALUs might be issued within each clock cycle or alternatively only at some clock cycles. In the latter case instructions may remain the same for multiple clock cycles, but new operand data is sent to the ALUs which is processed. The previously instructions issued remain valid and new operand data is processed in exactly the same way.

The four execution modes are:

1. Matrix:

(FIG. 3b) The ALUs build a processing matrix, such optimal suited for vector and matrix operations. Typically the instruction for one row of ALUs is issued after another.

For example
i) the instructions for row 0 (ALU101/10,1, . . . 1 are issued at time t, columns 1-n process no operation (NOP) or the previous (old) instructions;
ii) the instructions for row 1 (ALU111/10,1, . . . 1 are issued at time t+1, the row 1 keeps processing the issued instruction of step i), row 2-n process no operation (NOP) or the previous (old) instructions;
iii) and so on, until the instruction for row n is issued;
iv) after all rows are operating on an issued block of instructions, No Instruction Issue (NII) may occur for various clock cycles. The Instruction Issue sequence shown in FIG. 3b indicates that, after the operation of all rows of ALUs is defined by instructions, the operation may continue for various clock cycles on new data without changing the instruction (NII).

This processor model provides various benefits for processing blocks, streams or other large amount of data. The matrix of ALUs support massively parallel processing and deep pipelining. As the Instruction Issue follows in each clock cycle the pipelined data flow from stage to stage, it is transparent, which means completely in line with the data processing and generates no overhead. The principle of Intermittent Instruction (issue) Multiple Data (IIMD) requires less Instruction Fetch and issue overhead and is therefore highly power efficient.

Matrix-Mode operates in a kind of data flow mode, partitioned into sequential blocks of the granularity of an ALU-Block (AB). Each ALU can receive operands from upstream ALUs or the Register File and sends its result to downstream ALUs and/or the Register File. As traditional Register File concepts are not compatible with data flow processing, the Register File operates not as addressable registers, but as blocks of addressable FIFOs. If required operands are not available in a FIFO (as for example not yet available data from previous ALU-Blocks and/or loop segments, memory or peripherals) and/or result FIFO cannot accept additional data (as for example the result data cannot be written to subsequent ALU-Blocks and/or Loop-Segments memory or peripherals) the operation stalls. To achieve this e.g. either valid flags may be attached to the data stored in the FIFOs or the states of the FIFOs are checked for empty or full status.

2. Superscalar:

(FIG. 3c) The ALUs operate in a kind of Superscalar mode as for example VLIW processors do. Only one row of ALUs is used, operand data is directly received from the Data Pool and result data is written directly back into it. As for VLIW processors typically no data interdependencies between the ALUs exist. The status output of the single ALUs is possibly combined to form one common status.

Using a wider bus system between the Instruction Decoder and the instruction memory directly coupled to the Instruction Decoder (which is usually the Level-1 cache), it is possible to read 2 or more instruction words in one clock cycle. With an accordingly adapted Instruction Decoder, having the capability to decode 2 or more instruction words in one clock cycle it is possible to feed a plurality of ALU rows simultaneously with instructions. Defining the limitation, that no data is passed in between the ALUs, but ALUs solely receive operands from the Register File and solely write results to the Register File, an extended Superscalar or VLIW mode may be implemented as shown in FIG. 3c1. Virtually the VLIW resources are increased by one or more rows of ALUs, which are identically connected to the Register File as the first row of ALUs. The processor operates in VLIW mode with just an even larger instruction word, which allows for a better exploitation of the processor's resources. In a preferred embodiment it may be possible to define within each instruction, whether it is limited to one ALU row or extended by the next instruction(s) being fetched and issued in parallel to subsequent ALU rows.

3. Vector:

(FIG. 3d) In vector mode the instruction, which is usually defining one row is rotated by 90° and defining one column of ALUs instead. The instructions are issued to the ALUs as data pipelines from one to the next. According to FIG. 3d the first ALU on the top gets its instruction first, in the next clock cycle the next ALU downwards is instructed and so on. As one instruction comprises instructions for all ALUs in row, the rotation by 90° provides enough information in the instruction for the definition of multiple columns of ALUs. However, as described above, not all ALUs in a column are instructed immediately, but the instruction is pipelined from top to bottom. This enables an Instruction Issue to a complete v of ALUs per clock cycle as shown by the Instruction Issue/Instruction Execution flow in the figure. Ideally for Vector-mode the ratio between X and Y is 1, means the amount of ALUs in X direction is equal to the amount in Y direction. If the width of the row is smaller than the height of the column, not all ALUs are used in Vector-mode. On the other hand, if the row is wider than the columns high, not the whole instruction is used but cut off after rotation.

Vector-Mode is ideal to implement small inner loops. By blocking the Program Pointer, similar to NII in Martix-mode, serial operations, such as for example series expansion, serial Division and others, can be executed highly energy efficient by avoiding Instruction Fetch and Issue, movement of the Program Point and, most energy saving, access of instruction memory and/or instruction cache.

Vector-Mode enables also the efficient execution of small conditional statements, such as if a<0 then r=a+b else r=−a+b which can be mapped into 3 ALUs and executed without any penalty for jump operations.

In all modes status information derived from a ALU operations is passed to ALUs downstream. Such information can be for instance flags such as carry, overflow, zero, sign, equal, greater then, less then, and so on. Based on this information conditional execution can occur on any ALU downstream.

This is useful in particular for branching, which again is well suited for Vector-mode:

if a=0x100 then goto label_a (operation at row 0)
if a<0x100 then goto label_b (operation at row 1)
if a=0x101 then goto label_c (operation at row 2)
if a>0x110 then goto label_d (operation at row 3)

This program segment can be loaded into one single ALU-Block on a 4 row processor. Preferably the most recent hit is loaded into the first row (row 0) in order to provide maximum time for the program pointer to be adjusted to the comparison and the whole instruction pipeline to be reloaded accordingly.

4. Hyperscalar:

(FIG. 3e) This mode is a combination of Matrix- and Vector-mode and offers e.g. greater complexity than the Vector-mode only supporting one single row of ALUs. Anyhow there is increased penalty, either the Instruction Issue per clock is limited to one row or some of the rows. Alternatively larger Instruction Fetch/Decode/Issue units, and ultimately wider or faster instruction memory or cache are required supporting the greater amount of instructions to be issued per clock cycle.

A multi cycle kernel is mapped onto the exemplary 3×3 array of Processing Units (ALUs) (NOTE: This array is basically equivalent to the ALU-Block of the ZZYX processor architecture.) A multi cycle kernel might be a partition of a large loop, and/or algorithmic kernels, such as Fourier Transformations (FFT), Finite Response Filters (FIR), Discrete Cosine Transformations (DCT), search or sort algorithms, Viterbi or Turbocode, just to name a few. A multi cycle kernel is defined as a group of opcodes mapped onto the ALUs (e.g. loop segments), while at least some of the opcodes are not being executed in one cycle only (as a traditional processor does) but for multiple cycles (as dataflow machines do). The operation terminates only if some condition occur, for example a loop terminates, no input data available, no data output possible, application stopped, scheduler schedules next task, and others.

In FIG. 3e, exemplary at clock cycle t−1 an instruction is issued to the first row of ALUs (which is basically equivalent to the first row of ALUs of an ALU-Block (AB)). At clock cycle t the first row of ALUs is executing the issued instruction. At the same cycle an instruction is issued to the second row of ALUs. At the next cycle the first and second row of ALUs are operating, results produced by the first row (ALUI01,10,1,21) of ALUs might be forwarded to the second row (ALUI11,10,1,21) of ALUs, preferably in a pipelined manner, at the same time an instruction for the third row of ALUs (ALUI21,10,1,21) is issued.

All rows of ALUs are operating now, each row may forward result data as operands to subsequent rows, and/or write result data back into the Register File.

The operation continues, until a terminating condition occurs. At the time, when the first row of ALUs (ALUI01, 10,1,21) finishes execution, immediately the next instruction can be issued and the row can execute in the next clock cycle. The same holds for all subsequent rows.

In other words, while the old pipeline flushed the new pipeline is filled; Instruction Issue is overlaid with data processing.

While an ALU-Block (AB) basically can comprise any amount and X/Y ratio of ALUs (which may be equivalent with and later called ALUs), it is preferred to have a fix amount and ratio within one processor or product family to achieve maximum software portability and code compatibility. However, as it will be described later on, various processors of a family may comprise a different amount of ALU-Blocks (AB). For example a very small and cost efficient mobile processor may comprise just one ALU-Block (AB), while a consumer processor may have four, and a high end processor sixteen of the ALU-Blocks (ABs).

Multiple ALU-Blocks (ABs) may be used like Multi-Core Units or Multiple Thread resources in a Multithread environment, such as Symmetric Multi Threading (SMT), and execute a plurality of programs, tasks and/or threads simultaneously in parallel.

However all prior art methods require the dedicated influence of the programmer, modifying and enhancing the Source Code accordingly. Furthermore significant overhead in terms of additional management code is created, wasting both, processing time and energy.

The ZZYX processor adds another level of scalability which is regarded novel. During the Loop Optimization Path the compiler splits large loops into Loop Segments fitting into an ALU-Block.

The Loop Header, originally iterating LI (Loop Iterations) times, is transformed into an Outer Loop Header (OLH) and Inner Loop Header (ILH). The Inner Loop Header (ILH) is included in each Loop Segment and iterates the Loop Segments a specific amount of times (Loop Segment Iteration LSI). LSI depends on the resources of the ZZYX processor. As described before, the Register File may operate as multi-FIFO-stage in Matrix-Mode. Then LSI is defined by the size of the FIFO: LSI=number of FIFO entries.

Ultimately Loop Transformation has split the loop into #LS (Number of Loop-Segments) Loop-Segments of code blocks (each fitting into one AB), each Loop-Segment iterating LSI times on its own driven by the Inner Loop Header (ILH), and an Outer Loop Header (OLH) iterating all the Loop-Segments of the Loop LI divided by #LS (LI/#LS) times.

The effect of this Loop Transformation is two fold:

1. The Loop is optimally transformed for Matrix-Mode, in which the ALU-Block (AB) is instructed once by the Instruction Issue and then for LSI-1 (LSI minus one) clock cycles the same code is processed with No Instruction Issue (NII). Operand Data is received from the FIFO Register File and the results are written back into the FIFO Register File. Afterwards the next Loop-Segment is processed accordingly.

2. By chaining multiple ALU-Blocks (ABs) together via FIFO stages (chaining FIFOs) (while the amount of entries in each of the chaining FIFOs being equal or smaller than LSI), multiple Loop-Segments can be processed in parallel. The results of a first Loop-Segment in a first ALU-Block (AB) are streamed via the chaining FIFO to a second Loop-Segment in a second ALU-Block (AB), and so on. This automatic and programmer transparent scaling operates with zero overhead in terms of supporting management software. In Hardware it requires only multiple ALU-Blocks (ABs) being chained together, such enabling great hardware efficiency as the Hardware overhead is limited to the chaining FIFOs.

Ideally and preferably the FIFO Register File is used for implementing the chaining FIFOs.

Details of the according Compiler-Transformations, Instruction Fetch Unit and Object Code Format are described later on.

At traditional processors datapath and the Instruction Fetch and Instruction Decode operate simultaneously. If the datapath completes operation a new instruction is issued. In the ZZYX processor the datapath and instruction units operate at different times. Inside the datapath, packets of data are processed iteratively. Each packet may have dedicated validity information, such supporting dataflow processing modes. Whenever data is available, it will be processed, if not, the datapath will stall. Accordingly the iterative processing inside the datapath can take more time in terms of clock cycles then there are entries in the FIFO Register File (or chaining FIFOs) or steps to be processed in the inner loop (or Loop-Segment iterations LSI). A processing cycle, or in this case the life-time of issued instructions, takes just as much time as required for collecting all operands and transmitting all results. The Instruction Fetch and Instruction Decode units have to deliver and issue the next instruction after completion (end of life-time) of the current instruction. Therefore their timing is highly independent. The processing time required by the datapath can be used by the instruction units to pre-fetch and/or pre-cache and/or predecode new instruction. Similarly the processing time can be used to update the memory manage unit (MMU), and for example swap in and/or out memory pages.

In a preferred embodiment of the ZZYX processor, local memory is provided for faster access. The memory can be accessed independently and in parallel to the main memory. Preferably at least two of this local memory banks are available, such allowing for example fast constant or parameter lookup and/or fast random access to often needed local data. Those local memories can preferably operate as tables, random access memories, first-in-first-out memories (FIFOs) and/or caches. In a preferred embodiment at least some of the memories are sliced in multiple banks. Those banks support independent access, as for example double buffering, background load and/or background store. Multiple banks can be linked together to form one or more virtual larger banks.

The ZZYX Pipeline

Figure 2A:
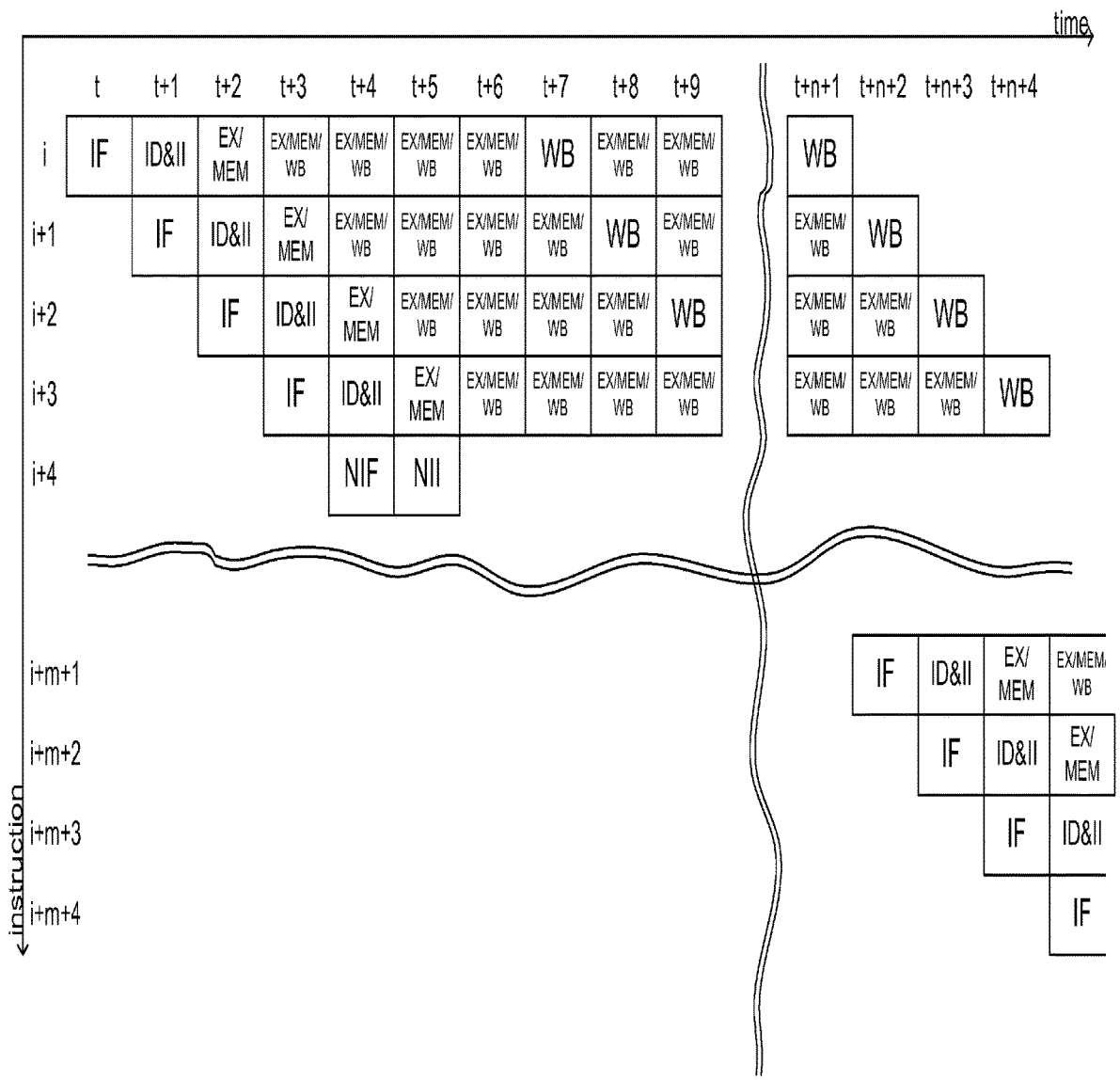
FIG. 2a is a diagrammatic illustration of an example of stages of a pipeline of a processor for processing a multi-cycle kernel.

In contrast to the pipeline of a traditional processor of FIG. 2, the preferred embodiment of the pipeline of a ZZYX processor is shown in FIG. 2a. The pipeline comprises the following stages:

Stage 1: Instruction fetch (IF)

Stage 2: Instruction decode and issue (ID&II)

Stage 3: Execute and Register & Memory read (EX/MEM)

Stage 3A: Execute, Register & Memory read, Register & memory write back (EX/MEM/WB)

Stage 4: Register & memory write back (WB)

Instruction Issue (II), which is typically part of Instruction Decode (ID) is issuing decoded instruction to the respective ALUs. As will be subsequently described, ZZYX processors of the preferred embodiment transfer data to and from Load/Store Units through an explicit register file. Memory load access is therefore handled as normal register accesses. Load operations (as store operations) are performed in parallel to data processing (execution) in the data path. Therefore no explicit MEM stage remains, but execution (EX) and memory access (MEM) form one integral stage. The execution unit (data path, 0450) of a ZZYX processor comprises at least two or more ALU rows (see FIG. 4: 0411, 0412, 0413, 0414), with at least one pipeline stage in between each of the ALU rows. As will be described in great detail, the execution unit is capable of reiteratively processing the issued set of instructions without reissue, for example to process small loops fitting into the data path 0450 as a whole or partitions of loops (both being called multi-cycle kernels). This is even the preferred operation mode of the execution unit (0450). Thus data execution itself is pipelined and part of the ZZYX pipeline, providing Stage 3A, in which Execution (EX), Memory Access (MEM), and Write Back (WB) of the results computed in the previous cycle are written back overlay.

Stage 4, being the last cycle writes back (WB) the results produced by the last and previous Execution (EX) back.

In processing modes such as VLIW and Superscalar, the pipeline sequence comprises the following stages:

| 1 time | Stage 1: | IF |
| 1 time | Stage 2: | ID&II |
| 1 time | Stage 3: | EX/MEM |
| 1 time | Stage 4: | WB |

In processing modes such as Vector, Matrix and Hyperscalar, the Pipeline sequence comprises the following stages:

| 1 time | Stage 1: | IF |
| 1 time | Stage 2: | ID&II |
| 1 time | Stage 3: | EX/MEM |
| j-1 times | Stage 3A: | EX/MEM/WB (j-1 times reiteratively) |
| 1 time | Stage 4: | WB |

When processing j iterations of a multi-cycle kernel, EX/MEM is processed once in the first iteration with a respective WB in the last iteration. j−1 iterations of processing EX/MEM/WB remain in between the first and last iteration.

While processing multi-cycle kernels the issued instructions remain unchanged until all iterations are processed. During that time, No new Instructions are Issued (NII=No Instruction Issue), 50 but the already issued remain in place; accordingly no instructions need to be fetched (NIF=No Instruction Fetch). This feature is significantly reducing the amount if instruction memory accesses and the related power consumption.

Figure 4:
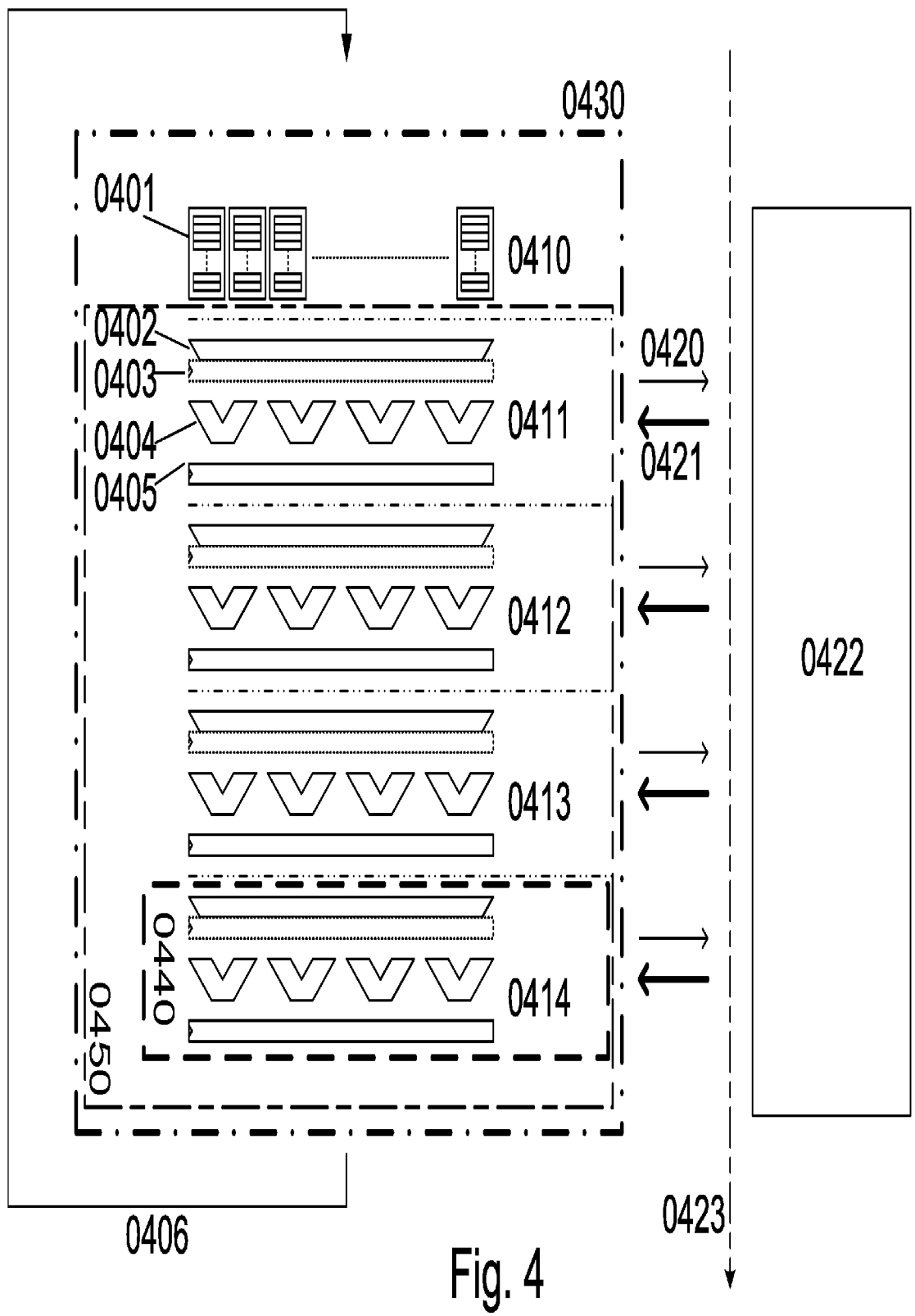
FIG. 4 is a block diagram showing an example ALU-Block in conjunction with an instruction issue unit.

The example given in FIG. 2*a* shows the pipeline for processing a multi-cycle kernel using 4 rows of ALUs, according to the exemplary embodiment of FIG. 4. Instructions for each of the 4 rows of ALUs are fetched and issued and data is processed within the execution unit (0450):

Instruction i is fetched for row 0 at time t, instruction i+1 is fetched for row 1 at time t+1, . . . , instruction i+3 is fetched for row 3 at time t+3. The next fetch slots starting with i+4 are empty as No Instructions are Fetched (NIF) from time t+4 on. With the completion of the iterations, new instructions of the following multi-cycle kernel are fetched (i+m+1) and subsequently issued and processed from time t+n+1 on.

The ZZYX ALU-Block

FIG. 4 shows an exemplary embodiment of an ALU-Block (AB, 0430) in conjunction with an Instruction Issue unit (0422). The Instruction Issue unit comprises an Instruction Fetch (IF) unit, receiving instruction from an instruction memory, which may be a cache. The according instructions are addressed by a Program Pointer. Additionally an Instruction Decode unit (ID) is part of the Instruction Issue unit (0422). Ultimately the Instruction Issue unit issues new instructions and distributes them to the respective ALUs. An exemplary implementation of the Instruction Issue unit will be disclosed subsequently, e.g. FIGS. 17*a,b,c*.

The Register File

The ALU-Block (0430) comprises a set of registers (0410) holding local data (which may include addresses) to be processed. In a preferred embodiment the set of registers (0410) comprises at least 3 data Register Files: a) FIFO Data Registers (FDR), b) VLIW Data Registers (VDR) and Load/Store Data Registers (LSDR).

FIFO Data Registers (FDR)

The Register File in this exemplary embodiment comprises 16 of the FIFO Data Registers, each of them 32-bit wide.

Each single register (for instance 0401) consist of a FIFO and may operate in one of at least two modes, as single register or as First-In-First-Out memory (FIFO).

Single register means, that a register (for instance 0401) operates as one register instance containing one set of data, comparable to one register of a microprocessor. It is used for sequential processing in microprocessor mode (MIMD, VLIW/superscalar). FIFO means that a register (for instance 0401) operates as First-In-First-Out memory (FIFO) and contains multiple entries of data. It is used for datastream processing (SIMD, matrix, vector, hyperscalar), where a block of data is being processed within the ALU-Block (AB).

The register mode is selectable at runtime and is independent from the processing mode. For example could a FIFO be filled or emptied in VLIW mode, while a single register holds a constant in SIMD, matrix, vector, hyperscalar modes. Typically the operation mode (single register or FIFO) is independently selectable for each of the registers at runtime and may change from cycle to cycle.

All registers in the set of registers (0410) could operate in the same mode. However in the preferred embodiment each register may operate in its specific mode, which is set by an instruction. Typically the following modes are selectable by the instruction:

Single Registers Mode (SRM), in which the specific register operates as a single entry register as typical microprocessor registers do.

FIFO Register Mode (FRM), in which the specific register operates as multi entry First-In-First-Out (FIFO) register. Preferably FIFO flags (such as full, empty, almost-full and almost-empty) are generated, which can be checked via opcodes similar to status signals and can be used for conditional execution or branching. This feature is important for loop control, in particular in Matrix- and/or Hyperscalar mode. Additionally underruns (read if FIFO is empty) or overruns (write if FIFO is full) may generate error states, for example via interrupts or traps.

Limited Length FIFO Register Mode of the length n (LLFRM[n]), in which the specific register operates exactly like in the FIFO mode, but the depth of the FIFO is limited to n stages. The value of n is specifically definable by the respective instruction. This feature is extremely powerful for processing small local loop carried dependences, as described later on. While in FIFO mode typically underrun and/or overrun are regarded as runtime error, in Limited Length FIFO Register Mode they are regarded as normal and typically generate no error condition (e.g. a trap, interrupt or status signal). However according status signals may be produced and/or even interrupts or traps, if required by the program. Registers in Limited Length FIFO Register Mode operate typically like bucket-brigade registers, values are shifted from one register to the next. With every new entry stored in a LLFRM[n] a value may be shifted out, in the preferred embodiment regardless whether it is accepted by a receiver or not.

VLIW Data Registers (VDR)

The Register File in this exemplary embodiment comprises 16 of the VLIW Data Registers, each of them 32-bit wide.

VLIW processors implement data pipelining in a horizontal manner, which means that data streams are pipelined from one horizontally arranged ALU to the next through the Register File. For instance a data word may be transferred in a first clock cycle by processing from a first register R1 through a first ALU A1 to a second register R2, in a second clock cycle it is transferred from R2 through a second ALU A2 into a third register R3, and so on. Thus, a large set of registers accessible in parallel is required for pipelining the data through the ALUs. The set of 16 FIFO registers (FDR) may be too small to satisfy the register requirements in VLIW/superscalar mode. However extending the number of FIFO registers (FDR) is expensive, due to the depth of the FIFOs. Therefore another 16 single register, not comprising FIFOs and with no selectable mode, are added to the Register File.

LS Data Registers (LSDR)

As will be described subsequently, the ZZYX processor supports in a preferred embodiment split load/store transactions. The initiation of the transfer and the selection of the respective data address in the memory are set by a first instruction, LOAD in case of a load transfer and STORE in case of a store transfer. The data transfer is managed by a second instruction, which can be either a) a move opcode (MOV) moving the data from or to a regular register, which is either a FIFO Data Register FDR or VLIW Data Register VDR, or b) a normal ALU operation, such as an algorithmic or logic operation. Normal ALU operations may use LSDR as a) target registers for result data of the ALU operation to be stored in memory and/or b) source registers for operands of the ALU operation being loaded from memory.

Each of the Load/Store units has at least two registers, a read data register (for LOAD operations) and a write data registers (for STORE operations). The registers are preferably named $LS_0 \ldots LS_n$, the index n being the number of the Load/Store unit. The syntax is not distinguished between read and write registers, as the direction of the data transfer is defined by the position of the register in the assembler mnemonic. If an LS register is used as target, it is obviously a write register, while using it as source indicates a read register.

Execution Modes

ZZYX processors may operate in different modes, for example the following modes may be supported:

1. System mode is a protected mode for the operating system
2. Library mode is used by the C library, mainly for faster and simplified parameter passing
3. User mode is the usual program execution mode used for executing most application programs
4. Interrupt (IRQ) mode is used for interrupt handling, mainly to avoid extensive register transfers to or from the stack, while entering or leaving the interrupt service routine. Additionally it may be used for better protection.
5. Instruction Error mode is entered when an Undefined instruction exception occurs, invalid registers are addressed or unavailable resources (such as Load/Store units) are addressed. For further details see the subsequently described Instruction Fetcher.
6. Execution Error mode is entered when execution error exception occurs, for instance stack or FIFO overflows or underruns, or missing TLB entries during translation of a virtual into a physical address. For further details see the subsequently described Load/Store Unit.

Preferably all modes, but the User mode, operate as privileged modes. Privileged modes are used for system protection, for example to access protected resources such as memory or periphery.

For each of the modes a different Register File may be used, which means that by changing the modes the Register File is changed too. This virtually extends the amount of available registers and prevents extensive register transfers to or from the stack, while switching the mode. Saving stack transfers is the major reason for the introduction of the Library mode.

In order to transfer parameters, e.g. between a program and the system or the Library, some registers may be fixed, which means only one set exists and they are not switched between modes. While typically is does not make sense to permit operand passing to an interrupt routine, it may be useful if library functions are called via soft interrupts.

An embodiment of the Register File may look as shown in FIG. 19. The dotted registers (r00-r03) are used for parameter passing and are the same for all sets. A plurality of instances exist of each non-dotted register. Thus an apparently single register comprises a plurality of registers, one register for each of the difference processing modes, of whose one is selected at a time in accordance with the current processing mode by multiplexers and demultiplexers for reading and writing.

The multiplexers/demultiplexers are switched while entering or leaving the specific mode (e.g. Instruction Error or Execution Error).

In the exemplary embodiment of FIG. 19, for example r15 exists 6 times, having 6 hardware instances. The instance is dynamically selected depending on the operation mode. Register r00 for example has only 3 instances, the modes System, Library, User and Interrupt are all using the same instance, while each of Instruction Error and Execution Error has a separate instance.

As the ZZYX processor supports FIFO registers, the FIFO capability may be used to increase the register depth for passing parameters. While a standard processor register can only hold one value at a time, FIFOs may pass an amount of parameters according to their depth. Assuming 16 entries deep FIFOs are implemented r00-r03, according to FIG. 19, may pass up to 64 values. Practically by using FIFO mode for parameter passing, the number of parameter passing registers could be reduced to a single one.

Processor Models and Data Path

The two different modes reflect the set of processor models of the ALU-Block (AB):

In MIMD mode (according to FIG. 3a) and VLIW/superscalar mode (according to FIG. 3c), typically the registers of the set of registers operates as single registers.

In SIMD modes, matrix mode (according to FIG. 3b), vector mode (according to FIG. 3d), and hyperscalar mode (according to FIG. 3e) typically the registers of the set of registers operates as single registers.

It is explicitly mentioned, that the register mode is selectable at runtime separately for each of the registers and is independent from the processing mode. For example could a FIFO be filled or emptied in VLIW mode, while a single register holds a constant in SIMD, matrix, vector, hyperscalar modes. Typically the operation mode (single register or FIFO) is independently selectable for each of the registers at runtime and may change from cycle to cycle.

The set of registers (0401) is the first stage of the data processing pipeline within the ALU-Block (0430).

In this exemplary embodiment of the ALU-Block 4 stages (also referred to as rows) of ALUs (0411, 0412, 0413, and 0414) are embedded, each stage comprising 4 ALUs. Thus in this exemplary embodiment an ALU-Block comprises an array of 4 by 4 ALUs. It shall be explicitly mentioned that there is absolutely no limitation in the number of ALUs per ALU stage vs. the number of ALU stages per ALU-Block. Any ratio between stages of ALUs and ALUs per stage can be implemented depending on the requirements of the processor's target market and applications, based on cost and performance considerations.

Each ALU of a row receives operand data from the stages above. This includes the output of the Register File and all ALU stages above the row. Each ALU (for instance 0404) comprises input multiplexers to select the source for each of its operands. The operand selection by the operand input multiplexers is independently set by the instruction for each of the ALUs and each of the operands. The operand multiplexers of each stage are indicated by 0402, which comprises in this exemplary embodiment a total of 8 independent operand input multiplexers, 2 independent operand input multiplexers for each of the 4 ALUs (0404).

Depending on the target frequency of the ALU-Block one or more pipeline register stage(s) (0403) may be implemented in front, behind and/or within the operand input multiplexers in order to trade off the signal delay of the multiplexers vs. additional the latency of the register.

Preferably one or more pipeline register (0405) for pipelined data processing is implemented behind and/or within each ALU in order to increase the operation frequency of the ALU-Block.

In a special embodiment the some or all pipeline register stages (0403, 0405) may be runtime selectable bypassable, either by using bypass busses and multiplexer or implementing the registers as latches. This embodiment allows to trade of latency vs. operation frequency at runtime, depending on the temporary setting of the bypass or latch. While for typical algorithms (such as DCT, FFT, and traditional processor code) higher operating frequency equals (means strict use of the pipeline registers) to higher performance, for very sequential some algorithms (such as CABAC) it might be beneficial to operate at a lower frequency without pipelining.

Each of the ALUs is capable to write its result back into the Register File (as indicated by the arrow 0406) according to the instruction.

In this exemplary embodiment each ALU stage (or row; note: both terms are equivalently used) (0411, 0412, 0413, and 0414) separately receives its instructions defining the operation of each of the ALUs, the input operand multiplexers and the target register of the result from the Instruction Issue unit (0422), indicated by the arrows 0420. While in this embodiment each stage receives its instructions separately and independently of the other stages, in another embodiment the Instruction Issue unit may issue the instructions to all ALU stages simultaneously.

Each ALU stage may send status information (indicated by the arrows 0421) to the Instruction Issue unit (0122). The status information may indicate the operation status of an ALU stage, send flags (for example for conditional processing), indicate its readiness to receive new instructions or the request for new instructions. The list is exemplary, ultimately the type and amount of status information provided by an ALU stage to the Instruction Issue unit will depend on the processor and software model, the implementation of the ALU-Block and Instruction Issue unit, driven by the requirements of the processors target market and applications.

As said each of the ALU stages (0411, 0412, 0413, and 0414) receives its instruction independently in this exemplary embodiment. Typically the ALU stage 0411 receives its instruction first, in the next clock ALU stage 0412 receives its instruction, in the next clock cycle 0413 and then 0414. After that, the Instruction Issue rolls over and may start with 0411 again. This Instruction Issue sequence is preferably in accordance with the dataflow direction within the ALU-Block and indicated by the arrow 0423. The timing of the Instruction Issue depends on the algorithm execution and may be driven by the status information (0420) provided by the ALU stages. Conditional instruction issue is possible. In some embodiments instructions may be issued for a group of ALU stages, a specific ALU stage or even a single ALU only. Out of order Instruction Issue may therefore be possible in one embodiment to increase the flexibility of the ALU-Block operation.

Furthermore the mode in which the registers (0401) of the Register File (0410) operate is set by an instruction sent by the Instruction Issue unit. It is typically set prior to the issue of the instruction for the first ALU stage (0411). This allows starting operations within the ALU-Block immediately after the first ALU stage has received its instructions, which increases the efficiency of the pipeline (when at least some of the pipeline registers stage (0403 and 0405) are implemented and switched on).

While all ALUs could get their operands directly without pipeline register stages and therefore latency-free from the (Register File), preferably pipeline registers are inserted at each pipeline stage of the data path. For example, pipeline registers are inserted at least at the level of each of the pipeline stages 0403 and 0405.

Operand Forwarding

As said it is possible and even the typical mode of operation to forward the result of one ALU to the operand input of another ALU. In a preferred embodiment this operand forwarding is strictly limited to the dataflow direction within the ALU-Block, which is according to FIG. 4 from top to bottom. ALU stage 0413 is able to derive its operands from the Register File and all ALU stages above, which are 0411 and 0412. It is typically not possible to receive operand data from the result outputs of stages below. Equally it is not possible to receive operand data from the result outputs of any ALUs within the same ALU stage.

Timing and Protocols

Traditional processors of the previously described types have fixed execution times in terms of clock cycles for each of the instructions. Execution times vary only depending on wait cycles. Instruction fetch, decode and execution happen in a predefined and fixed timing. Inside the execution pipeline, execution occurs in fixed steps, again driven by clock and potential wait cycles. It is implicit to these processors, that all data required for an operation is available at the according processing units.

The execution models of the ZZYX processor are far more complex. 1. As previously described the execution of loops is supported inside the ALU-Block. The termination of such loops may be computed at runtime and may not be predefined and/or deterministic at compile time and/or even at Instruction Issue (fetch and decode) time. Therefore the execution status inside the ALU-Block has to control the Instruction Issue unit, new instructions can be issued only after the execution inside the ALU-Block has terminated. 2. The ZZYX architecture is optimized for pipelining and vectorization. Ideally memory is accessed in a pipelined manner, which supports the continuous generation of addresses, if the algorithm supports decent independence between the address generation and reception of loaded data delivered from the memory. (It shall be mentioned that various optimization strategies for compilers are known for increasing the independence between address generation and loaded data.) Such execution models perform best if variable latencies are supported.

3. Complex graphs are mapped onto the ALU-Block, or even multiple ALU-Blocks. The availability of data and the timing within such graphs is almost impossible to predict, in particular if multiple data sources are driven by external devices such as memory or periphery. In particular to enable chaining of multiple ALU-Blocks handshake protocols for the data transmission and/or valid flags for memory or register locations are extremely useful in order to avoid complex control and/or state machines.

Optional Handshake Protocols

The ZZYX processor may be controlled by handshake protocols between data senders and receivers. Any data source, such as an ALU, a register, a memory, an interface port, or others may be sender and any data sink, which is typically one of the same list of devices, may be a receiver. Any type of handshake protocols may be implemented; a vast amount of such protocols is known in the state of the art, Ready/Acknowledge, Request/Grant, Valid/Busy, or intermixed types, just to list a few. Most of these protocols are easily applicable, however it is preferred to implement such a protocol which supports data transmission at each clock cycle, without disturbing the execution pipeline by bubbles or stalling. Ultimately the protocol drives the processor, for instance by loop control, synchronization of load/store memory accesses, or the instruction issue.

Therefore timing is rather driven by the handshake protocols than by the clock. While surely the clock synchronous implementation of the processor is the most preferred embodiment, asynchronous and solely handshake driven implementations are feasible.

Handshake protocols require additional hardware: a) Small state machines are required for each data transmission link; and b) the data link itself requires additional registers to buffer data, in case the receiver is not able to accept the data (for example not Acknowledged, or not Requested, or Busy, depending on the protocol). Furthermore handshake protocols can cause timing problems and limit the processors maximum frequency.

Internally Non-Synchronized Data Path

To reduce hardware overhead, the preferred embodiment does not implement handshake protocols inside the ALU-Block. The core operates based on the requirement that all necessary input data for the computation inside the ALU-Block is available from the sources and that the produced result data is acceptable at the targets. Sources and targets may be the Register File, memory or periphery. The compiler—or programmer, depending on the level of abstraction—is scheduling the instruction based on a predefined timing model in accordance with the hardware implementation. If at runtime one of the availability conditions of source data or acceptability of result data is not met, either wait cycles are inserted by a state machine or current executions are invalidated. Registers in FIFO Mode (FRM or LLFRM[n]) and other FIFOs in the processor may use either valid flags or level indicators (such as e.g. empty, almost-empty, almost-full, or full flags), indicating the availability of output data or the readiness for new input data. The flags will drive the state machine, which will when necessary generate wait cycles, either for the whole processor or just the parts being impaired the current FIFO status.

Consequently the ALU-Block operates in a kind of capsule. Outside the ALU-Block all data must be available for the internal processing. If not, the internal ALU-Block operation is stopped, e.g. by inserting a wait cycle, by gating the clock and holding all intermediate data in the internal pipeline register stages, for example 0403 and 0405. As the availability of data is checked outside the ALU-Block capsule using validity, availability and/or handshake protocols, inside the ALU-Block capsule no handshake protocols are required. However for implementation of local loop-carried dependences as described subsequently a simple valid flag may be attached to data inside the ALU-Block capsule.

Figure 13:
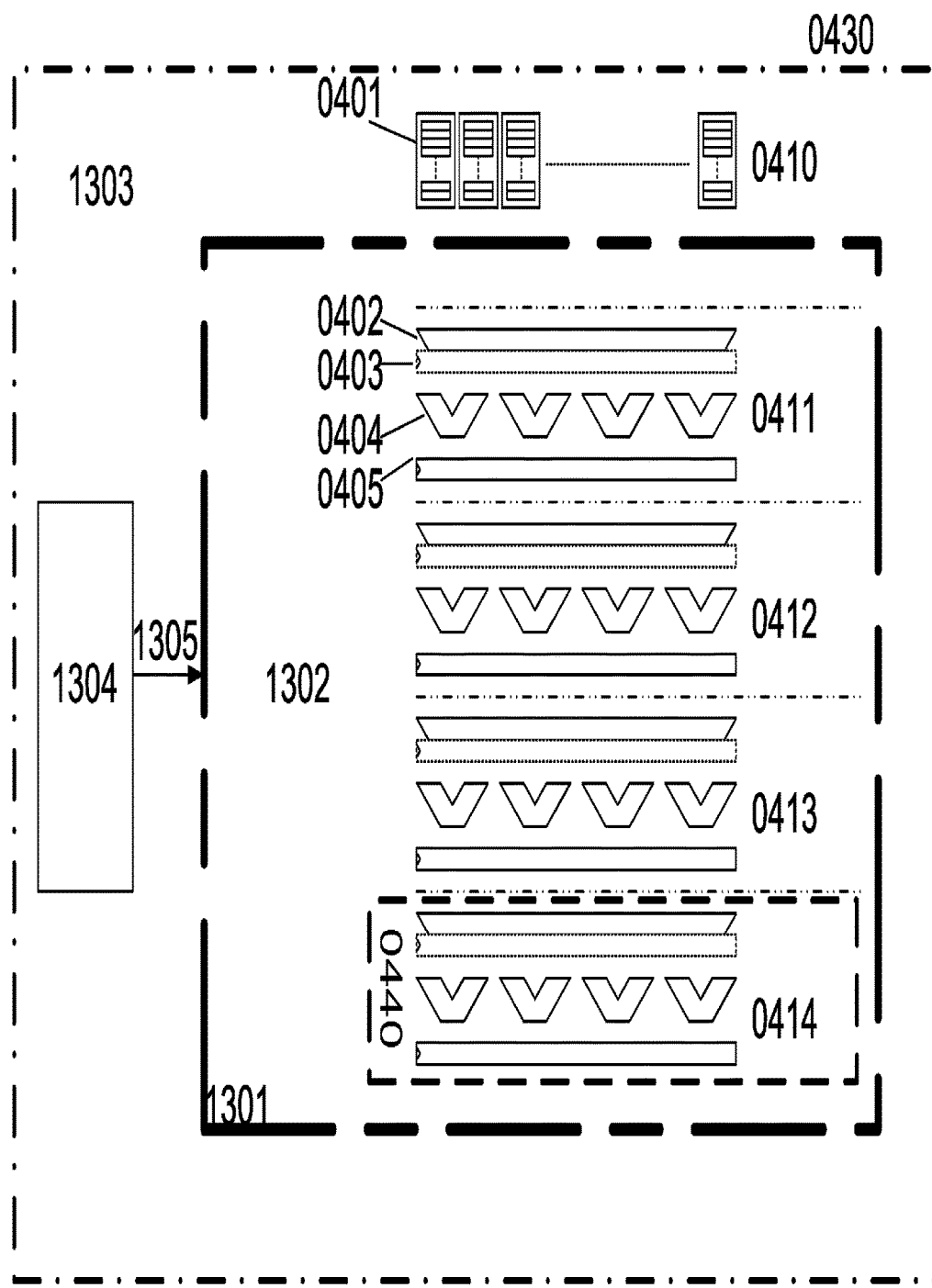
FIG. 13 is a block diagram showing an example of encapsulation of an ALU-block.

FIG. 13 shows the encapsulation of the ALU-Block. The capsule 1301 surrounds the ALUs inside the ALU-Block, but not the external units and the set of registers (Register File) (0410). Inside (1302) the capsule 1301 all data transfers occur only clock driven and are not handshaked, but can comprise valid flags to indicate the validity of operand and/or result data. Outside (1303) the capsule (1301) a statemachine (1304) controls the availability of operand data from senders, the ability of receivers to accept result data and eventually the validity of data. Only if all conditions are met, the operation inside the capsule is enabled (1305), which may happen via an enable signal and/or by switching on the capsule internal clock.

The valids are preferably handled such, that in case a valid is missing at an ALU input within the ALU-Block, the operation of the whole ALU-Block, which means all ALUs inside, is stopped until the valid is set.

Some ALUs may support multi-cycle operations, such as sequential division or simply pipelined operations, as a pipelined multiply. Those ALUs however preferably continue operation until the result is produced. This is essentially necessary as the missing valid, stopping the operation within the ALU-Block may be exactly the result of such a multi cyclic operation. If the operation would be stopped too, no result will be computed and the ALU-Block is deadlocked.

Sometimes it may be beneficial to provide access, e.g. to periphery and/or load/store units independently for each of the ALU-Block stages (0411, 0412, 0413, 0414). In this case, when each stage interacts directly with external resources not one single capsule may be drawn around all the ALUs together in the ALU-Block, but each stage may be separately encapsulated.

Watchdog

For various reasons it is possible that not all required valid flags become valid, and the ALU-Block stalls forever or an extremely long time. For instance the periphery or memory may not deliver data or may not be able to accept new data, or simply a programming error may have occurred, e.g. by reading from, or writing to a wrong address or device, or checking the wrong valid flags.

To avoid processor stalls, a supervising instance may be implemented, for example a watchdog. After stalling for a specific amount of clock cycles (which may be defined by the software, e.g. the operating system), the supervising instance may trigger an event, for example an interrupt, processor exception or trap. The event returns the operation to the operating system, e.g. via an interrupt or exception handler. The operating system or task scheduler can transfer operation to another task and/or start error recovery routines. Alternatively or additionally the event can be monitored and handled by debugging tools, such e.g. allowing the programmer to analyze and correct the faulty code and/or state.

ALU-Block Timing, FIFO Control

Figure 20:
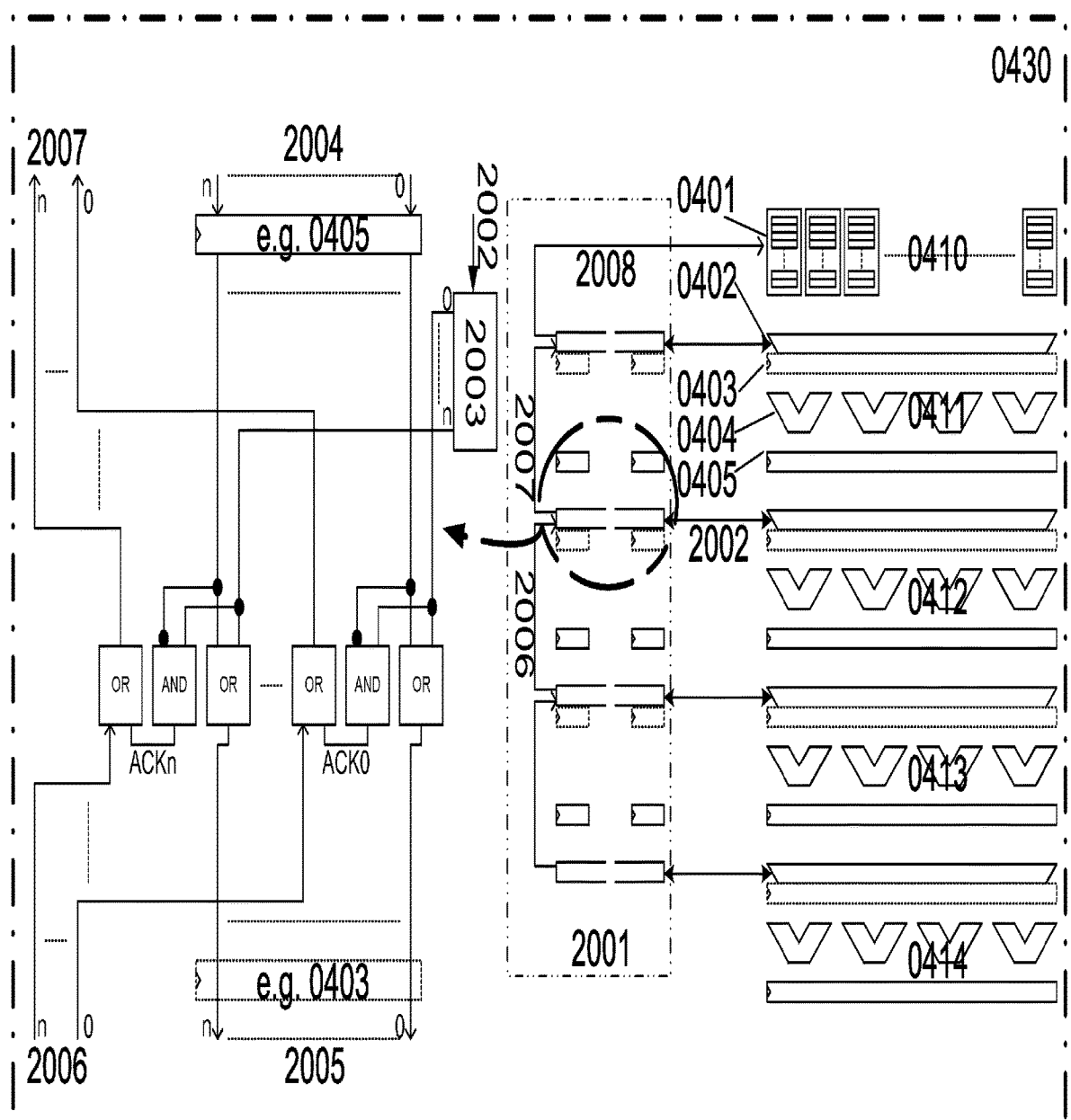
FIG. 20 is a block diagram showing an example of an ALU-block, ACK generation chain, and stages of a processor.

In difference to usual Register Files, the FIFO registers need additional read information for moving the read pointer. All function units accessing a FIFO register must produce a read signal (RD) to confirm the read operation and to move the read pointer. As shown in FIG. 20, regardless of the ALU stage producing a read signal (RD), it is preferably transmitted asynchronously, without any register or pipeline stage, back to the according FIFO register (e.g. FRM or LLFRM[n]).

FIG. 20 additionally shows the ACK generation chain of the ALU-Block according to FIG. 4.

The exemplary ACK generation chain (2001) is implemented in parallel and orthogonal to the datapath. For each stage the operand multiplexer selection (e.g. 2002 for stage 0412) is decoded by a decoder (2003) to detect a register access. The detection is OR-chained for each register with the detection of the previous stage (2004) and forwarded to the following stage (2005). The respective signals are pipelined in exact accordance to the data path pipeline (e.g. 0405, 0403). To generate a register ACKnowledge (e.g. ACKO for register r0, ACKn for register n) the detection is combined with the detection of the previous stage (2004) such that the result is active only if the previous stage has not detected the selection of the respective register, and the current stage has detected the selection of the register, which may be implemented by an AND-gate with one negated input. This function is particularly important, as the register contents are pipelined through the datapath.

For example assuming each stage has exactly one pipeline delay, stage s may access register r at time t and the subsequent stage s+1 may access the same register r at time t+1. Due to the pipeline, both registers access exactly the same value. However, as the detection of the register selection differs by one clock cycle, the selection would be detected twice, two ACKnowledges would be generated and the read pointer of the FIFO Data Register (e.g. DRM or LLDRM[n]) would incorrectly move 2 steps ahead. The combination of a currently detected register selection with a detected access upstream the pipeline prevents the double-generation of the ACKnowledge. Via an OR gate, the generated ACKnowledge is combined with the incoming ACKnowledge from the downstream stages (2006) and asynchronously send upstream (2007), possibly through further stages up to the ACKnowledge input of the FIFO Data Registers (2008).

Furthermore the timing of data from the Register File inside the ALU-Block has to be defined. In order to keep the software model in line with the usual concepts and programmer's views, values from the Register File are pipelined through the ALU stages. For example, at clock t the entry n of register r of the Register File is available at stage 1. Assuming this ALU reads the data and releases a read signal (RD), at clock cycle t+1 the entry n+1 of register r is available at the first stage. At this clock cycle (t+1), the register's entry n is available at the second stage. Again the data is read and a read signal is generated by the first ALU. In cycle t+2 the register entry n+2 is available at the first stage, the value n+1 at the second stage and n at the third stage. And so on.

This works perfectly well, unless multiple ALUs in different stages read the same data word. Multiple read signals would be produced, likely destroying the data in the FIFO. For example at time t an ALU of stage 1 reads the register r, at point t+2 another ALU reads the same register r in stage 3. Both ALUs will produce a read signal, which could cause the FIFO read pointer to move twice and skip one data word in the FIFO. While this might be no issue, if both ALUs read the register at exactly the same time, problems may occur when the pipeline fills or flushes, or if some of the read operations are conditional.

A similar problem occurs, when register entries are conditionally read. It has to be defined whether a read signal is produce under any conditions and the data entry is consumed in any case, or whether read signals are only produced if the condition is true and the data word is actually processed. The conditional execution may confuse all subsequent ALU stages as the value of the register will depend on the conditional execution, which may not be, and actually will in most cases not be, inline with the semantics of the program.

In order to avoid the corruption of the FIFOs during pipeline fills, flushes or conditional operations a token (ALREADY_READ) is attached to each register entry passing through one of the ALU-Block pipelines, indicating whether the value has actually been read (means a read signal (RD) has already been produced an transmitted to the FIFO). If the register entry is read once again at a later ALU stage, the generation of the read signal (RD) will be suppressed if the token ALREADY_READ is set.

As in particular dataflow operations are efficiently implemented on the ALU-Block, some dataflow related issues may appear. For instance require some dataflow operation different handling of the read signal (RD):

For example, a multiplex operation (MUX) is multiplexing two data streams. According to the data flow semantics of MUX either the data word of the first or of the second input passes through to the output, depending on a condition. The not selected input is discarded. This means a read signal (RD) is issued to both input registers, the selected and the discarded one.

For example, merge or sort operations (MERGE, SORT) are merging or sorting two data streams. According to the data flow semantics either the data word of the first or of the second input passes through to the output, depending on a condition. The not selected input is not discarded but stays in the register. This means a read signal (RD) is only issued to the selected input register but not to the not-selected one.

This leads to another consideration. The implementation of data-flow operation depends on the ALU-Block internal synchronization, which means whether it operates handshake driven or non-synchronized (as previously discussed). Handshake controlled ALU-Blocks can implement dataflow operations as previously described, even if the data sources are operands forwarded from results of upstream ALUs; non selected data tokens are not acknowledged and remain in the output register of the upstream ALU. However in non-synchronized implementations, only the discard semantics can be implemented, if the data sources are operands forwarded from results of upstream ALUs. As no handshake is available, the data tokens simply will pass through and eventually vanish. Only for data sources directly from the Register File, non-discard operations are possible as the read signal can be suppressed, such blocking the read pointer.

The decision has to be made at design time of a ZZYX processor, whether it is acceptable to limit such dataflow operations to operand inputs from the Register File only, allowing a non-synchronized ALU-Block; or whether such dataflow operation are frequently used by the applications and should support forwarded operands from upstream ALUs too. The trade off has to be made versus the hardware overhead required to implement handshake protocols.

ALU-Block Timing, Instruction Issue

An important feature of the ZZYX architecture is the capability to issue instructions to one or more stages of the ALU-Block, while at least one other ALU stages are operating. A new instruction may be issued to one stage, while the others are processing data. One common type of issuing instructions to at least one of the stages of the ALU-Block, while other stages are operating, is while filling or flushing the pipeline inside the ALU-Block. For details see FIG. 3e.

Basically in modes such as Matrix or Superscalar instruction issue rolls through the ALU-Block with a leading data processing "wave" of the previously issued instructions still being processed in the ALU stages below/downstream the current instruction issue and a trailing wave above/upstream the current instruction issue of data processing of the newly issued instructions. For example:

At time t:
ALU stage 0: processing multi-cycle kernel m+1
ALU stage 1: issuing code for multi-cycle kernel m+1
ALU stage 2: processing multi-cycle kernel m
ALU stage 3: processing multi-cycle kernel m
At time t+n:
ALU stage 0: processing multi-cycle kernel m+1
ALU stage 1: processing multi-cycle kernel m+1
ALU stage 2: issuing code for multi-cycle kernel m+1
ALU stage 3: processing multi-cycle kernel m This overlay between execution and data processing requires precise synchronization. Two main issues have to be regarded:

1. Instructions can only be issued to those stages which have terminated the previous operation.
2. No data from a newly loaded stage may travel (as operands) into an old stage.

A termination signal stage_terminated is transmitted downstream together with the processing data along the pipeline stage of the ALU-Block.

Stage_terminated is programmably generated on the basis of e.g.
 i. Register file information, e.g. FIFO empty for operand registers or FIFO full for result registers;
 ii. IO and external memory information, e.g. end of data block, end of transfer;
 iii. the termination criterion of a loop control, indicating the last loop iteration (TCC_terminate).

Stage_terminated indicates the last data to be processed at a specific ALU-Block stage. If a set stage_terminated signal is received by a ALU-Block Stage, the respective stage can/will be loaded with a newly issued instruction from the Instruction Issue Unit in the next clock cycle.

Details of the generation of stage_terminated will be described subsequently.

It shall me mentioned, that overlaying execution with reconfiguration is known in the prior art, e.g. as wave reconfiguration in the patent application WO 00/77652 A2, PCTIDEOO/01869. However wave reconfiguration proved impracticable for a few reasons: The dataflow of reconfigurable devices has no preferred direction. Therefore it is impossible to actually establish the wave in the array. It was undefined how many ALUs will terminate operation at a specific clock cycle. As the configuration load unit was only able to load one configuration at a clock cycle, efficient reconfiguration was not possible. Furthermore, as any random pattern of ALUs could terminate, mapping of the subsequent configuration, while maintaining a working interconnection structure, was impossible.

The execution-instruction-issue overlay method in the ZZYX processor overcomes the prior problems. Dataflow has a preferred direction such allowing for efficient removal of the prior instruction and issuing of the new instructions while maintaining a working interconnection network. Termination of operation and instruction issue, which means the overly sequence, does not occur in a random pattern but based on a fixed frame and timing of an ALU stage (or at least a fixedly defined part of an ALU stage). The overlay runs in a fixed, predefined direction, which is typically the same as the preferred data flow direction, greatly simplifying the selection of the opcodes and addressing the target ALUs, such enabling efficient pipelined (pre-)fetching of the opcodes. The Instruction Issue unit is able to supply a whole ALU stage/row (or at least a fixedly defined part of an ALU stage) with new instructions at every single clock cycle, thus making the overlay fast and efficient.

Linking the ALU-Blocks

Figure 8:
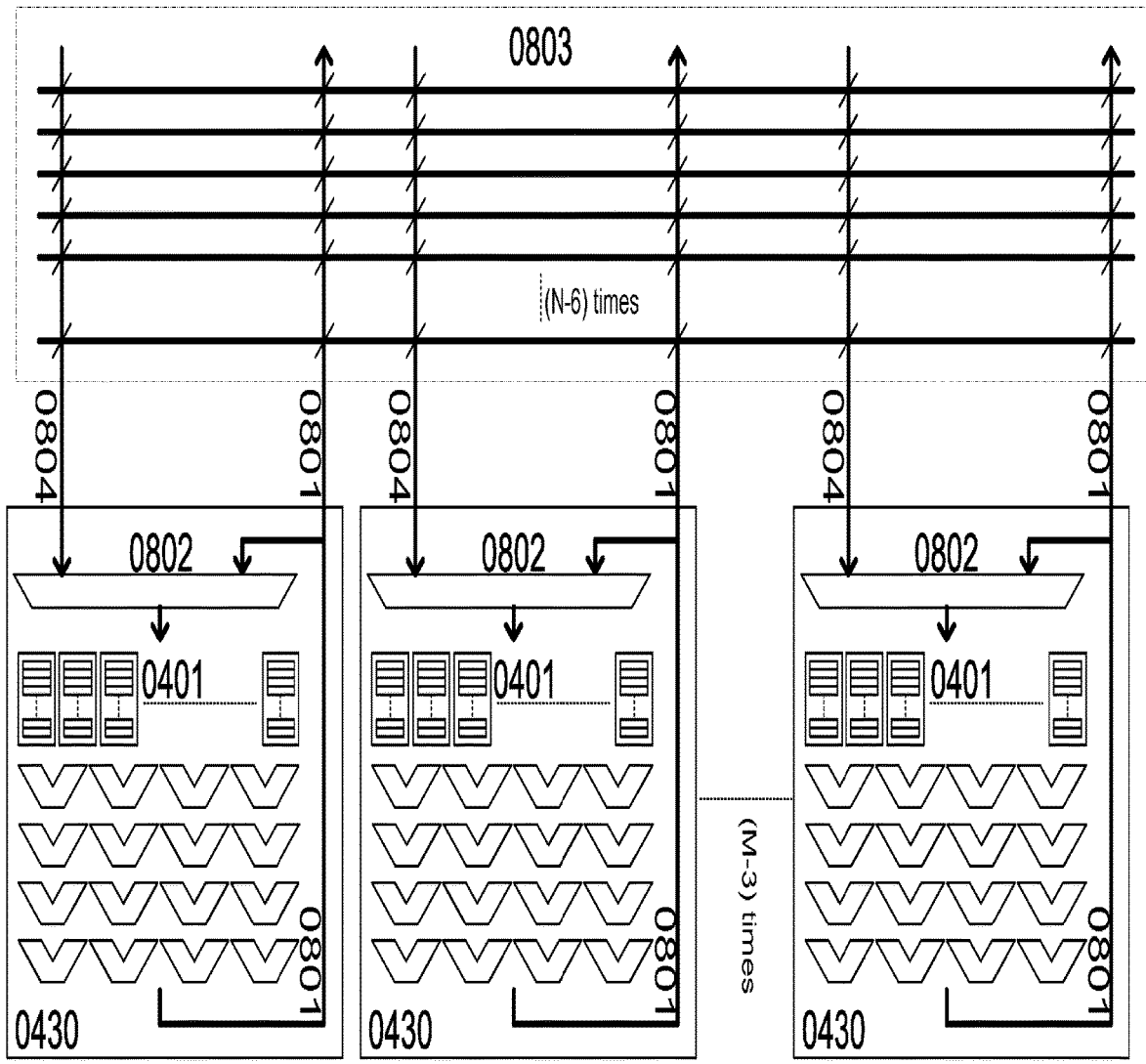
FIG. 8 is a block diagram showing an example interconnection of multiple ALU-Blocks and their internal structure.

FIG. 8 shows the interconnection of multiple (M) ALU-Blocks and details of their internal structure.

The data processing results of an ALU-Block (0430) is fed back to the set of registers (0401) via a bus structure (0801). As previously described, this bus preferably runs a handshake protocol to ensure the correctness of the data transfers and the timing. The bus structure (0801) is connected to multiple multiplexers (0802) selecting the source data for each of the registers within the set of registers (0401). Note, although only one multiplexer is shown, the symbol shall indicate multiple multiplexers, one for each of the registers in the set.

Furthermore the bus structure (0801) of each of the ALU-Blocks (0430) is fed to a global interconnection system (0803), which allows the forwarding of results from the bus structures (0801) of sending ALU-Blocks (0430) as operands via busses (0804) to receiving ALU-Blocks (0430).

The previously described multiplexers (0802) select between results of the own ALU-Block and results being forwarded from other ALU-Blocks via the interconnection system (0803) specifically for each of the registers within the set of registers (0401). Various implementation of the interconnection system (0803) are possible. It can be for example implemented based on crossbar switches or even complex bus structures and protocols. However it simple, area efficient and fast implementations are preferred, such as a multiplexer structure.

The interconnection system (0803) transmits data and control information such as status signals between the ALU-Block, such allowing split control of complex control flow graphs.

Furthermore the interconnection system (0803) runs bus protocols as previously described. Typically the same protocol as implemented inside the ALU-Blocks and the bus structures (0801) are implemented.

An important aspect of the interconnection system is its complexity and signal delay. While the interconnection system might be small and timing efficient for small amounts of ALU-Blocks it can become complex for larger systems, and therefore generating significant delay in data transmission. To avoid negative impact on the overall clock frequency of the ZZYX processor, such larger interconnection systems transfer data therefore preferably pipelined. Pipeline registers may be inserted within the interconnection system at any location suitable from a design point of view.

Said protocols implicitly support efficient and correct data transfers via pipeline registers.

While the clock frequency will increase by pipelining also latency will go up. However as ALU-Block are preferably concatenated for processing of large graphs with high data independence (such as such loops comprising loop-carried dependences) latency has almost no negative impact on the performance but delaying the first results processed by a few clock cycles. Subsequent results are produced at each clock cycle.

Loop-Carried Dependences

Loop-carried dependences limit the achievable parallelism, both within the loop body and between loop iterations significantly. The best strategy is to avoid loop-carried dependences already in the algorithm and software design. However, some algorithms cannot avoid loop-carried dependences by definition and poorly written software inserts unnecessary dependences.

At compiler level, various methods for analysing and optimizing, which means removing, loop-carried dependences are known in the state of the art.

However, even in the best case only loop-carried dependences inserted by poor software design can be removed by the compiler. Those being implicit in the algorithm are not removable.

Part of the invention is to provide a new approach for handling loop-carried dependences by hardware support and according optimizers for high level language compilers such as JAVA, C, C++ or Fortran.

FIG. 10 explains the basic approach to the optimization. FIG. 10a illustrates the basic problem. A loop graph contains 8 nodes, the execution time is shown based on t clock cycles. A loop-carried dependence (1001) exists between the first node of the loop and the last node of the loop, which means the execution of the node alpha ($\alpha$) requires the result of node omega ($\omega$) as an operand. Clearly the execution of the second loop iteration stalls until the result of $\omega$ is computed and transmitted to $\alpha$.

It is assumed the loop-carried dependence cannot be removed from this exemplary graph. Based on several optimization strategies, as will be explained afterwards, the graph shall be optimized in a way, that the dependent nodes $\alpha$ and $\omega$ are located as close together as any possible. In the optimum case a is located behind $\omega$ in the graph. This rearrangement allows for transmitting the loop-carried dependence in via a smaller distance, which is directly related to a lower number of clock cycles required in a pipelined implementation of the ALU-Block. The optimum optimization result would generate a graph in which the distance between $\alpha$ and $\omega$ (distance=$p(\omega)-p(\alpha)$=position of $\omega$ minus position of $\alpha$) is 1 or only little more. This enables to transmit the loop-carried dependence in a small vicinity within the hardware. It is not preferred to get a negative distance, where $p(\omega)$ (the position of co) is higher in the graph than $p(\alpha)$ (the position of $\alpha$) (see for example FIG. 10c), as this will not remove all stalling cycles.

It is also not preferred to get a distance much larger than 1 as the large distance will create at least the following issues:
1. By mapping the graph onto the ALUs insider the ALU-Block hardware, the additional distance in the graph will result in additional physical distance on hardware, which may result in additional signal delay or latency, which will lead to stalling cycles.
2. If the distance is large, a and co may be in different ALU-Blocks, creating even more signal delay. Even worse, if only one ALU-Block is available in a specific ZZYX processor, the result of $\omega$ will never be available on the input of $\alpha$, as $\omega$ is not even computed. This will cause a dead lock as the loop Loop-Segment will never terminate.

As it may not be for sure that such compiler errors or bad optimization results can be avoided, special precaution in the processor design is required. For example a watchdog can detect such dead lock situation simply by a time out, or the Instruction Fetcher can already recognize the unconnectable input of a and can limit the loop iterations for the respective Loop-Segment and the according loop (which means all Loop-Segments in that loop) to 1. By limiting the loop Loop-Segment iterations (#LS) to 1 it is guaranteed that the result of a is available at $\alpha$ in each iteration.

Figure 11:
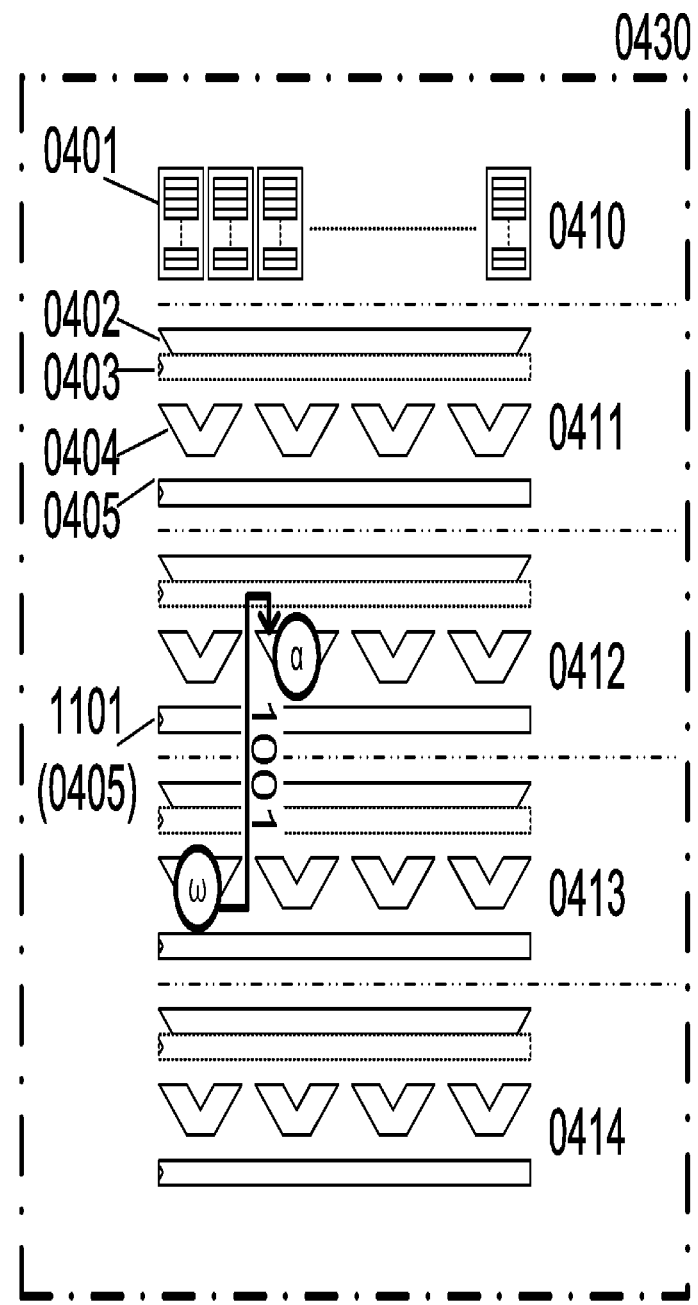
FIG. 11 is a diagrammatic illustration of an example of one placed node fed to another placed node in ALUs of a processor.

FIG. 11 shows an exemplary case. o is placed onto the first ALU of the third stage, a onto the second ALU of the second stage. The result of o is fed to a (1001). To avoid timing violations the feed implements a register, which may be part of the pipeline register 1101.

The apparent contradiction to the fixed data flow direction inside the ALU-Block shall be noted and explained: Still the data flow direction within a graph is strictly in one direction. Only loop-carried dependences can (and preferably even shall) be transferred in the direction opposite to the fixed data flow direction.

In summary the preferred optimization shall be such, that the distance between $\alpha$ and $\omega$ is 1 (distance=$p(\omega)-p(\alpha)$=1). If such an optimization cannot be achieved, the absolute value ($|p(\omega)-p(\alpha)|$) of the distance shall be as close as possible to 1, while a positive distance is preferred ($p(\omega)-p(\alpha)>1$).

Various methods and algorithms to rearrange a and $\omega$ within a graph are known and applicable.

For instance is it possible to move code which computation does not depend on a in front of a in order to shift a down in the graph. Likewise it is possible to move code which computation does not depend on co behind co in order to shift co up in the graph. Mathematical graph theory provides several methods to rearrange graphs in order to reduce the distance between $\alpha$ and co.

FIG. 12 shows the execution of two exemplary Loop-Carried-Dependences on an exemplary ALU-Block (0430).

An ALU (1201) of an ALU stage (e.g. 0404) inside an ALU-Block (0430) in FIG. 12a comprises a loop-carried-dependence via the feed-back (1202) and multiplexer (1203) from the output register (1204) to the input of the ALU core (1205). This type of loop-carried-dependence is often used in Digital-Signal-Processing (DSP) algorithms and mathematics for e.g. Accumulations or Series Expansion, such as e.g. Fourier Transformation. It is preferred to support such local loop-carried-dependences directly in hardware within each of the ALUs by having a feedback from the output register. The output register may be a pipeline stage 0403.

The implementation is highly efficient as there is no timing penalty for this local feedback loop and compilers can efficiently map accumulators onto this architecture.

The main issue with the implementation is the introduction of local context inside the ALU-Block, which is held in the register (1204). There is no negative impact during the execution of an inner loop, but after termination the local context in the register (1204) has to be saved and restored whenever the data is required during further processing, e.g. when the next iterations of the loop are being processed as described e.g. in FIGS. 5 and 6.

One approach is to save the register by a dedicated instruction which is issued and executed directly after the termination of the instruction using the register (1204), e.g. by a PUSH or STORE instruction and restore the register in front of further processing by a POP or LOAD instruction. However those additional instructions require additional execution time and increase the code size, which makes this approach inefficient.

It is therefore preferred to write the result during execution and at each cycle into a register (1210) of the Register File (1211) (analogous to 0410 of FIG. 4). The shown Register File (1211) comprises multiple registers (see 0401), which may operate in Single Register (SRM) or FIFO (FRM) or Limited Length FIFO (LLFRM) Mode, indicated by the dashed lines within each of the registers. Register 1210 is set for Single Register Mode (SRM) and stores exactly one value. Therefore all results derived from the register 1204 are overwritten, but the last one. The result from ALU output register 1204 is fed to the Register File register 1210 via the ALU-Block internal network (1206) and may be fed through pipeline stages (e.g. 0403). The value in register 1210 can now be treated as any other register value, e.g. spilled vs. the memory hierarchy or unloaded/loaded (pushed/poped) vs. the stack in case of a context switch.

At a LLFRM depth of 1, each new entry in the register 1210 overwrites the previous value.

At start up of a new loop, the register 1210 is preloaded with the start value of the accumulation, which is typically zero (0). At restart of the loop, the previous result must be available in the register 1210.

The register 1210 is fed to the ALU (1201) of an ALU stage via an ALU-Block internal bus (1207) and also may be fed through pipeline stages (0403). At start up or restart the value of register 1210 is fed to the input of ALU 1205 via the multiplexer 1203. A ticker 1208 controls the multiplexer such, that at the first clock cycle of the execution of a newly issued instruction the multiplexer selects the value from 1210 as input for ALU 1205 and subsequently the feedback 1202 from register 1204. The ticker 1208 can be implemented easily by a small state machine or a counter. The preferred embodiment is using a counter as will be explained in FIG. 12b.

The ALU (1201) inside an ALU-Block may get input data (1230) from other ALUs inside the ALU-Block or from the Register File (1211). The result (1231) of the ALU (1201) of an ALU stage may be used by other ALU-Block ALUs within the ALU-Block or be written into further registers of the Register File (1211).

FIG. 12b shows another example for solving a loop-carried dependence inside the ALU-Block. Instead of a local loop inside a single ALU inside an ALU-Block, the result of an ALU (1201b) downstream in the ALU-Block is fed-back to an ALU (1201a) upstream in the ALU-Block. The ALU 1201 of the ALU-Block, 1201a and 1201b are exactly the same, only the multiplexer 1203 and the ticker 1208 are not shown in 1201b. The result of the ALU 1201b inside the ALU-Block is fed-back (1220) via a pipeline register (1221) to the input of the ALU 1201a inside an ALU-Block. The pipeline register 1221 is typically part of the pipeline stage (0403) between the ALU-Block rows, but transmits in the inverse direction.

The result of the ALU 1201b inside the ALU-Block is written into a register (1222) of the Register File (1211) (analogous to 0410 of FIG. 4).

Register 1222 is set for Limited Length FIFO Register Mode of the length (depth) 2 (LLFRM[2], indicated by the single vertical dotted bar) as will be subsequently described and stores exactly 2 values. Therefore all results derived from the register 1204 are overwritten, but the two most recent ones. The result from ALU output register 1204 is fed to the Register File register 1222 via the ALU-Block internal network (1206) and may be fed through pipeline stages (e.g. 0403). The value in register 1222 can now be treated as any other register value, e.g. spilled vs. the memory hierarchy or unloaded/loaded (pushed/popped) vs. the stack in case of a context switch.

At a LLFRM length (depth) of >1, each new entry in the register 1222 initiates a shift operation and the value from the first registers is shifted into the second, the value of the second is shifted into the third (if the depth is >2) or either transmitted to a receiver or discarded (if depth=2), and so on.

At start up of a new loop, the register 1222 is preloaded with the start values of the accumulation, which are typically zero (0). At restart of the loop, the previous results must be available in the register 1222.

The register 1222 is fed to the ALU (1201) inside an ALU-Block via an ALU-Block internal bus (1207) and also may be fed through pipeline stages (0403). At start up or restart the value of register 1210 is fed to the input of ALU 1205 via the multiplexer 1203. A ticker 1208 controls the multiplexer such, that at the first two clock cycles of the execution of a newly issued instruction the multiplexer selects the value from 1222 as input for ALU 1205 and subsequently the feedback 1220 from register 1204.

The depth (LLFRM[depth]) of register 1222 depends on the registers involved in the feed-back path. Each register storing feed back data is virtually duplicated in the register 1222. After a context switch the previous context in the feedback path is delivered by 1222 for proper restart of the loop. As in the example of FIG. 12b two (2) registers are implemented in the feedback path 1220, namely the output register 1204 and the pipeline register 1221, the depth of 1222 is set to two (2) for copying the two data words stored in 1204 and 1221.

At runtime the ticker 1208 preset with the value depth in accordance to LLFRM[depth] and the number of registers implemented in the feedback path (1220). With each execution cycle a data word from the register 1222 is received by the ALU 1205 of the ALU 1201a inside the ALU-Block via the multiplexer 1203; and the ticker decrements its preset length(depth) value by one (1) until zero (0) is reached which changes the selection of the multiplexer 1203 from register path 1207 to the feedback path 1220.

Due to its function the ticker 1208 is preferably implemented as a decrementing counter.

The reception of fed-back data from downstream ALU-Block ALUs constitutes a severe problem. If a downstream ALU-Block does not provide correct results yet, for example as valid input data are not available yet via the pipeline registers, wrong processing results are generated by the ALU-Block ALU receiving the data from the downstream ALU-Block ALU. This could be avoided by implementing handshake protocols controlling the validity of data transfers. However as previously described, significant amount of hardware is required for their implementation. An ideal solution is to transmit just a valid status together with the data, instead of implementing a full handshake protocol. Valid is only set if a result is generated based on valid input data. Valid input data means input data with the valid flag set. Data processing in the ALU inside an ALU-Block is suspended until all input data become valid. Therefore the processing of fed-back data from downstream ALUs within an ALU-Block is withheld until the fed-back data becomes valid.

An ALU inside the ALU-Block in the preferred implementation is implemented according to 1201 and comprises at least:
- at least one ALU, which may support integer, SIMD (programmable multiple integers, e.g. 4 times 8 bit, 2 times 16 bit, or 1 times 32 bit), floating point and/or bit level processing;
- the ALU may comprise an adder/subtractor, a logic unit for processing AND, OR, XOR, NOT, etc., a multiplier, a shifter and possibly a divider;
- at least one output register (1204), which may be integral with a pipeline stage (e.g. 0403);
- at least one feedback path (1202);
- at least one multiplexer for selecting between ALU input from the ALU-Block network or the internal feedback (1203);
- and at least one unit for defining the multiplexer select input, which may be a ticker unit (1208).

Processor Status

In an exemplary embodiment each column of ALUs inside the ALU-Block comprises a status register, which means, if for example 4 ALU columns are implemented, 4 status registers exist. The status registers are in the same hierarchy as the data registers and the same rules apply. The status registers are implemented as FIFOs of programmable mode and depth, exactly as the data registers, for example the modes Single Registers Mode (SRM), FIFO Register Mode (FRM) and Limited Length FIFO Register Mode of the length n (LLFRM[n]) are implemented. For details reference is made to the previous data register section.

The following status flags are preferably implemented:
c (carry), z (zero), gt (greater), ge (greater equal), lt (less), le (less equal). zero is also set if two compared values are equal, greater and less may carry the same information as carry (after an unsigned computation) or overflow (after a signed computation). The flags are produced by each ALU depending on the operation, which may be signed, unsigned or float. Also error flags may be generated, e.g. Division by zero (Div0) or Negative Square Root (NSR).

Floating point ALUs may additionally produce floating point specific flags such as NaN (not a number).

Status flags are transferred within the ALU-Block in accordance to the preferred data flow direction in line with the data, for example from top to bottom.

Conditional Execution

Figure 16:
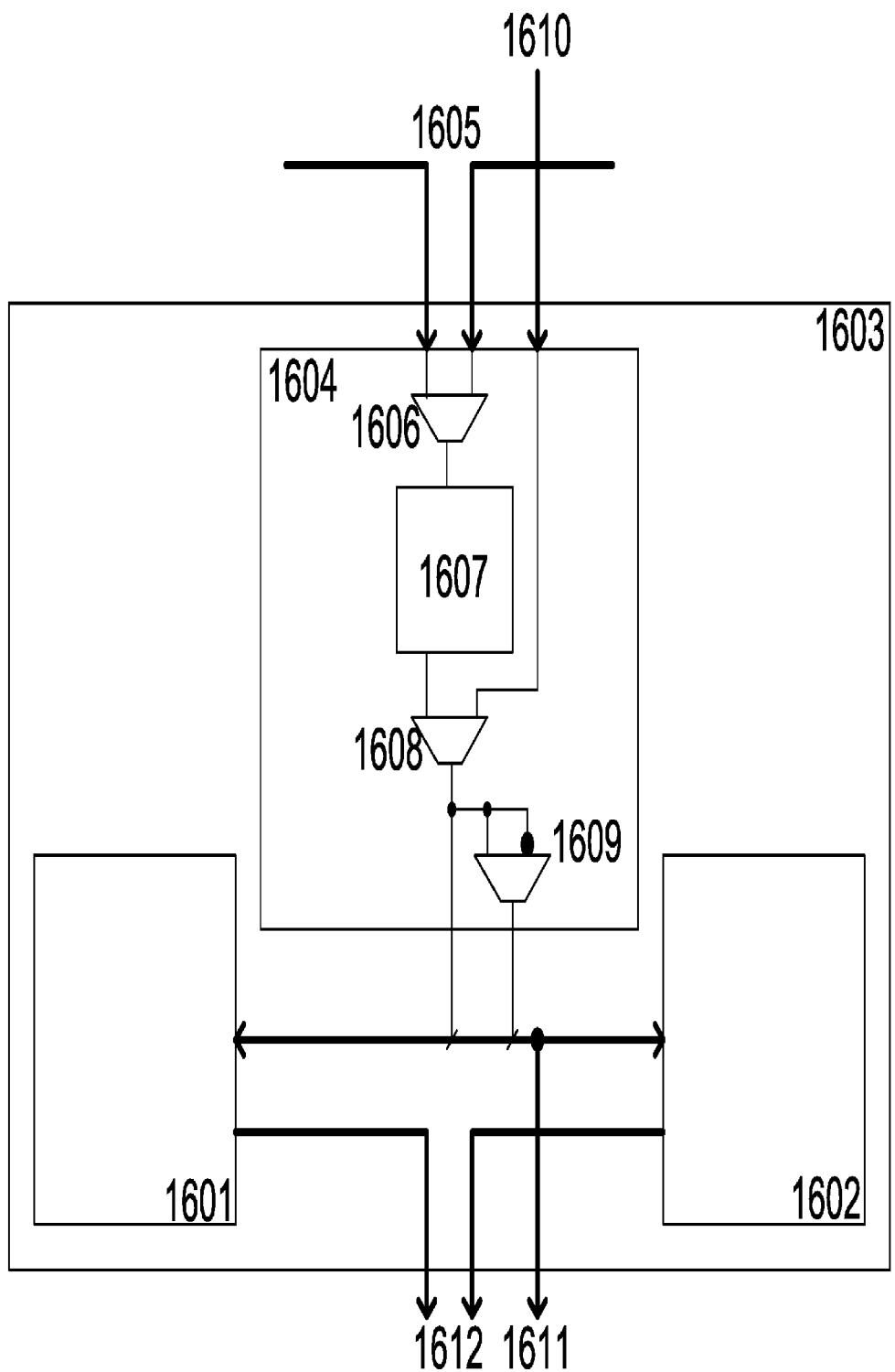
FIG. 16 is a block diagram showing example details of status flag handling and processing of condition execution.

Details of the status flag handling and processing of condition execution are shown in FIG. 16.

In an exemplary embodiment the ALUs in a row comprising m=2*n ALUs are grouped into pairs (1603), each pair comprising a first left side ALU $ALU_l=ALU_{2n}$ (1601) and a second right side ALU $ALU_r=ALU_{2n+1}$ (1602).

Each pair comprises a status detection unit (1604), which, depending on the instruction, checks incoming status from upstream ALUs (1605).

For each pair of ALUs related conditional processing information is provided in the instructions (for further detail see the subsequent explanation of the instruction set). In an exemplary embodiment the following encoding of the condition block (cond) of the opcode may be used:

| cond [4] | | cond [3:1] | cond [0] |
|---|---|---|---|
| 0 = status flags | 000 | same cond | 0: Right $ALU_r$ |
| from upper left | 001 | == / z | impliments "THEN" |

-continued

| cond [4] | | cond [3:1] | cond [0] |
|---|---|---|---|
|  $ALU_l$ | 010 | != / !z | branch |
| 1 = status flags | 011 | > / c, o | 1: Right $ALU_r$ |
| from upper right | 100 | >= | implements "ELSE" |
| $ALU_r$ | 101 | < /! C, !o | branch |
|  | 110 | <= |  |
|  | 111 | activate |  |

The bit cond[4] selects via a multiplexer (1606) whether the incoming status flags from the upper left ALU1 or upper right $ALU_r$ are processed.

The bits cond[3:1] select in a decoder (1607) which condition is checked to enable the operation of this ALU pair:
- ==/z means equal or zero flag set;
- !=/!z means not equal or zero flag not set;
- >/c,o means greater or carry/overflow flag set, depending whether the operation in the upper ALU was signed or unsigned;
- >=means greater or equal flag set;
- </!c,!o means less or carry/overflow not flag set, depending whether the operation in the upper ALU was signed or unsigned;
- <=means greater flag not set or equal flag set;
- same_cond means the operation in this ALU pair is based on the same condition as the operation in the upper ALU pair; which means, if the upper left $ALU_1$ was enabled, the left $ALU_1$ of this pair is enable too, if the upper right $ALU_r$ was enabled, the right $ALU_r$ of this pair is enable too, same_cond may be implemented using a multiplexer (1608) selecting the enable information (1610) of the upper ALU pair for bypassing the decoder;
- activate means regardless of any previous condition the current pair is enabled.

The bit cond[0] defines via an inverter and a multiplexer (1609), whether
- (0) the right $ALU_r$ is enabled for operation if the left $ALU_1$ is enabled (to implement the operation IF condition THEN left $ALU_1$ and right $ALU_r$); or
- (1) the right $ALU_r$ is enabled for operation if the left $ALU_1$ is not enabled (to implement the operation IF condition THEN left $ALU_1$ ELSE right $ALU_r$).

The enable information is transmitted to the left $ALU_1$ and right $ALU_r$ and to the conditional processing the subsequent ALU stage (1611). Also the status flags generated by the left $ALU_1$ and right $ALU_r$ are transmitted downstream (1612).

The instruction of ALU may comprise an additional condition enable bit, enabling or disabling conditional processing. If the condition enable bit is set, the enable generated by the status detection unit (1604) is controlling the ALU operation. If the bit is not set, the ALU will operated regardless whether it is enabled by the status detection or not.

The uppermost ALU stage in each column receives the status flags from the respective status register. The lowermost ALU stage in each column transmits the status flags into the respective status register.

The ZZYX Instruction Fetcher, Decoder and Program Pointer

The basic structure of the Instruction Fetcher (IF) is comparable with traditional microprocessors. The program pointer selects an instruction in an instruction memory, which is fetched into the Instruction Decoder of the processor. The program pointer supports absolute and relative jump operations and classic call/return operations via the stack.

A ZZYX instruction comprises a plurality of opcodes, each opcode defining the operation of the respective ALU. FIG. 28 shows an exemplary instruction format for a ZZYX processor having 4 columns of ALUs within the ALU-Block.

Figure 17A:
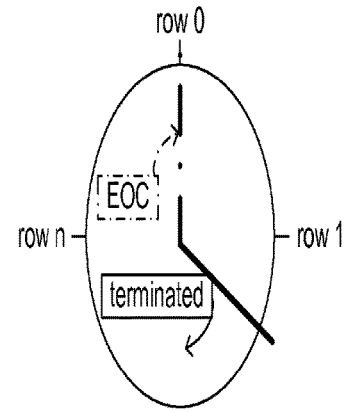
FIGS. 17a and 17b are diagrammatic illustrations of examples of instruction dispatchers distributing instructions to rows of ALUs.

The Instruction Decoder is significantly different from processors known in the prior art. Its operation is best understood as a dispatcher or distributor, as shown in FIG. 17*a*. The dispatcher is distributing the instructions to the rows/stages of ALUs in the ALU-Block. While it is preferably located behind a single Instruction Decoder (ID) decoding the instructions for all of the ALU rows, it could for example be also located in front of a row of Instruction Decoders for each single ALU row. The distributor of the instructions is called Instruction Issue unit. Usually the Instruction Fetcher and Instruction Decoder are either embedded units in the Instruction Issue unit or are connected via the Instruction Issue unit to the Execution Units of a ZZYX processor.

The base position of the dispatcher is at row 0 of the ALU-Block (equivalent to stage 0). After processor reset and/or in VLIW/superscalar mode instructions are issued to row 0.

As typically an instruction defines the operation of one ALU row, in other processor modes, such as for example Matrix or Hyperscalar mode, the dispatcher moves after the first instruction is issued to row 0 to the second row (row 1, equivalent to stage 1) and supplies the subsequently fetched and decoded instruction to it. Then it supplies the next fetched and decoded instruction to row 2 (equivalent to stage 2) and so on.

The dispatcher may be reset to row 0, when an End-Of-Code (EOC) is indicated by the currently decoded instruction of the executed code. Means for indication may be either a dedicated instruction or preferably a bit in an instruction word.

An End-Of-Code indication is used to terminate a sequence of instructions defining the operation of the ZZYX processor in modes using more than one ALU row (such as Matrix- or Hyperscalar-mode).

Depending on the programming model synchronization of the Instruction Issue with the data processing within the data path of the ALUs in the ALU-Block may be required.

Therefore each ALU row may generate a terminated signal, when all ALUs in the row completed data processing. Unused ALUs (e.g. loaded with a NOP (NoOPeration) opcode), indicate completion of data processing by default. An incoming terminated signal moves the dispatcher forward to the next ALU row, reporting the termination. The movement of the dispatcher is monotonously linear until (i.e. row0, row1, row2, . . . , row (n−1), row (n); equivalent to stage0, stage1, stage2, . . . , stage (n−1), stage (n)) it is reset to row 0. The dispatcher will not disregard and bypass an ALU row not yet indicating the completion of the data processing, but wait unit the next row to be supplied with instructions has completed operation and is ready to accept new opcodes.

A code section (block of instructions) reaching from the first row 0 to the End-Of-Code token constitutes a multi cycle kernel, (or, if executing for one cycle only, a partition).

FIG. 17*a* shows the basic concept of the dispatcher's operation: The dispatcher starts at position row 0 to which it issues the instruction. Afterwards the dispatcher moves ahead to row 1, given it indicates its completion of the data processing and readiness for accepting new instructions by setting the terminated signal. In the same way the dispatcher moves then ahead to the subsequent rows.

When the End-Of-Termination token is detected, the dispatcher is reset to row 0, where it restarts issuing instructions as soon as the termination signal is set by row 0.

In case End-Of-Termination is missing at the end of the ALU rows, the dispatcher restarts at row 0 issuing new code. Preferably an error is indicated by a processor flag and/or an interrupt and/or a trap.

In a multi-core processor, comprising multiple ZZYX cores, each having an ALU-Block, some Instruction Fetch, -Decode and -Issue units may supply a plurality of cores with instructions.

Typically a scheduler (Core-Scheduler) being implemented in hardware or in software, which may be part of the application software or the operating system (for example the task- and/or thread-scheduler, or a scheduler within the application software), allocates ZZYX cores, in accordance to the scheduling of the operating system and/or the scheduling defined within the application software. This scheduler, being responsible for mapping the multi cycle kernels or partitions onto the ZZYX cores is called a Core-Scheduler.

A plurality of cores may be allocated for processing a plurality of multi cycle kernels or partitions in a streamed manner, in which a core will forward the results generated by processing the allocated multi cycle kernel or partition as operands to the next subsequent core, processing the subsequent multi cycle kernel or partition. A plurality of cores can be chained together for processing large sequences of multi cycle kernels or partitions in a stream-like manner (see FIG. 6). On a processor comprising a decent amount of cores, even a plurality of chains can stream-like process data of multiple chained multi cycle kernels or partitions in parallel.

While some ZZYX cores are allocated to one or a plurality of chained multi cycle kernels or partitions, others may be allocated to sequential processing. All ZZYX cores may operate on the same application or on different applications, tasks or threads in parallel, depending on the allocation of the Core-Scheduler.

When allocating multiple ZZYX cores for chain-like processing the Instruction Fetch and -Decode/Issue units of all but one ZZYX core are switched off in the preferred embodiment. Typically only the one of the first ZZYX core in the chain remains operational. While this Instruction Fetch and Instruction Decode/issue unit operates in principle as described for a single core as shown in FIG. 17*a*, operation differs when reacting on End-Of-Code tokens: As shown in FIG. 17*b*, the dispatcher is also reset to row 0 by an End-Of-Code token, but simultaneously the dispatcher moves from the current ZZYX core to the next subsequent one. Thus, triggered by End-Of-Code tokens, the dispatcher not only moves monotonously linearly from one ALU row to the next, but also moves monotonously linearly from one ZZYX core to the next, starting at the first core in the chain. An End-Of-Partitions (EOP) token, which is typically generated or its position defined by the Core-Scheduler resets the dispatcher to the first ZZYX core. Both tokens, End-Of-Partitions and End-of-Code have to be set related, else an error is indicated by a processor flag and/or an interrupt and/or a trap.

Figure 17C:
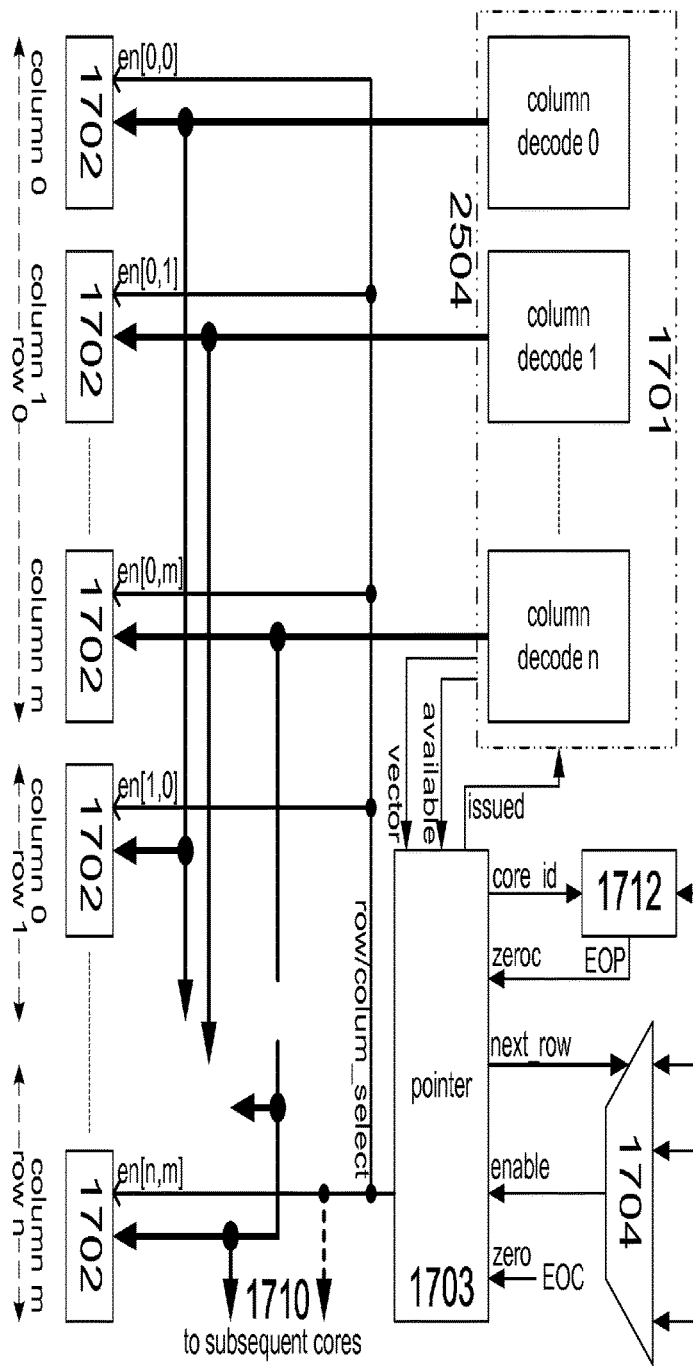
Figure 17B:
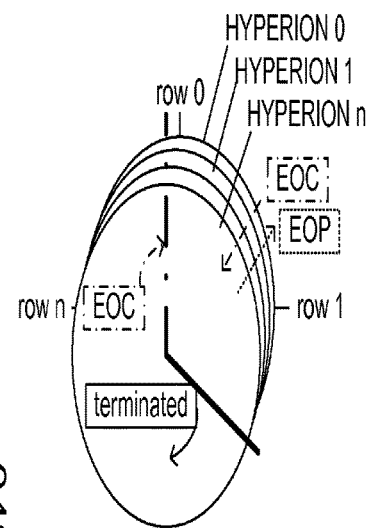

An exemplary implementation of an Instruction Issue unit according to FIG. 17*a* is shown in FIG. 17*c*. The instructions are fetched by an Instruction Fetcher (IF, not shown) and decoded by an Instruction Decoder (ID, 1701). In this embodiment each column of ALUs within the ALU-Block has one respective decoder (column decode). The opcodes of the decoded instruction are fed to Instruction Issue registers (IIRs, 1702), whereas each row/stage of ALUs has a respective set of IIRs. Each set of IIRs of each row may comprise one dedicatedly addressable register for each column within the row. Each of registers is addressed by a specific enable signal en[row, col], row defines the row, col defines the column within the row; for example en[0,1] enables the Instruction Issue Register of column 1 within row 0. While in most operations all columns of a row can be tied together and enabled simultaneously (i.e. en[row,0]=en[row, 1]==en[row,last_column]=enable), Vector mode requires the capability to distribute a decoded instruction not within a row, but within a column (i.e. en[0,column]=en[1, column]==en[last_row,column]=enable). Thus dedicated enablement of specific columns is required.

A pointer (1703) implements the dispatcher functionality. After reset and during VLIW-like processing it enables the Instruction Issue registers (IIRs) of the first ALU row/stage by setting en[0,0] to en[0,m]. All decoded opcodes are written into the respective set of registers. In modes like Matrix and Hyperscalar the pointer moves with each decoded set of opcodes linearly from one row to the next, thus enabling the according sets of Instruction Issue Registers (IIRs).

The movement of the pointer is synchronized with the availability of new decoded instructions (available) and enabled (enable) by a signal (row_0_terminated . . . row_n_terminated) indicating the termination of the operation of the subsequent row, defining the readiness to receive new instructions. The required signal is selected by a multiplexer (1704) in accordance to the position of the pointer (next_row) (1703).

An End-Of-Code signal (EOC), detecting the End-Of-Code token, sets the pointer back to point to row 0 (zero).

Instruction Fetch and Decode (1701) is synchronized with the pointer (1703). No new instructions are fetched and decoded until they have been issued. The pointer (1703) sends an issued signal (issued) to the Instruction Fetch and Decode (1701) to signal the issue of the latest decoded instruction. Based on the incoming issue signal, the next instruction is being fetched and decoded. It shall be mentioned, that the instruction fetch and decode may operated pipelined and in particular instructions may be prefetched and/or predecoded to avoid timing penalties when synchronizing the instruction issue with the fetch and decode.

FIG. 17*b* shows the dispatcher linearly moving up one level from one ZZYX core to the subsequent one with each End-Of-Code (EOC) and being reset to the first level, ZZYX core 0, by an End-Of-Partitions (EOP) token.

The maximum number of partitions distributed by the dispatcher to the same number of ZZYX cores is defined by the Core-Scheduler. The Core-Scheduler schedules the assignment of running tasks, threads and applications onto the plurality of ZZYX cores. The Core-Scheduler may define a plurality of groups of Core Resource Groups (CRP), each CRP comprising one or more ZZYX cores. For example a CRP comprising single ZZYX core may process highly sequential VLIW code, while another CRP comprising a 3 ZZYX cores may process dataflow code, e.g. a Fourier Transformation (FFT) or a Discrete Cosine Transformation (DCT) or linear algebra, having a high level of instruction parallelism. Within each CRP one ZZYX core, usually the first one in the dataflow graph, is the designated master core. Instruction Fetch, Decode and Issue is switched off for all cores within the CRP, but the master core, which supplies all other cores of the group with instructions (FIG. 17*c*, 1710). Via a multiplexer or crossbar structure the master core receives not only its own row termination information (0420), but also the respective information from the assigned cores, so that it is able to synchronize instruction issue with the status of each of the ALU rows of each of the assigned cores.

The enable signals (en) generated by the pointer (1703) of the master core, have one additional dimension, which enables the respective core (en[core, row, col]), and is transmitted to the subsequent cores via the bus 1710, together with the decoded instructions.

With each incoming EOC token, the pointer 1703 resets row and column and increments the core id: en[++core, 0, 0]. An incoming EOP token resets in conjunction with an EOC token the pointer to en[0, 0, 0].

Summarizing, instruction issue unit can be understood as a kind of scheduler (instruction scheduler), scheduling the fetched and decoded instructions for the respective ALU stages and/or ALU rows. The scheduler however may not freely assign instructions to ALUs but is limited to the clear specification of the code. In other words, scheduling is not flexible, but defined be the instruction and their sequence.

A preferred embodiment of the End-Of-Partitions generation comprises a register (1711) and a comparator (1712). The Core-Scheduler loads the CORE_MAX register 1711 with the number of cores in the CRP. The current core id (core_id) generated by the pointer (1703) is transferred to the comparator (1712), which compares it with CORE_MAX. As core_id linearly increments, core_id and CORE_MAX are equal when the last core of the group is being addressed be pointer 1703 and consequently EOP is set by the comparator. EOP is transmitted to zeroc, which resets the core_id to zero.

In a preferred embodiment the Core-Scheduler gets parameters, such as specific requirements or limitations of and from the software being scheduled (e.g. threads or tasks), based on which the Core-Scheduler defines the CRP and allocates the ZZYX cores accordingly.

If only one ZZYX core is present in a processor CORE MAX is 0. EOP is constantly set and keeps core_id at 0 and all partitions are executed on the single ZZYX core.

Some embodiments of the ZZYX processor may additionally support Vector-mode, in an instructions can be rotated by 90°, which means the plurality of opcodes in which an instruction is split are not distributed within a row, but within a column. In order to switch to Vector mode and back, either a specific bit within the instruction may be used to indicate the rotation, or preferably special instructions may be used to switch between the modes.

Upon the detection of a vector instruction (vector), the pointer (1703) rotates the addressing by 90° and moves monotonously linearly through columns instead of rows. Consequently EOC resets the pointer to column 0 instead of row 0.

Power Saving Measures

A high amount of resources operates in parallel in the ZZYX architecture, which requires a significant amount of transistors. They consume significant power. Therefore it is very important for such a highly parallel architecture to efficient provide power saving measures.

According to this aspect of the invention, which might be used in connection with the ZZYX processor or any other processor, memory or chip implementation elements within a chip may operate in parallel, but not all may be operational all time. Some of those elements may be:

ALUs inside the ALU-Block
ALU stages inside the ALU-Block
Load/Store units

FIFO Registers
Complete ZZYX cores

Elements, in particular ALU rows/stages to which no instruction has been issued are preferably bypassed to reduce the energy consumption.

Various methods for saving energy of temporarily unused elements may be implemented, for example
- a) registers within the elements (such as pipeline registers) are gated from the clock and remain constant, such reducing the toggle rate and dynamic power dissipation.
- b) the power supply of temporarily unused elements is temporarily switched off
- c) the power supply of temporarily unused elements is temporarily reduced to a minimum voltage, so that surrounding logic is not impacted and/or the temporarily unused elements may be instantly switched on and operational. The definition of instantly depends on the implementation and the type of element.

For example for ALUs and/or ALU stages and/or Load/Store units and/or FIFO Data Registers instantly is preferably defined between 0 (zero) clock cycles and about 1⁄4 of the depth of the FIFO Data Registers (FDR), e.g. if the FDR are 256 entries deep, the upper range of the amount of clock cycles for instant power on is 256 divided by 4=64 clock cycles. The Instruction Decode and -Issue unit may prefetch in the background the subsequent instructions while the ALU-Block is processing a multi-cycle kernel. Based on the prefetch it may be known well before the termination of the multi-cycle kernel, which for ALUs and/or ALU stages and/or Load/Store units and/or FIFO Data Registers are used for the subsequent, prefetched multi-cycle kernel. Those are powered on, well in advance of the Instruction Issue, to allow the logic to settle and be stable latest when the currently executed kernel has been terminated and the subsequent instructions are issued. The timing ratio if 1:4 in respect to the depth of the FDR appears reasonable for today's capabilities (in terms of tools and semiconductor technology), but may significantly change in future.

Similar applies on ZZYX cores, respective ALU-Blocks which are chained within a CRP, as the Instruction Issue may be able to predict which elements are required short term based on prefechting of instructions or instruction lookahead.

Architecturally the one or more of the following features may be implemented:
- a) Reducing the toggle rate, by bypassing unused sections of the elements or datapath.
- b) Reducing the toggle rate by gating registers, particularly pipeline registers of the elements or data path. As the registers will remain stable the connected logic stops toggling.
- c) Switching off the power supply of unused sections of the elements or data path, which requires the capability of electrical isolating signals between unused and active sections. Preferably the sections are divided by registers and/or gates producing a stable and electrically valid signal, even if one input is invalid, electrically outside the specification and/or floating.
- d) Reducing the power supply of unused sections of the elements or data path to a minimum voltage, which requires the capability of electrical isolating signals between unused and active sections. Preferably the sections are divided by registers and/or gates producing a stable and electrically valid signal, even if one input is invalid, electrically outside the specification and/or floating. Reducing the power supply to a significantly lower supply voltage may be better applicable than complete switching off the power. The negative impact on the signal integrity of surrounding logic is minimized and the power on time, unit the transistors and/or gates in the unused section are powered up and electrically stable again may be significantly reduced. Yet, the impact on the power dissipation may be high, as $P=U^2*I$.
- e) Power switching may be achieved, by having a dedicated power supply for sections having e.g. the granularity of the respective elements, e.g. ALUs, ALU stage, or Load/Store unit granularity. The power for each of the section may be separately defined using power transistors selectively connecting the section to one or a plurality of power supplies or completely disconnecting the section. The power transistors are under the control of the Instruction Issue unit, which sets them according to currently issued instructions and/or prefetched instructions for future issue, as described above.

While power optimization based on prefetched instructions is highly efficient for code for multi-cycle kernels, it is not well applicable on e.g. VLIW code, as typically new instructions are fetched and issued in each clock cycle. However, by default some elements can operate power optimized in VLIW mode, e.g. all unused ALU stages.

In VLIW mode it may be useful to implement an instruction lookahead buffer, looking so many instructions ahead that enough time for efficient power management is given (e.g. taking into account the wake up time until the elements become stable again after powering down to a reduced voltage, or completely switching off the power). The lookahead has to predict the most likely program flow. Special loop instructions (which will be later on described), such as loopref, looprpt, looppreset will use the most likely branch of a conditional jump by default, and by such minimizing the risk of mispredicting the program flow. Anyhow misprediction may happen. The Instruction Decode/Issue units check when decoding and/or before issuing instructions the state of the required elements. If the required elements are not awake due to misprediction or any other failure, but disabled by any means (e.g. the previously listed ones), the elements are immediately enabled and wait cycles are inserted until the all of the required elements are awake and ready to receive and process instructions.

Prefetching and Lookahead

Both, instruction prefetching and instruction lookahead may be supported by the ZZYX processor.

Prefetching is typically used for collecting the next instructions, e.g. of the next multi-cycle kernel, while currently processing another multi-cycle kernel. As multi-cycle kernels typically operated for multi-cycles (thus their name), it is optimal to prefetch and predecode the next instructions during the execution time of a multi-cycle kernel. Prefetching occurs quasi in the background of the execution and the time required for fetching (which may involve latency of the memory subsystem, cache misses, and so forth) becomes transparent and is hidden by the multi-cyclic execution of the current multi-cycle kernel. Another benefit of prefetching is to get the information which resources will be required for the next multi-cycle kernel and respectively controlling the previously described power optimization means. Instruction lookahead may be used for non-multi-cyclic processing, which means new instructions are fetched, decoded, issued and executed in each clock cycle, with no spare time for prefetching in the background.

Instruction lookahead enables e.g. the adaption of specific settings within a ZZYX processor to future requirements. For example power optimization measures for the processing resources can be controlled according to the future requirement of them.

Prefetching and Lookahead enables a forecast of the resource allocation into the future to control of the power optimization, even if the power-up or power-down requires a plurality of clock cycles and could not be done immediately. Based on the forecast time consuming power saving measures are possible, which would be inefficient on a clock-by-clock basis.

Figure 25:
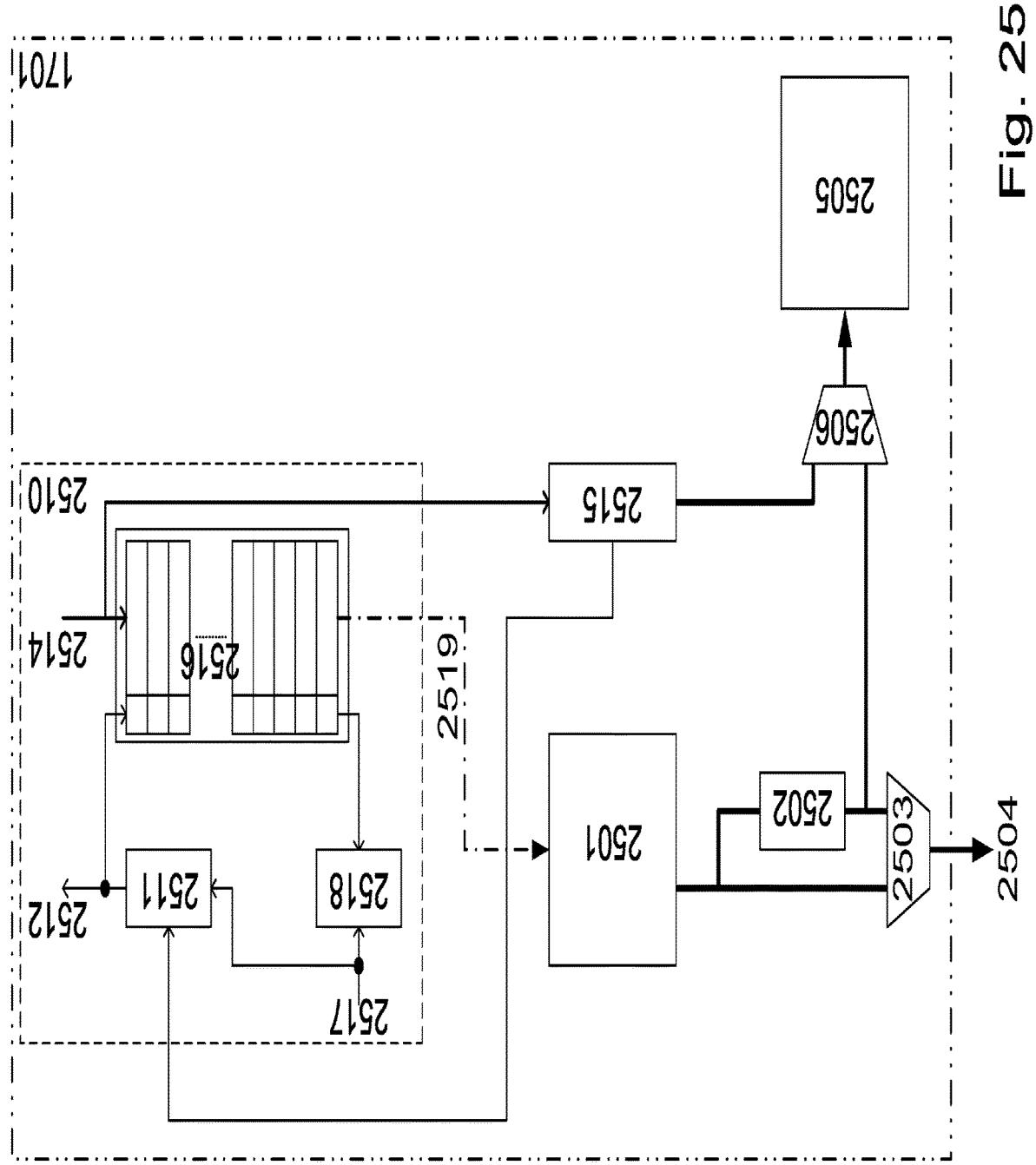
FIG. 25 is a block diagram of an example of a prefetching and lookahead structure.

FIG. 25 shows an exemplary prefetching and lookahead structure, which may be embedded in the Instruction Fetch and Decode block 1701 of FIG. 17c, for predicting future resource requirements for controlling power saving measures.

An instruction fetch and decode unit (2501) is fetching and decoding instructions for future issue. In case no new instructions can be issued, the currently decoded instruction may be stored in a register (2502). This instruction has been prefetched (and predecoded) and is immediately ready for issue. The instruction fetch and decode unit may even fetch and decode the subsequent instruction. The Instruction Issue Unit receives (via the bus 2504) decoded instructions via a multiplexer (2503), which selects, whether prefetched instructions are available in the register (2502) or only the currently fetched instruction is available from 2501.

The prefetched instruction stored in register 2502 may control power saving measures of the power unit (2505) (via the multiplexer 2506, which will be subsequently described.

The prefetch capabilities are preferably implemented to achieve optimum performance when processing multi-cycle kernels. Additionally a Lookahead unit (2510) may be implemented. As at least some power saving measures are slow and require more time (significantly more time) than a single clock cycle, a potential prefetch of one instruction does not provide sufficient time for controlling them in processor operation modes which consume one instruction per clock cycle or within only a very few clock cycles.

A Lookahead unit may fetch and decode instructions so far ahead of the program pointer, that efficient control of the power saving measures becomes possible. A lookahead pointer (2511) runs ahead of the program pointer, producing code addresses (2512) which are sent to the instruction memory which returns the respective instruction (2514).

The returned instruction is decoded by an instruction decoder (2515), which provides the respective resource requirements via the multiplexer 2506 to the power saving unit (2505). Additionally the instruction decoder controls the lookahead pointer, e.g. for executing jumps.

For conditional jumps the most likely branch is chosen, often the jump instruction (e.g. such as loopref, looprpt, looppreset) provides information about the most likely exit.

The address of the lookahead pointer is recorded in a FIFO (2516) for tracking the lookahead path. The depth of the FIFO (2516) is exactly related to the number of cycles the lookahead pointer is ahead of the program pointer. The FIFO (2516) output is compared with the actual program pointer value (2517) by a comparator (2518). If the values match, the lookahead is correctly in front of the program pointer. If not, the lookahead pointer is updated with the program pointer plus the offset which the lookahead pointer shall be ahead of the program pointer. The FIFO (2516) is cleared.

To avoid double fetching (the fetching of instructions by the lookahead unit and the instruction fetch unit), the lookahead unit may store the fetched instructions together with the tracked lookahead path in the FIFO 2516. The output of the FIFO may supply (2519) the stored instructions to the instruction decode and fetch unit, instead of fetching them from the instruction memory.

In one embodiment, the instruction decoder 2515 may be a minimized version of the complete instruction decoder, only decoding those parts of the instructions required for controlling the lookahead pointer (2511) and the power unit (2505).

In another embodiment the instruction decoder 2515 may be a complete instruction decoder and the decoded instructions may be stored in the FIFO 2516. The FIFO output then delivers (2519) the already decoded instructions and the Instruction Fetch and Decode unit can be reduced mainly to the control of the program pointer; the decoded instructions may be directly supplied from the FIFO 2516 to the multiplexer (2503) and the register (2502).

The multiplexer 2506 switches control between the prefetched instruction and the looked-ahead instruction, depending on the processing mode. Processing multi-cyclic (e.g. multi-cycle kernels), typically the prefetched instruction controls the power unit; processing on a cycle-by-cycle basis, typically the looked-ahead instruction controls the power unit.

Figure 26:
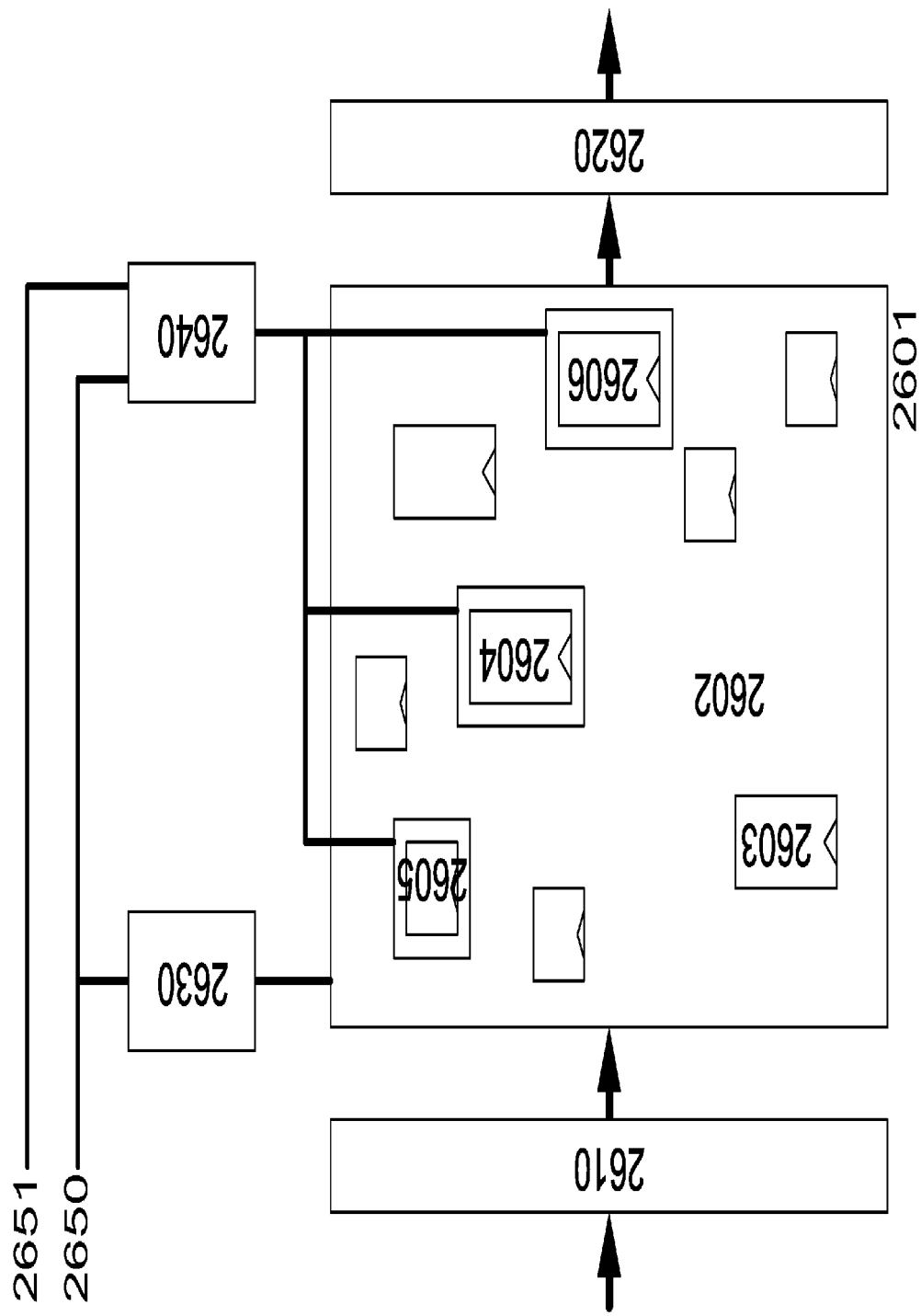
FIG. 26 is a block diagram of an example of a circuit element including power saving elements.

FIG. 26 shows exemplary how power saving measures may be implemented.

The exemplary element may be for example an ALU, ALU stage, ALU-Block, Load/Store Unit or register file. It comprises a sea of logic gates (2602) and registers (e.g. 2603, 2604) in its core (2601).

Input signal may be supplied via an input isolator (2610) from surrounding elements and output signals may be fed to surrounding elements through an output isolator (2620).

The input isolator has minimal requirements, in most cases buffers, in particular controllable buffers (e.g. Tri-State Buffers) are sufficient. While the output isolator is typically required, in some embodiments input isolators may not be need.

The output buffer has to prevent that faulty signals confuse the receiving elements. Faulty signals are defined as any signal which is not the correct one, which could mean for example a wrong value and/or a voltage outside the specified bands and/or voltage peaks and/or swinging voltage. The output buffers may comprise registers or latches with an enable input, which keep the last correct signal while the power of the core (2601) is down or off. They may also comprise logic, such as AND gates, which put a signal to a defined value using an enable input, e.g. if a 0 enable signal is AND combined to any other signal, the output of the AND gate will be 0 based on enable, regardless of the value of the other signal. In this example the power of the core can be switched off from the main power supply (2650) by a first power switch (2630).

Elements having power saving capabilities may comprise memory units or register units, whose contents have to survive the power off or power down of the element. For those units power islands may be defined, which are treated separately from the power supply of the rest of the element. So called power island may be used to supply this units from a power supply different from the rest of the element. The different power supply may be steadily connected to the main power supply or switch between the main power supply and one or more alternative power supplies having lower voltages.

In FIG. 26 e.g. the content of the registers 2604, 2605 and 2606 must survive the power off of the element. Power islands are defined for each of the registers, which are supplied from a second switch (2640). The second switch does not cut off the power supply but switches to an alternative lower voltage power supply (2651). The voltage of 2651 is high enough to keep the contents of the registers stable, but will not support any operation of the registers.

According to this aspect of the invention, which might be used in connection with the ZZYX processor or any other processor, memory or chip implementation, in a preferred embodiment carbon nanotubes (CNT) may be implemented in the power switches (2630 and 2640) for switching the supply voltage. While MOSFET transistors reach switching resistances of 20 m$\Omega$/mm$^2$ and current densities of 2000 A/cm$^2$, the high conductance and current-carrying capacity of carbon nanotubes (CNT) have significantly better values. The typical switching resistance of power transistors built based on carbon nanotubes may be 20 times lower than for conventional transistors. This results in an accordingly lower loss of power. Furthermore, carbon nanotubes (CNT) based transistors withstand current densities which are approximately 200 times higher than the levels silicon based transistors can handle.

Typical power transistors based on carbon nanotubes require a few hundred carbon nanotubes to handle currencies in the mA range, at a voltage of 1 . . . 2V. An exemplary power transistor with 300 carbon nanotubes (CNT) supplies 2 mA at 2.5V.

Loop Processing

As will be described later on in more detail, the ZZYX processor supports the computation of loop control structures in hardware. According to the principles of operation of a ZZYX processor, loops are preferably processed in Matrix or Hyperscalar modes. Thus a loop might be partitioned into a plurality of multi cycle kernels, sequentially being executed on an ALU-Block. When processing the first multi cycle kernel of the loop, either in VLIW or in Matrix/Hyperscalar modes, the Stop Criterion of the loop is calculated, depending on which the number of iterations are defined, when processing a multi cycle kernel on the ALU-Block. The Stop Criterion of a loop can be recorded by a Termination-Control-Counter (TCC). When one or more subsequent multi cycle kernels are processed, the Stop-Criterion is not computed anymore, but the Termination-Control-Counter repeats the number of iterations as previously recorded and terminates processing afterwards. Preferably a plurality of Termination-Control-Counters are implemented for supporting a plurality of loops and/or complex loops and/or nested loops.

The recording of the loop iterations might be done by dedicated opcodes and/or specific status flag being set, when the stop criterion is reached and/or by dedicated loop/branch opcodes. Dedicated instructions, terminating a loop based on certain conditions e.g. comparing operands and/or checking status flags are the most flexible approach. Such commands may be used in two ways: a) setting the Termination-Control-Counters (TCCs) and/or b) terminating a multi cycle kernel at any point in time, even overriding the status of the Termination-Control-Counters (TCCs). This type of instructions is referred to as termination instructions (TERM). Dedicated loop/branch opcodes are the most efficient way to con-trol loops. Loop/branch opcodes are typically used to branch based on certain conditions e.g. comparing operands and/or checking status flags. Thus they are combining a compare or check operation with a jump (or even call) operation. In one embodiment further special loop/branch opcodes may be implemented, providing the additional functionality of setting the Termination-Control-Counters (TCC) based on the condition and the respective conditional jump. This allows the efficient recording of the number of loop iterations.

Figure 18:
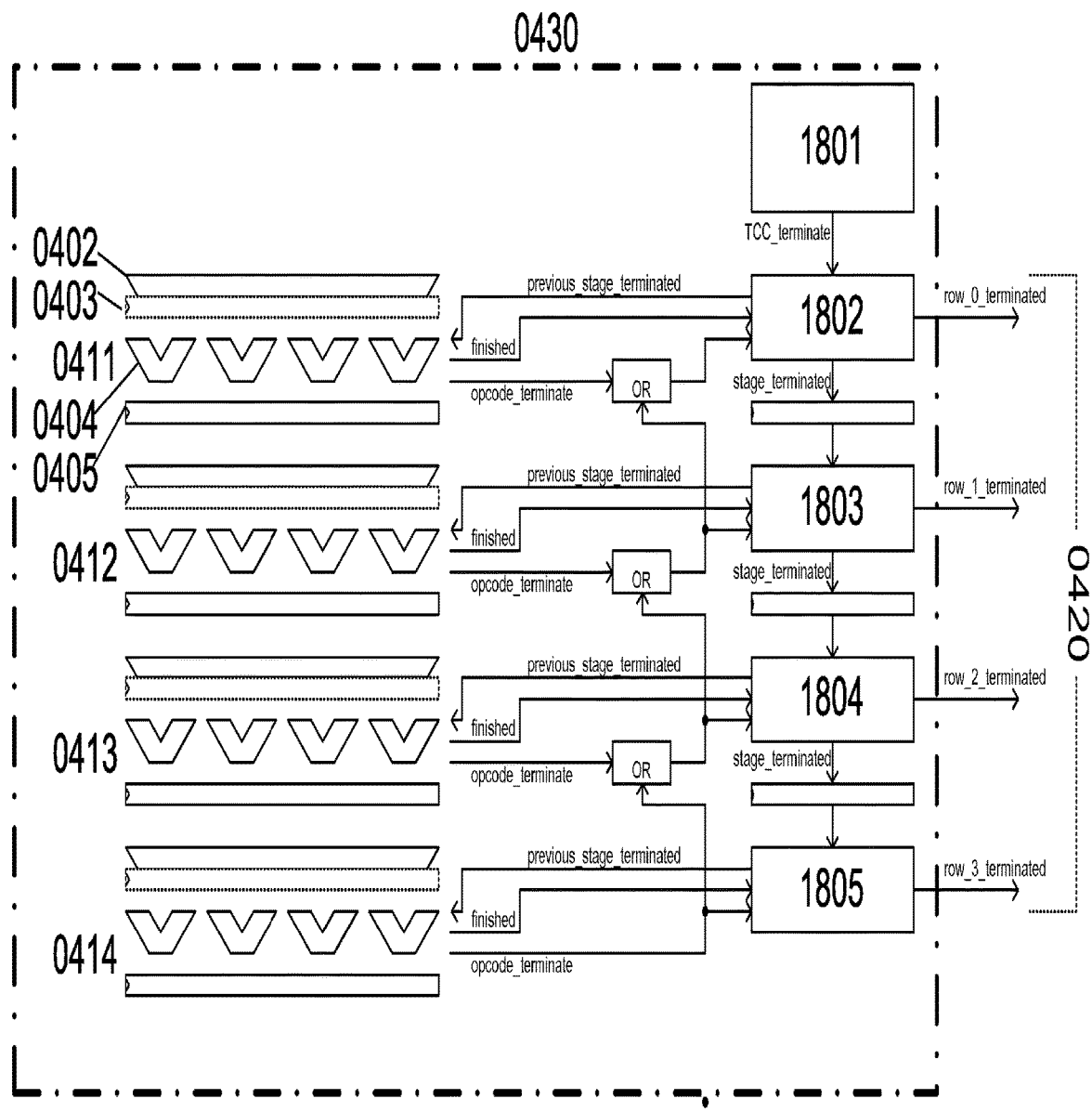
FIG. 18 is a diagrammatic illustration of an example of mechanisms for synchronization between an ALU-Block and an Instruction Issue unit.

An exemplary embodiment of the synchronization between the ALU-Block and the Instruction Issue unit is shown in FIG. 18. Two mechanisms of terminating a loop and/or the execution of the data processing in the ALU-Block are implemented in this exemplary embodiment: a) Termination-Control-Counters (TCC, 1801) and b) TERM-instructions executable in each of the ALUs of the rows of ALUs (i.e. 0411, 0412, 0413, 0414). It shall be expressively noted, that any one of the implemented methods is sufficient to handle the termination, but the implementation of both are regarded the most efficient and flexible approach.

The Termination-Control-Counters (TCC, 1801) generate a termination signal (TCC_terminate), when the final loop iteration or another kind of stop criterion is met.

Each ALU row/stage has related termination logic (1802, 1803, 1804, and 1805). Based on an incoming termination signal (either TCC_terminate or stage_terminated) the termination logic generates a signal indicating that the pervious stage has terminated (previous_stage_terminated), the signal is send to the according ALU stage.

In response to the previous_stage_terminated signal and the completion of the current operation of all ALUs within the row/stage, the respective ALU stage completes processing and sends back a finished signal.

After reception of the finished signal the respective termination logic sends a signal (stage_terminated) indicating the termination of the stages operation to the subsequent termination logic. Additionally each termination logic generates a signal (0420, row_i_terminated, i$\in$\{0, . . . , n\}), which indicates the termination and ability for receiving the next instruction to the Instruction Issue unit, e.g. according to FIG. 17.

The result of the TERM opcode of each ALU in an ALU row/stage is logically OR combined to generate the signal op_code_terminate indicating that a termination condition is met.

In a simple embodiment, a TERM opcode can only be issued to ALUs of the first ALU stage of the ALU-Block. In the related termination logic, the opcode_terminate signal is combined with the TCC_terminate signal such, that either of the two triggers the termination event, which is then signalled via stage_terminated the downstream termination logics.

However, in the preferred embodiment, any ALU can execute a TERM opcode regardless of its position within the ALU-Block. Therefore it is necessary to provide the termination information the ALU stages upstream of the ALU processing the TERM opcode. This may be done via an OR gate chain heading upstream, i.e. in the opposite direction of the dataflow.

Trashing

Supporting the generation of the opcode_terminate signal by the TERM opcode at all stages generates two problems: 1. Results may have been generated already by ALU stages upstream the one detecting the termination, 2. those upstream ALUs may also have consumed FIFO entries in the FIFO Data Registers (FDR) by sending out the ACKnowledge according to FIG. 20.

Trashing means:
 a) The produced results need to be trashed; and/or
 b) the consumed FIFO entries need to be reinstalled.

Depending on the software model trashing may not be implemented at all, support only a) or b) or a) and b).

Figure 23:
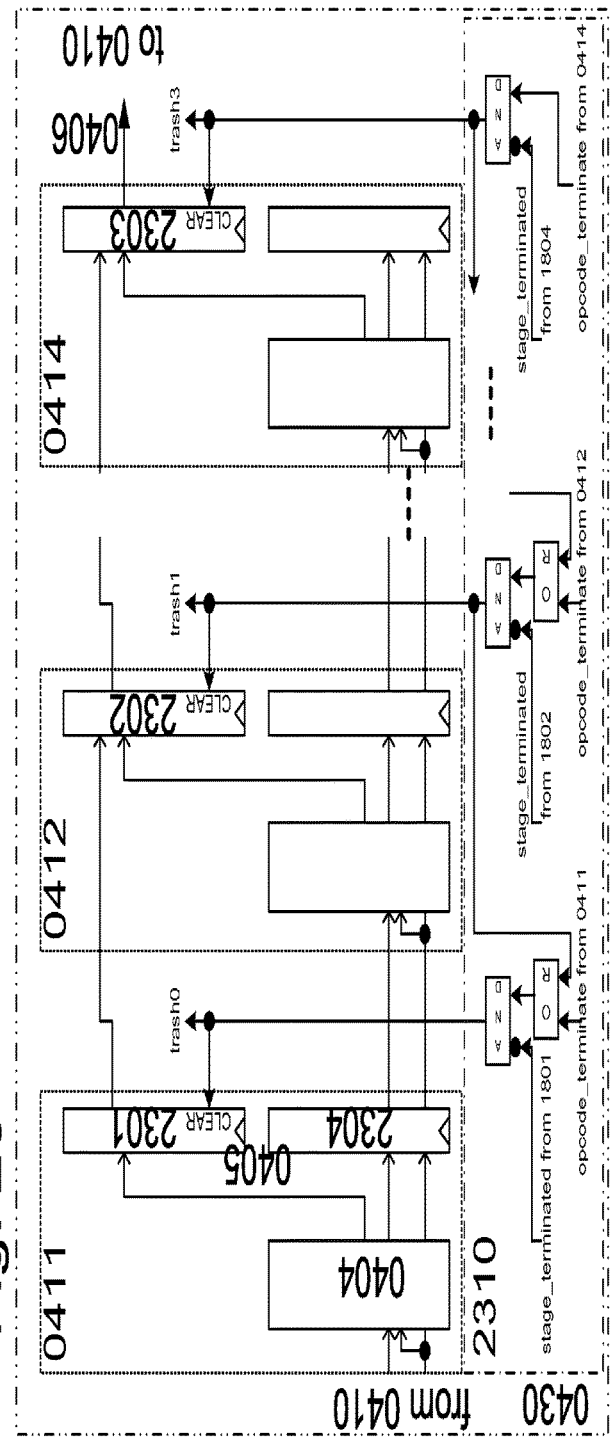
FIG. 23 is a block diagram of an example of an ALU-Block as in FIG. 4.

Case a), the trashing of results, may be implemented by clearing the valid bits of the results in the result write-back pipeline. The write-back pipeline is implemented in parallel to the data processing pipeline of the ALU datapath. The valid bits of all stages are cleared by the asynchronous opcode_terminate signal. FIG. 23 shows another representation of the exemplary ALU-Block of FIG. 4. The ALU stages (e.g. 0404) and the respective pipeline output register (0405) are shown. 0405 is drawn in greater detail, with the distinction between the part of the register forwarding the result data to the subsequent stages (2304) and the result write-back part (2301) transmitting the results to the Register File (0410). The result write-back registers of each stage (2301, 2302, 2303) built a register pipeline for pipelined result write-back.

An asynchronous upstream trashing chain (2310) is implemented. To generate the trash signal for each stage, the trash signal of the downstream stage is logically ORed with the opcode_terminate signal of the same stage to generate the trash chain. The resulting signal is logically AND combined with the stage_terminated output of the termination logic of the same stage. Thus blocks the generation of the respective trash signal for the stage, in case the stage has already been terminated by a termination signal moving downstream.

The OR gate of the bottom stage is obsolete, as the stage has no incoming trash chain input from any downstream stage.

The generated trash signal of each stage (trash0, trash1, . . . , trash 3) is used to clear the valid flag of the result write-back registers of the very same stage.

Case b), the reinstalling of the register values of the FIFO Data Registers (FDR), may be implemented by altering the read pointer of each of the FDRs in accordance to the trash signals generated by the trash chain 2310.

A history of the read_pointer position is recorded in record registers. It reaches back so far, that all stages of the write-back pipeline are covered. The historic read pointer of the oldest stage being trashed can be replaced with the content of the respective record register, selected by a multiplexer.

Figure 24:
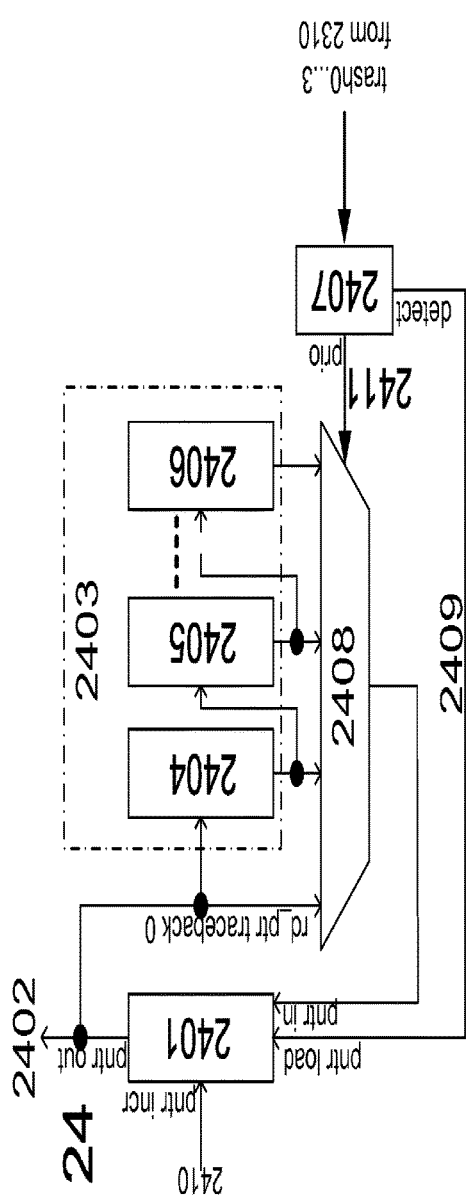
FIG. 24 is a block diagram of an example of read pointer logic for FIFO data registers.

FIG. 24 shows an exemplary implementation of the read pointer logic for each of the FDR. A read pointer 2401 moves cyclic through the stages of the FIFO and provides the address (2402) to the stage to be read. The read pointer is enabled by the asynchronous ACKnowledge signal (2410) of FIG. 18.

The history of the read pointer is recorded in record-registers (2403), which are implemented as a bucket chain of registers, forwarding their contents in each cycle from one to the next. The first register (2404) receives the address from the address pointer (2401), and forwards it on a cycle by cycle basis to register 2405 and then via 2405 and subsequent registers in the chain to 2406. A priority decoder (2407) detects (prio, 2411) the earliest (in term of time) trashed stage. This is the most downstream one, which means trash 3 has the highest and trash 0 the lowest priority. A multiplexer (2408) selects on the basis of the prio output (2411) the according historic address from the record registers (2403).

The priority decoder also generates a detect signal (2409), in case one of the incoming trash signals (trash0, . . . , trash3) is set.

If the detect signal (2409) is set, the pointer (2401) is reloaded with the historic address provided from the multiplexer 2408.

Instruction Compression

In VLIW mode only one ALU row may being used for data processing. Therefore the End-Of-Code token provides an efficient method to increase the code density and reduce number of accesses of the instruction memory, by skipping the Instruction Issue to all ALU rows below (i.e. downstream) the first row.

Reduced memory size (i.e. high code density) and reduced bandwidth (i.e. reduced number of code memory accesses) are important for cost and power savings.

However, it may happen that not all ALUs of a row are used by an instruction, regardless whether it is row 0 or any row below (i.e. downstream).

An efficient compression is implemented in the preferred embodiment, by an indication within the instruction for which of the ALUs of the respective row opcodes are supplied. Instructions can be condensed by reducing their width in case not all ALUs are supplied. Condensed instructions are packed together for compression.

The example in FIG. 29 shows an instruction, which allows either to supply instructions for the ALU columns 0 to 3 or, when compressed, for the ALU columns 0 to 1 only.

If the "compressed" bit is set, no opcodes for the ALUs of column 2 and 3 are supplied. The instruction ends at position SHORT. The next instruction immediately starts after SHORT.

As the simplified example in FIGS. 30a, 30b, and 30c shows, 4 compressed instructions may fit the memory area of 3 uncompressed instructions.

Preferably the instruction format is chosen such, that SHORT is aligned to byte or word boundaries of the instruction memory address. This significantly simplifies the calculation of the instruction addresses for jump operations.

Pre-Instructions

Pre-Instructions are instructions fetched, issued and executed once in front of a subsequent stable, stand-alone and self contained instruction. In the typical implementation Pre-Instructions are instable and not stand-alone and not self contained instruction, but provide additional information or settings for the subsequent stable and self contained instruction. Pre-Instructions compare to nuclides, they decay immediately after their first execution. They are immediately replaced by a related normal, stable, stand-alone and self contained instruction. Therefore the dispatcher is not moved to the subsequent ALU row (or column in vector mode) but remains at the same position until the related instruction is issued. Pre-Instructions support seldom used extension of instructions, which should not be coded within the standard instruction set for cost reasons (e.g. in order not to make the instruction wider than necessary, or to increase the code density). Pre-Instructions may address seldom used registers, implement seldom used compare functions or status flag checks, insert constants, or select additional execution modes not supported by the standard instruction. Pre-Instructions are thus comparable to a prefix of a word. They cannot exist stand-alone and are not self-contained.

One or multiple Per-Instructions can be issued in front of a normal standard instruction. Pre-Instructions may be used in any of the modes, from normal processor operation (e.g. VLIW) to Hyperscalar modes.

5.1 Loop Handling and Branching

In the prior art, the jump back from the end of a loop to its entry is done by a conditional execution at the exit of the loop, for example as follows:

cmp terminate ;did loop header detect last cycle?
jnz loop_entry ;if no, jump to loop entry, re-loop
;if yes, exit For evaluating the comparison "cmp", conditional jump "jnz", readjustment of the program pointer and reloading of the instruction pipeline, including Instruction Decoder significant amount of clock cycles is consumed. Obviously this is inefficient. Some technologies known in prior art offer smart handling of the program pointer by setting the step width with positive and negative offset specifically based on the current instruction. However this mechanic disables the concept of pipelining and makes the program pointer calculation to a critical path in the chip design.

In one embodiment a (or branch) instruction is implemented, which operates as a jump and sets the program pointer PP to address of the next instruction. During the first execution the loop (or branch) requires a delay slot, as a jump-instruction does. However, simultaneously the current program pointer ($PP_{current}$) is recorded by storing in a lookup table as a first entry, together with the target address of the jump ($PP_{loop}$) as a second entry. The the loop (or branch) instruction is used at the loop exit ($PP_{current}=PP_{loopexit}$). A compare between the Program Pointer PP with the first entry of the lookup table enables the future pre-detection of a loop exit, in which case the program pointer PP is set to the second entry of the lookup-table, e.g. via a multiplexer.

When the program pointer reaches the loop instruction at the loop exit again ($PP_{current}=PP_{loopexit}$), PP is automatically set to $PP_{loop}$, which causes a jump, without requiring a delay slot.

In case the condition changes and the loop terminates, the loop-instruction is not executed, instead PP is incremented as usual.

As the described mechanism will have set the program pointer PP to $PP_{loop}$ already, the current Instruction Fetch becomes invalid and a delay slot is required to fetch the instruction at $PP_{loopexit}+1$.

In one embodiment an instruction (called looppreset thereafter) may additionally or alternatively be implemented, which is used within the loop header or loop preamble and predefines the value of the program pointer at the loop body's exit:

looppreset<relative_distance>-><relative_target>

The instruction "looppreset" sets the program pointer PP when reaching position ($PP_{loopexit}$) of the loop instruction $PP_{loop}$ plus relative distance to the new program pointer $PP_{loopexit}$ minus relative_target. The according operation is:

if PP==($PP_{loop}$+relative_distance) then
PP $PP_{loopexit}$-relative_target $PP_{loopexit}$ is the program pointer at the end of the loop, which is reset to the entry of the loop by loading the current Program Pointer PP with $PP_{loopexit}$-relative_target. "relative_ target" is the distance between the loop entry and the loop exit. $PP_{loop}$ is the program pointer at the looppreset opcode incremented by one.

In hardware the operation is achieved for example by comparing the current Program Pointer PP with the value $PP_{loop}$+relative distance, which is stored in a register. If the values are equal the current Program Pointer PP is immediately replaced by PP–relative_target via (for example) a multiplexer.

The looppreset-instruction can be implemented in addition to the loop-instruction. In this case, looppreset will preset the lookup table used by the loop-instruction, and eliminates the first delay-slot by doing such.

The benefit of this methodology is the implicit update of the current Program Pointer PP at the exit of a loop instead of moving the current Program Pointer PP to the next instruction by incrementing it by 1 (PP:=PP+1). The compare and select operation (if PP==($PP_{loop}$+relative_distance)) can be computed within the address generation in parallel to the increment of the current Program Pointer by 1. Only the multiplexer, selecting either the incremented current Program Pointer (PP:=PP+1) or the pre-calculated jump back to the loop entry (PP:=$PP_{loopexit}$-relative_target) adds additional signal delay in hardware. Penalties due to the jump instruction such as "delay slots" forced by reloading the instruction path are avoided. The standard loop exit is towards the loop entry, which is obviously the most recent case. The termination of the loop now requires extra cycles as the program pointer has then to be changed from PP:=$PP_{loopexit}$-relative_target to PP:=$PP_{loopexit}$+1.

It shall be explicitly mentioned, that in preferred embodiments the methods discussed above are not limited to the handling of one single loop by the instructions loop and/or looppreset. Multiple and in particular nested loops can be efficiently processed using the methods by implementing more than one lookup table for automatically resetting the program pointer from a loop exit to a loop entry. In a preferred embodiment 8 lookup tables are implemented for handling up to 8 loops, while a more cost conservative embodiment uses only 4 lookup tables. Theoretically the number of lookup-tables is not limited and depends only on the required cost/performance ratio.

The ZZYX Load/Store Unit

The load/store model of the ZZYX processor is based on the conclusion that today's most typical and challenging algorithms provide great potential of data localization. Either the algorithm itself contains a high degree of data locality, as FFT and DCT parameters or filter coefficients, or locality can be generated by code optimization during source code compilation, for example by prefetch analysis and insertion and accordingly optimizing loops. Various methods will be described in the subsequent compiler section.

As a further important aspect a great amount of such algorithms can be optimized in a way to make load/store latency almost negligible, as data may stream without dependences between address generation and data transfer.

Another aspect of the load/store model is the increasing amount of streaming data. Streaming data is poorly suited for memory hierarchy and caches. In the most optimal implementation it bypasses the memory hierarchy completely.

Again latency is almost negligible as such data streams are have a high independence of the according address generation, in some cases no address generation is required at all.

Figure 9:
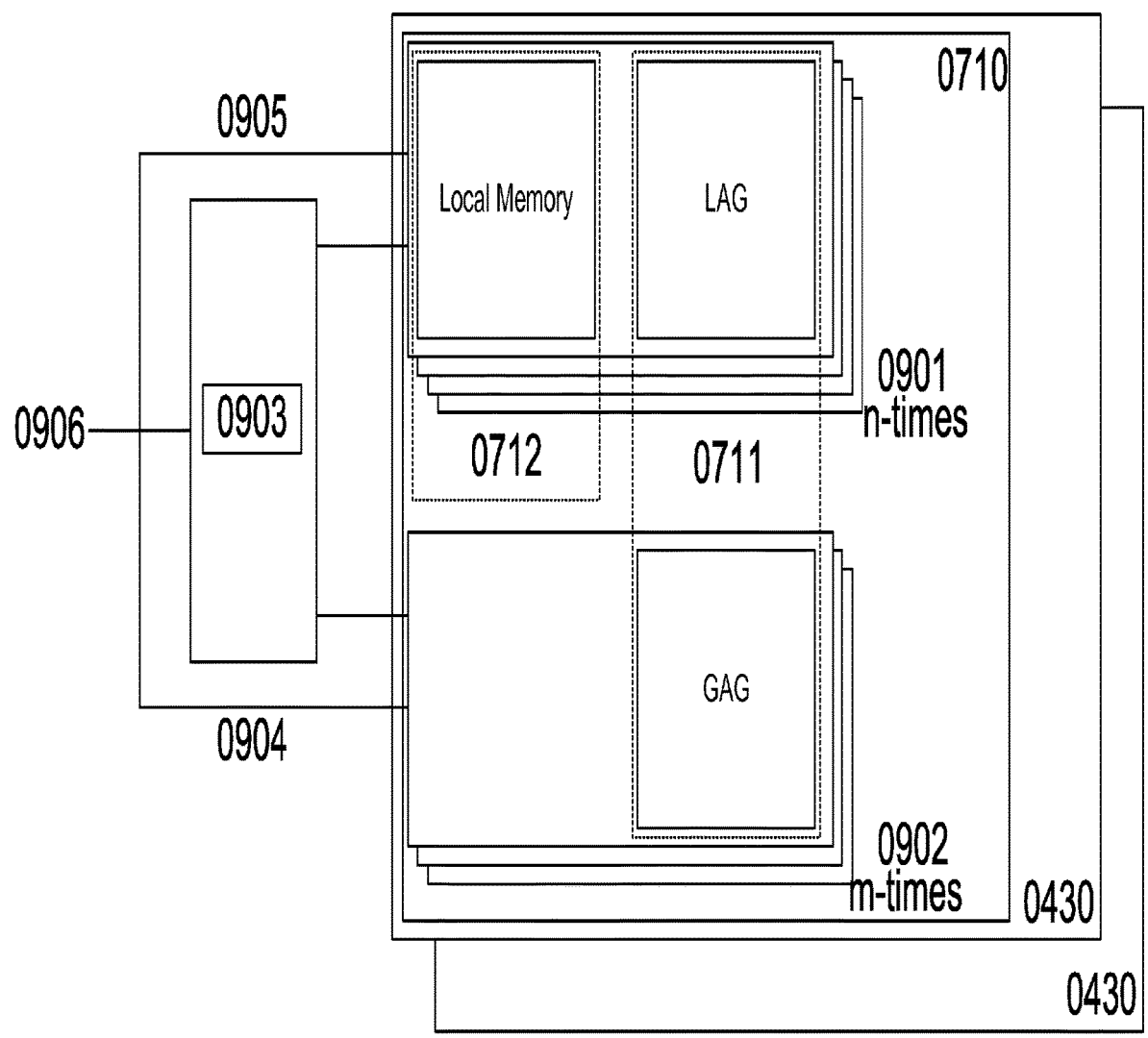
FIG. 9 is a block diagram showing an example of an overview of a load/store model.

FIG. 9 shows an overview of the load/store concept. Each ALU-Block (0430) comprises multiple (n) Global (GAG) and multiple (m) Local (LAG) Address Generators.

Global Address Generators (0902) access directly the Level-1 (L1) memory hierarchy (0903). Additionally they are used to transfer data streams either directly to or from either lower memory hierarchies such as Level-2 (L2) or even down to system main memory or even from system IO ports. For efficient data streaming bypass capabilities and means (0904) are provided for the specific memory hierarchies.

Local Address Generators are combined with Local Memory (LM) (0901) and access it directly, closely coupled to the Local Address Generators. Each of the Local Memories may operate independently in one multiple modes, depending on the applications. Such modes may be Random-Access, Random-Access with software controlled prefetch, Random-Access with automatic prefetch, Cache, Cache with prefetch, Cache with Block Load/Store, Double-Buffer, Local Scratch Memory, Local Memory with explicit Block Moves for Block Load/Store, Local FIFO, Global FIFO, Local Stack, and Global Stack.

Preferably a dirty mechanism is implemented, so that only modified data is written back. Additionally the window may be declared as scratch memory, which disables the write back feature.

In Random-Access mode, data may be prefetched via a block move unit preferably integrated into the Local Memory.

In a software controlled mode, prefetching and/or flushing of the data from and/or to the lower level memory hierarchy is initiated by dedicated instructions under control of the software.

In an automatic prefetch mode the Local Memory operates as a window into the main memory. The address range of the main memory addresses are truncated to fit into the size of the window. Whenever a data access into the Local Memory is outside the current window, data inside the Local Memory will be written back to the lower level memory hierarchy. Then the data of the current data access is loaded from the main memory (or the lower level memory hierarchy, if available there). Next all data in a "vicinity" of this data access is prefetched into the Local Memory. Vicinity may have multiple definitions and the prefetch may operate in various vicinity modes:

a) The window is aligned with the addresses in the main memory. E.g. the window may be 256 data words wide. The 8 lower address $A_7 \ldots A_0$ bits define the data address in the window, the higher address bits $A_n \ldots A_7$ define the position of the window in the main memory. The data range from $A_7 \ldots A_0=0$ to $A_7 \ldots A_0=255$ is loaded from the main memory.

b) A virtual memory concept is implemented in order to virtualize the Local Memory and split into segments. The virtual Local Memory address is translated into a physical Main Memory address and the related segment is automatically block moved from the Main Memory into the Local Memory or back from the Local Memory into the Main Memory. The virtual memory concept is subsequently described in more detail.

c) obviously various other vicinity modes are possible depending on the requirements of the target application of the ZZYX processor.

In Global FIFO or Global Stack mode the FIFO or Stack may be spilled versus lower level memory hierarchies in case of overrun or underrun. This leads to an almost unlimited FIFO or Stack space inside the Local Memories. Spilling may occur in the background non interrupting normal memory operations and almost no negative impact on the bandwidth between the ZZYX core and the Local Memory. The spilling capability enables large Stacks or FIFO to be implemented in the Local Memories without the penalty of Main Memory accesses.

In case the memory space for the FIFO or the Stack inside the local memory becomes full, a part of the FIFO or Stack is written into the lower level memory hierarchy. Typically the oldest entries in the FIFO or Stack are chosen for writing back. The data transfer is typically handled by the block move unit of the Local Memory.

In case the memory space for the FIFO or the Stack inside the local memory becomes empty, data eventually still available in the lower level memory hierarchy is transferred back into the Local Memory.

The Local Memory is supervised by a Statemachine, which controls the data filling level inside the Local Memory and implements the various operation modes (such as FIFO or Stack). The statemachine comprises counters for maintaining both the Local Memory internal filling level and the filling level in the lower level memory hierarchy, means the amount of data spilled. The Statemachine controls the Block Move unit, which actually transfers the data. The Block Move unit comprises pointers into the lower level memory hierarchy for maintaining the addressing of the data transfer. Basically the Block Move Unit operates similar to known Direct Memory Access (DMA) controllers.

In the preferred embodiment spilling is not triggered by a Local Memory full or empty state, but already if the filling level reaches almost full or almost empty. This allows for adjusting the Local Memory data level via the Block Move unit in the background in parallel to further data processing by the ZZYX core. This reduces the penalty for wait cycles in case no data can be transferred between the Local Memory and the ZZYX processor core due the filling level.

Which modes are implemented in a specific ZZYX processor depends on the target market. Each Local Address Generator may operate at runtime in a different mode, which is defined by the application or algorithm being executed.

Local Memories are a memory hierarchy of their own and at the same level as Level-1 (L1) memory. Usually typically only the respective Local Address Generators within an ALU-Block access the Local Memory, there is no need for providing the data to other Address Generators.

Figure 14:
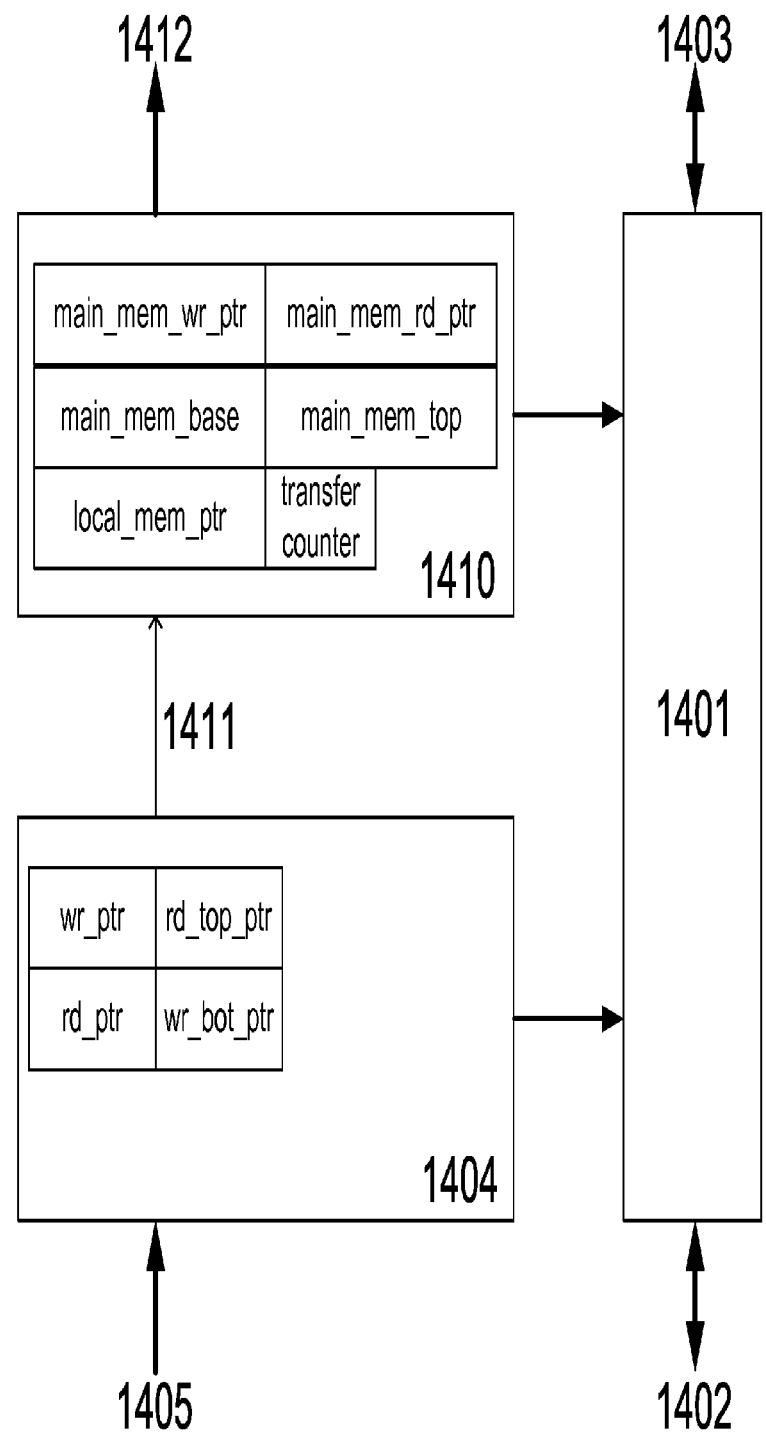
FIG. 14 is a block diagram showing an example of an implementation of a local memory.

FIG. 14 shows an implementation of a Local Memory. The memory bank (1401), which is preferably SRAM based has a data interface (1402) to the ZZYX core comprising the ALU-Block(s) and a data interface (1403) to the memory hierarchy. A first controller called "mode-controller" constitutes the address interface to the ZZYX core comprising the ALU-Block(s) may operate in at least in some of the modes previously described. The mode-controller (1404) comprises a write pointer (wr_ptr) and a read pointer (rd_ptr) for modes such as e.g. FIFO and Stack and an address interface (1405) from the ZZYX core for supporting direct access into the memory bank (1401) by passing the incoming address directly to the memory. In some implementations the address input (1405) may be used for address calculations such as a base address plus the incoming address (1405), which may be used e.g. for indirect addressing of the memory (1401).

Figures 14A, 14B, 14C:
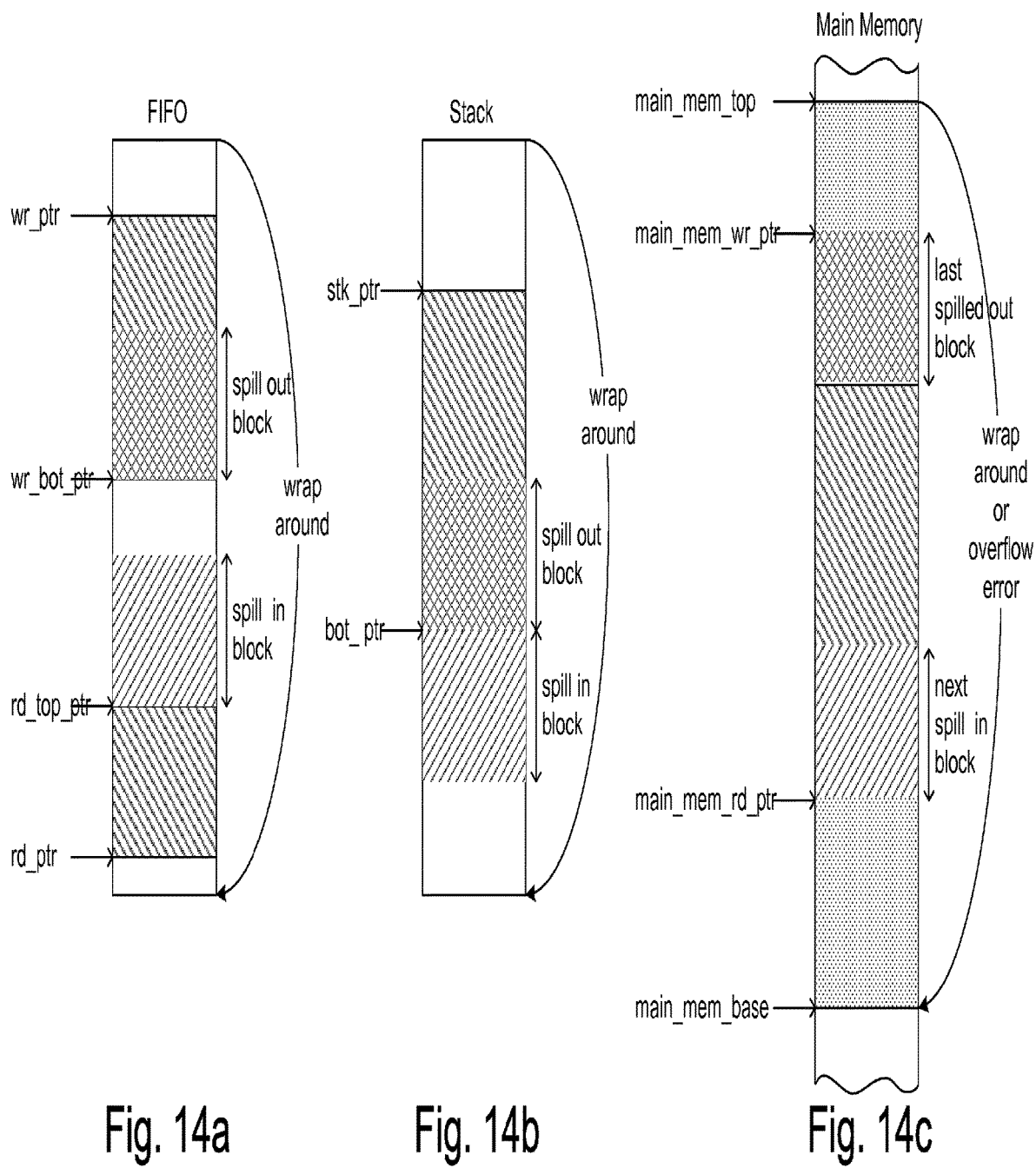
FIGS. 14a and 14b are diagrammatic illustrations showing pointer operations for a FIFO mode and a stack mode, respectively.
FIG. 14c is a diagrammatic illustration showing main memory pointers for operations for FIFO and stack modes.

In FIFO Mode the read pointer (rd_ptr) points to the location of the next data word to be read and the write pointer (wr_ptr) points to the next free memory location as shown in FIG. 14*a*. In Stack Mode either the read or write pointer is used as stack pointer (stk_ptr) depending on the implementation. As shown in FIG. 14*b* the stack pointer (stk_ptr) points to the top of the stack. Whether the stack grows from top to bottom or bottom to top is solely a matter of implementation. Exemplary shown is a stack growing from bottom to top.

For spilling blocks of the Local Memory vs. the Main Memory two further pointers exist: The read top pointer (rd_top_prt) points to the last word in the memory available for reading and the write bottom pointer (wr_bot_ptr) points to the last word in the memory newly written into it.

A block of data, which size (block_size) may be fixed or defined by software via an according register may be transferred from the Local Memory to the Main Memory or back from the Main Memory to the Local Memory to implement spilling of the Local Memory.

In FIFO mode according to FIG. 14*a* the rd_ptr moves towards the Rd_top_ptr. The difference between the two pointers is calculated by a first subtractor. If the difference between becomes too less, a block of data (spill_in_block) is loaded (spilled in) from the Main Memory and the rd_top_ptr is adjusted to the top of the new data block.

The wr_ptr moves away from the wr_bot_ptr. The difference between the two pointes is calculated by second subtractor. If the difference becomes too large, a block of data (spill out block) from the wr_bot_ptr upwards is stored in (spilled out to) the Main Memory.

The space between rd_top_ptr and wr_bot_ptr is calculated by a third subtractor. It may occur that not enough space is left between both pointers to fill in another block of data. Several strategies can be implemented such as spilling additional data out or delaying the spilling in of new data until enough space is available. However, spilling more data out may not solve the problem as not enough data could be spilled out, and delaying further read operations may lead to deadlocks in the system. Therefore such strategies may be used but can lead to very sophisticated additional mechanisms.

However a very simple but efficient strategy is just to block the spill in until the rd_ptr reaches rd_top_ptr and no further data is available to be read. Next further reading is blocked and wait cycles are generated if necessary. rd_top_prt and rd_ptr_are set to a new address which allows for sufficient space. Typically the two pointers could be set to wr_ptr plus n times the block_size (wr_ptr+n*block_size) is sufficient, while n is an integer preferably between 2 and 4. Now spilling in starts and rd_top_ptr is set to the new top of the spilled in data block. Further reading can be enabled as soon as the pointers are set to the new address.

At the top of the memory, the pointers wrap around to the bottom of the memory and grow again.

The FIFO flags full and empty may be generated by further subtractors:
  full=((wr_ptr−wr_bot_ptr)==0)
  empty=((rd_ptr−rd_top_ptr)==0)
    (PERL Syntax)

Accordingly are the almost full and almost empty flags generated, by subtracting an additional offset defining the "almost-range":
  almost full=((wr_ptr−wr_bot_ptr−offset)<=0)
  almost empty=((rd_ptr−rd_top_ptr−offset)<=0)
    (PERL Syntax)

Alternatively the flags could be generated by two counters, one for book-keeping the number of data entries in the read section and one accordingly for the write section. If the counters are zero, full and accordingly empty are set.

By subtracting an offset defining the "almost-range" from each of the counters and checking for less or equal than zero the almost flags are generated.

In the exemplary implementation the FIFO grows from bottom to top. Obviously this could be reversely implemented.

In Stack mode according to FIG. 14b either the read top pointer (rd_top_ptr) or write bottom pointer (wr_bot_ptr) is used as bottom pointer (bot_ptr) pointing to the bottom of the stack depending on the implementation.

Pushing data onto the stack makes stk_ptr moving away from bot_ptr, popping data from the stack moves str_ptr towards bot_ptr.

A first subtractor is calculating the difference between stk_ptr and bot_ptr. The subtractor may be the same as the first or second subtractor for calculating the differences between the pointers in FIFO mode.

If the difference becomes too large, a data block (spill_out_block) is spilled out to the Main Memory as described in FIFO mode and the bot_ptr is accordingly adjusted. If the difference becomes too less, a data block (spill_in_block) is spilled in from the Main Memory and the bot_ptr is accordingly adjusted.

Spilling out moves bot_ptr towards stk_ptr, spilling in moves Bot_ptr away from stk_ptr.

It may be beneficial to provide stack status information for the program via a stack status register.

In order to prevent stack underflows the status information may comprise an stack_empty flag, which is calculated as follows:
  stack_empty=(stk_ptr==bot_ptr)
    (PERL Syntax)

Alternatively and equivalent to the description of the FIFO mode, a stack entries counter could be implemented for book-keeping the number of entries on the stack. The stack_empty status is set if the counter is zero. As the counter may overrun if the stack becomes too large, a stack_overrun status may be set in case of an overrun.

In order to prevent stack overruns the maximum stack size in terms of entries could be stored in a register by the program. A comparator compares the register with the stack entries counter and generates a stack_full flag in case both values match. The stack full flag may be available in the stack status register. The stack empty flag could trigger a processor exception if a further pop operation tries to read further values from the stack, while the stack full flag could trigger a processor exception if a further push operation tries to write further values onto the stack. The processor exception could be handled by the software or operating system and handle the runtime error. Also the status register and/or the exception can be used by debugging tools.

According to FIG. 14, the spilling operations are controlled by the block move unit (spill unit) (1410). Spilling in or out is initiated (1411) by the mode-controller (1404). The spill unit may comprise at least two pointers into the main memory for defining a data window from main_mem_base to main_mem_top, and furthermore a write pointer main_mem_wr_ptr and a read pointer main_mem_rd_ptr. A further pointer (local_mem_pointer) points to the address in the memory (1401) from which or to which data shall be transferred. A transfer counter (transfer counter) counts the transferred data words and stops the data transfer if the block size has been reached.

The pointers main_mem_base and main_mem_top are set by the software. The data read and write pointers (main_mem_rd_ptr and main_mem_wr_ptr) move in the area between the base (main_mem_base) and top (main_mem_top) of the data window.

FIG. 14c shows details of the main memory pointer operations.

In FIFO mode the pointers main_mem_rd_ptr and main_mem_wr_ptr may wrap around to main_mem_base after reaching main_mem_top. If main_mem_wr_ptr approaches main_mem_rd_ptr and becomes equal, the data window is full and no more data can be written into it. A full status (window_full) may be produced which may be available in a status register to the software or may generate a processor exception.

In Stack mode the pointers cannot wrap around as, due to the nature of a stack, the data entries at the bottom of the data window are in use. An overflow status (stack_overflow) may be produced which may be available in a status register to the software or may generate a processor exception.

Both processor exceptions (window_full and stack_overflow) could be handled by the software or operating system and handle the runtime error. Also the status register and/or the exception can be used by debugging tools.

The read pointer (main_mem_rd_ptr) points to the lowest address of the next data block (next spill_in_block) to be spilled back into the Local Memory.

The write pointer (main_mem_wr_ptr) points to the first free address on top of last spilled out data block (last spilled out block) from the Local Memory, where data at the next spill out will be written to.

The local memory pointer (local_mem_ptr) is loaded at the time of initialization of a block move by the mode-controller with either wr_ptr or rd_ptr, depending whether a spill out or spill in block move is initialized.

The transfer size in the transfer counter may be fixed in hardware or be set by the software at runtime.

In the exemplary embodiment the pointers move from the bottom of the data window to its top. Obviously this could be reversed.

While it is not explicitly mentioned, it is obvious for someone skilled in the art, that the various read and write pointers may increment or decrement during data transfer and block move operations in accordance to the specific operation.

6.1 Software Model of the Load/Store Unit

The Load/Store Units in an exemplary embodiment can operation in at least two basic modes:
a) Random Access, the addresses are generated using the ALU-Block
b) Burst, the addresses are generated by the respective Load/Store Unit by a kind of DMA controller The basic operation mode is dedicated selectable for each of the Load/Store units by software.

Random Access Mode

Data transfers are initiated by either a LOAD or STORE instruction. The instruction selects the Load/Store unit to transfer the data and sets the address from or to which the data shall be transferred.

A further separated instruction, defines the data transfer. Typically this is done by a move (MOV) instruction moving data to or from a register (typically one of the FIFO Data Registers (FDR) or VLIW Data Register (VDR), or may be (if implemented) from other registers, such as e.g. dedicated CoProcessor registers). Also common ALU instructions may use a Load/Store unit either as source for operands or as target for the result of the data processing in the ALU.

The initiation of a Store transfers by a STORE instruction and the data transfer may occur in any order:
1. Initiation of a Store transfer (in a first clock cycle, the data transfer in a subsequent clock cycle
2. Initiation of a Store transfer and the data transfer in the same clock cycle
3. Data transfer in a first clock cycle, the initiation of the Store transfer in a subsequent clock cycle A Store transfer is only executed by a Load/Store unit, when data and address are available. Data and/or address information is buffered and combined within the Load/Store unit.

The initiation of a Load transfers by a LOAD instruction and the data transfer may occur in only in two orders:
1. Initiation of a Load transfer in a first clock cycle, the data transfer in a subsequent clock cycle
2. Initiation of a Load transfer and the data transfer in the same clock cycle Attempts to transfer data in a first clock cycle and initiating the Store transfer in a subsequently will lead to a dead lock of the system, as the data transfer will cause wait cycles due to missing data and the data transfer will never be initialized.

Addresses and data sent to and data received from a Load/Store unit will be transferred via a FIFO between the ALU-Block and the Load/Store unit. This allows a higher independency of the ALU-Block operation from the Load/Store operations and reduces the number of wait cycles caused by memory and/or bus system latency and/or arbitration of the memory and/or bus system.

A valid flag is attached to addresses and data to signal their validity. Once a data or an address has been consumed, which means accessed by the receiving element (Load/Store unit or ALU-Block, depending on the transfer), the valid flag is reset. If data or an address is required, but no valid flag is set, the operation stalls until the data or address becomes valid. All transfers are automatically synchronized by the valid flags.

Burst Mode

In burst mode a Load/Store unit will be set up as self address generating DMA (Direct Memory Access) like unit. Depending on the implementation of the Load/Store unit, either one address generator is implemented, supporting one transfer (either a Load or a Store transfer) or multiple address generators are implemented supporting multiple transfers in parallel (e.g parallel Load and Store transfers).

The set up and initialization is done by a specific instruction (LSSET). During operation no LOAD or STORE instructions are required for initializing data transfers.

Result data can be continuously written to the Load/Store unit for storing in memory, accordingly operand data can be continuously read from memory via the Load/Store unit; both until the address generator may reach a final address. This may trigger an interrupt or exception, or can be polled by software.

Split Transfer

Load/Store operations are (as already described) split into
1. an initialization command, which is either a LOAD, STORE, or LSSET instruction, initializing either a load, store or DMA-like burst transfer. The initialization command is also setting or defining the memory address of the data transfer.
2. a data transfer command, which is either a move (MOV) instruction, or any ALU instruction such as algorithmic and/or logic instructions, or any operand data requiring and/or result data producing instruction.

The concept of splitting the address and data transfer is beneficial for various reasons, for example:
1. By initiating e.g. a load transfer prior to the actual need for the data and subsequently executing other code, not yet requiring the data to be loaded, and/or switching to a different thread or task, the latency for loading the data can be avoided. For example, one or more Load transfers could be initiated and then e.g.
   a. code not requiring the data to be loaded is executed; or
   b. a switch to another thread or task could be performed in order to hide the latency for loading the data.

Inefficient wait cycles are reduced. This simplifies the overall processor architecture and the software and/or operation system design.
2. Load/Store units operating in burst mode, generate the memory addresses internally using an address generator. Therefore no address transfer from the ALU-Block is required. In burst mode Load/Store units, once set up by an LSSET instruction, operate autonomously and transfer data to and/or from the ALU-Block via FIFOs.

The FIFOs decouple the operation and timing of the ALU-Block from the operation of the Load/Store Unit. As the transfers are automatically synchronized by the valid flags, LOAD or STORE commands would only put a burden on the programmer to handle the synchronization in software too—and would reduce the code density with unnecessary opcodes.

Highly efficient is the optimization according to 1.a). The compiler can schedule the code accordingly by inserting LOAD instructions early in the code and then placing code not requiring the data to be loaded behind them. By doing so, wait cycles can potentially be completely avoided and occur only in case the data is not yet available when ultimately accessed.

While it is an option to switch to another thread or task after executing load instructions, it is less efficient then inserting code between the load instruction and the instruction requiring the data: Unless multiple Register Files are provided by the processor, performing a task or thread switch requires off-loading and loading of registers for the context switch, which significantly reduces the efficiency of this approach.

Scheduling load instructions early in the code is a technique already known in the prior art. Typically processors execute the load instruction and monitor the register the data will be loaded into. Potential wait cycles are suppressed until the register is accessed and the data to be loaded is not available yet. Various methods are known to monitor the registers and suppress the wait cycles, all significantly increasing the complexity and transistor count of the processor. In comparison, the inventive approach requires almost no overhead and can be easier and more efficiently pipelined.

A load transfer according to the prior art may look as such: LOADW r3, bp+r10
; load register r3 with data
; from the indirectly addressed memory location
; basepointer bp plus register r10
<<<wait cycles until data is available>>>
ADD r0, r2, r3
; process data loaded into register r3

The code using split transfers required (typically) no wait cycles:
LOAD32 #3 bp+r10
; use Load/Store unit #3 for loading data
; from the indirectly addressed memory location
; basepointer bp plus register r10
<<<process any code not requiring the data>>>
ADD r0, r2, 1s3
; process data loaded by Load/Store unit #3 (1s3)

Virtual Memory

The preferred strategy for supporting the previously described automatic prefetch is based on a virtual memory strategy as it may provide two solutions simultaneously:

a) it supports virtualization of the Local Memory and splitting it into segments. The virtual Local Memory address is translated into a physical Main Memory address and the related segment is automatically block moved from the Main Memory into the Local Memory or back from the Local Memory into the Main Memory b) the same virtual memory strategy is used to implement Memory Management for memory virtualization and paging within Global Address Generators (GAGS).

All ZZYX internal addresses generated by any of the address generators, it may be Local Memory address generators (LAG) or global address generators (GAG), are regarded virtual.

The virtual addresses are translated via address translation tables (known as TLBs) into physical addresses.

Figure 15:
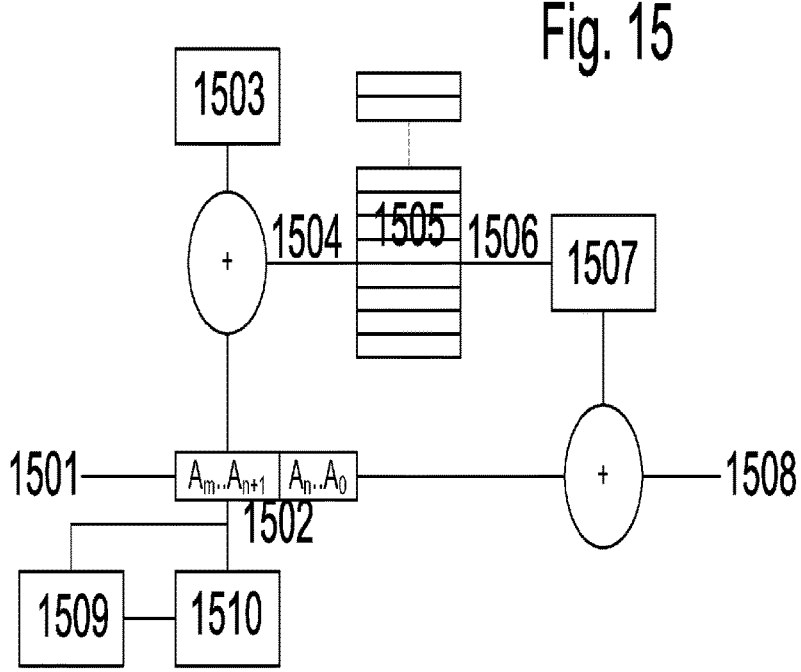
FIG. 15 is a block diagram showing an example of components for memory management.

FIG. 15 shows exemplary implementations of the memory management.

For the translation the virtual address (1051) is split (1502) into at least two parts, a physical offset which are the lower address bits $A_n \ldots A_0$ and at least one virtual pointer which are the higher address bits $A_m \ldots A_{n+1}$.

The virtual pointer ($A_m \ldots A_{n+1}$) is added to the base address of the address translation table (1503) in the memory. The result is the physical address (1504) of the lookup entry in the address translation table (1505) inside the Main Memory. The lookup result (1506) is stored in a register (1507) and is the physical base address for the data access. At each data access the physical base address is added to the physical offset ($A_r \ldots A_0$) of the virtual address (1501), resulting in the real physical address (1508) of the data access, which is used for the Main Memory access.

The address translation typically takes a number of clock cycles and is too slow to be executed during each memory access. Therefore a once translated virtual pointer is stored in a register (1509). At each subsequent access, the registers content is compared by a comparator (1510) with the current virtual pointer ($A_m \ldots A_{n+1}$). If both are equal, no address translation is required.

During the address look-up the data transfer is stopped and if necessary wait cycles are issues to the ZZYX core.

In case the values are not equal, which is called MMU-miss, the physical base address has to be looked up again.

While this may have no further impact if it happens at a global address generator (GAG), the impact on Local Memories is more extensive: The new access is outside the data block stored in the Local Memory. Therefore the Local Memory has to be completely reloaded. First a statemachine checks whether the locally held data block requires write-back. If so the statemachine checks whether the data block is dirty, which means that data inside has been modified. If so the data block is first block moved to the Main Memory. Next a new data block according to the new address is block moved from the Main Memory into the Local Memory.

Besides ordinary write-back, a write-through method may be used for Local Memories. In difference to write-back, each modified data word is immediately written not only into the Local Memory but also through to the Main Memory. This strategy required more clock cycles during write access, but saves the ultimate write back of the whole Local Memory to the Main Memory in case of a MMU-miss or simply a flush.

For checking the Local Memory status on dirty a dirty register is provided, which is set at the first write access to the Local Memory and reset only after the memory content has been written back into the Main Memory.

Writing back may occur based on previously described MMU-misses or driven by explicit flush commands issued by the software and forcing the block move unit to write back all data. Flush may be used for updating the Main Memory, sending Local Memory contents to peripherals or maintaining the coherence between multiple (Local) memory instances.

The basic approach of FIG. 15 implies a significant problem. It works efficient for small n, e.g. (n+1)−m=8, where the table 1505 remains with $2^{(n+1)-m}$ entries small (e.g. 256 entries for (n+1)−m=8). However if the address range of becomes large, e.g. (n+1)−m>20 with $2^{(n+1)m}$>1000000 entries, the table look up becomes inefficient.

Figure 15A:
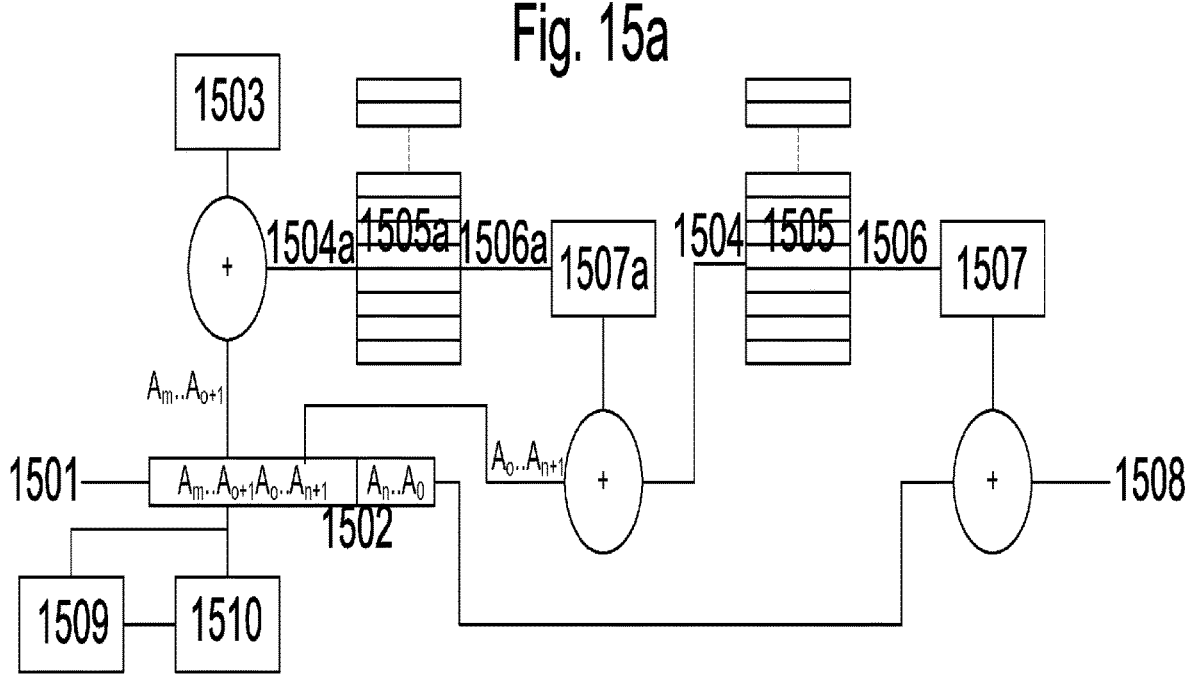
FIG. 15a is a block diagram showing an example of a two level lookup tree.

A two level or even three level lookup tree may be preferred in such processor configurations. FIG. 15a explains exemplary a two level tree version. The virtual address is split into two virtual pointers, a first one ($A_m \ldots A_{o+1}$) and a second one ($A_o \ldots A_{n+1}$). At first the first pointer is looked up in the path 1504a, 1505a, 1506a and 1507a, which works exactly as described for the according path (1504, 1505, 1506 and 1507) in FIG. 15. However the lookup result (1507a) is then added to the second virtual pointer ($A_o \ldots A_{n+1}$) and a second lookup is processed to compute the final physical base address in register 1507.

Further optimization is known in the state of the art and applicable. For further details or optimizations to public available Memory Management and Memory Virtualization literature is referred. The claimed inventions is the concept of automating the Local Memory block load and store operations versus the Main Memory by exploiting memory management concepts for segmenting the memory space into segments suitable for being held local in the Local Memories and being automatically transferred, while providing maximum data access and applicative efficiency.

Also various strategies are known in the state of the art to handle segment misses (called page fault) during address translation, if a requested virtual address has no related entries in the address lookup tables. They reach from immediately generating a processor exception and leaving the handling to the operating system to automatic handling by the processor based on integrated microcode routines.

According to the basic concept of the ZZYX processor to use hardware only in the most efficient manner and only where absolutely necessary, the preferred approach is to implement the most simple one in view of the hardware, which is generating a processor exception and leaving the handling of the page fault to the operating system.

In the preferred embodiment the tables are not only used for address translation but may comprise additional information, which may specify the nature of the respective data block, such as write back strategy, access rights and coherency, but also handle runtime information, such as recent access or recent modification.

The according descriptor table may not only contain the base address in the main memory of the data block for address translation, but also further information about the memory block. For example the following flags may be implemented:

write-back: If set, modified data in the Local Memory is written back into the Main Memory to keep Main Memory data consistent and making changes to the data available for future loads from the Main Memory. If not set, modified data is not written back into the main memory.

scratch: If set, the memory is solely regarded as scratch memory, which is neither loaded from the main memory, nor written back. Data inside is on temporary and lost at any action such as a memory flush, a context switch or the memory is loaded with another set of data.

coherent: Multiple instances of Local Memory and or Higher Level Cache may access the same data block and modify data locally. However, data shall be kept coherent and a coherency protocol, such as e.g. MESI has to be operated between all instances. If set, the coherence protocol for this block of data is enabled and running between the main memory and all instances. Alternatively automatic semaphoring could be implemented in order to lock data in the Main Memory for exclusive access by a specific memory instance in order to modify the data and release the data after write back.

wrt_bck/thr: Selects between write-back and write-through mode. The flag is only evaluated, if "write-back" is set. It defines whether write accesses are immediately written through (wrt_thr) the Local Memory into the Main Memory or whether data is only written back (wrt_bck) for example at a memory flush, at a context switch or any time the memory is loaded.

page_ref: Entry is set, whenever the page has been reference by the software at runtime. Used to implement page replacement mechanisms.

page_mod: Entry is set, whenever the page has been modified (written) by the software at runtime. Used to implement page replacement mechanisms.

page_ro: Set if the page is read-only.

page_acc: Page access rights, may be used to define access rights to the page for various tasks, e.g. operating system, application software and so on. It is typically a multi bit entry.

size: The size of the data block which starts at the base address (base address) and ends at base address+size. Size may be used by the prefetch to define the amount of data to be transferred between the Main Memory and the Local Memory In accordance with the subsequently described advanced Memory Management, particularly applicable on processors with large integrated memory (either on-chip or as separated memory die closely coupled, preferably in a stacked manner), some of the following flags may be implemented in the descriptor table:

high_prio: High priority, the page is often accessed and/or benefits from high data transmission bandwidth. The MMU will preferably locate this page in memory (iMEM) closely coupled to the processor. High_prio may be set by the application software or the operating system (in particular the task and/or thread scheduler) at runtime. It may be defined by the source code; set based on profiling access and/or performance pattern.

pref_iMEM: Set, if the page should be preferably placed in memory (iMEM) closely coupled to the processor. The flag is typically predefined by the application software, e.g. by the programmer. The knowledge that a particular page may benefit from placing in the iMEM may be derived from algorithmic knowledge or profiling. Profiling could also be done as part of the operating system at runtime. Respective information may be stored within the program by changing the binary or by storing initialization information on the respective mass memory (e.g. a hard drive, flash drive, DVD or BluRay disk). The respective information is evaluated at program startup or during program execution time and may define the value of the pref_iMEM flag.

Figure 22:
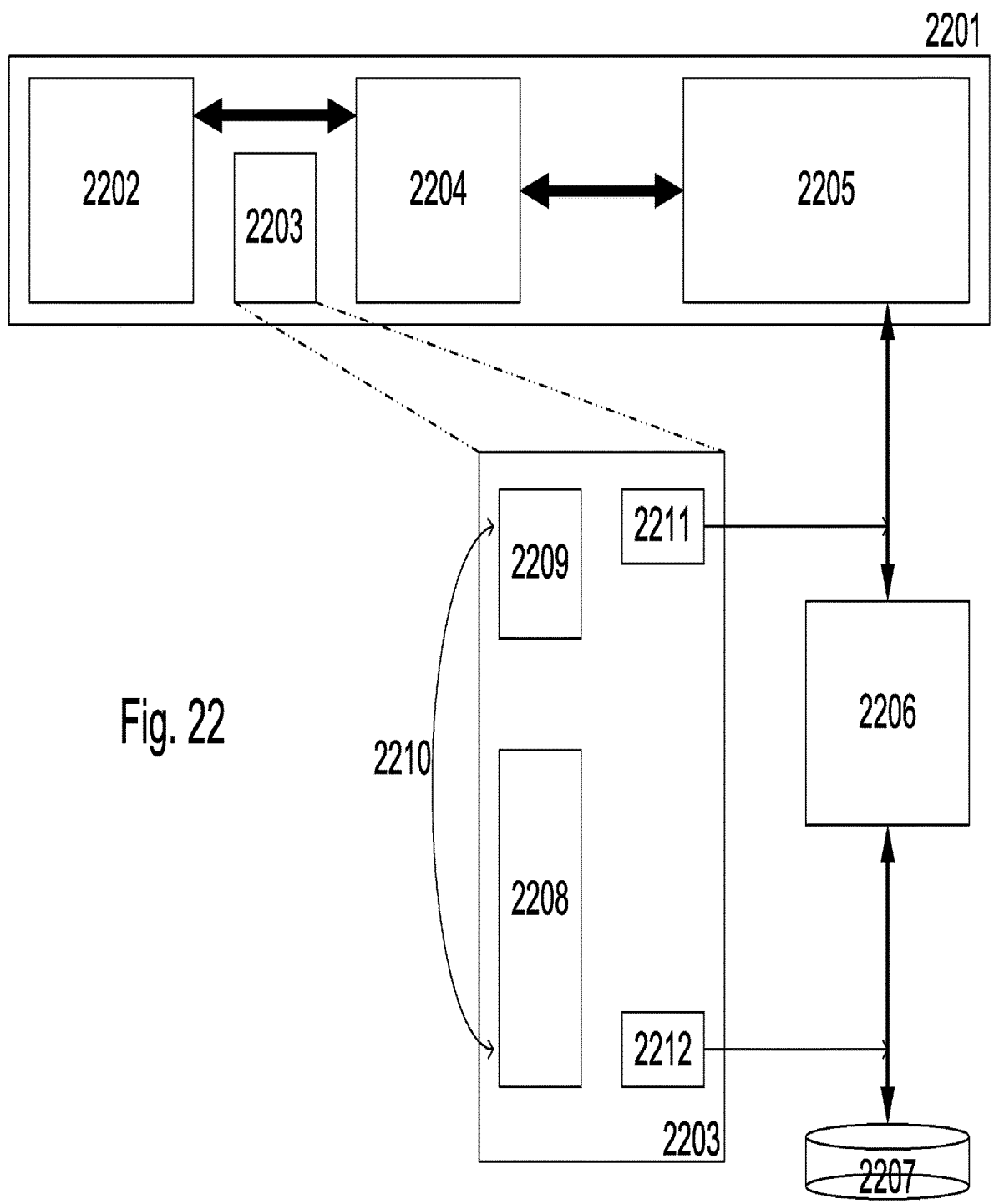
FIG. 22 is a block diagram of an example of a highly integrated processor which may be implemented as large single die or a stack of at least two dies.

For further details see FIG. 22.

If multiple ALU-Blocks require access to the same data, the following preferred strategy is used:

1. Read-only data is duplicated, which means each of the ALU-Blocks load a copy of the same set of data into the Local Memories.

2. Write or read-modify-write data requires either explicit handling by the compiler or programmer for example using semaphores. According instruction supporting semaphores, are supported by the processor, as for example atomic read-modify-write operations. Additionally coherency protocols in between the according Local Memories in the respective ALU-Blocks may be supported in hardware. Only data with a very low probability of write conflicts between multiple ALU-Blocks should be kept local in the Local Memories. All other data should be under control of the Global Address Generators and be kept in the preferably shared Level-1 memory hierarchy, or in the first memory hierarchy not dedicated to one ALU-Block but shared between the multiple ALU-Blocks. It shall be noted, that ZZYX processors with a low number of ALU-Blocks typically share the same Level-1 memory hierarchy between all ALU-Blocks. Larger processors with a higher amount of ALU-Blocks may have multiple Level-1 hierarchies, each dedicated to a specific group of ALU-Blocks. Those processors have the first shared memory hierarchy implemented at a lower level, for example Level-2 memory or even lower.

As Local Memories are a Level-1 instance of their own, it is not preferred to buffer Local Memory Data under control of Local Address Generators in the Level-1 memory hierarchy (0903); typically data transfers are bypassing (0905) the Level-1 (L1) memory hierarchy.

In an ideal system more Local Address Generators will be used and implemented than Global Address Generators. Local Address Generators provide for fast and parallel memory accesses and reduce at the same time the traffic on the memory hierarchies. Therefore it is preferred to exploit data locality in algorithms. ZZYX high level language compliers provide according Optimizers, additionally hints provided by the programmer in the source code define such data structures preferably to be kept in the Local Memories at runtime.

The Address Generators may be simple linear counter or more complex ALU based machines, comprising for example at least one multiplier and at least one adder and at least one clipping mechanism.

Some addressing modes are:
a) $adr_{n+1}=adr_n\pm1$;
b) $adr_{n+1}=base\pm adr_n\pm s$;
c) $adr_{n+1}=base\pm adr_n\pm s$;
d) $adr_{n+1}=base\pm x\pm y*stride$;
e) $adr_{n+1}=clip(x0+xStride*x+xOffset, 0, width)\pm clip(y0+yStride*y+yOffset, 0, height)*stride\pm base$;

Preferably auto-increment and -decrement operations are supported. Address pointers are automatically incremented or decremented by a constant fixed value or by a variable, depending on the instruction. Both pre operations (modifying the pointer before releasing the address) and post operations (modifying the pointer after releasing the address) may be implemented.

The Local Memories constitute a highly efficient interface towards the Main Memory. Due to the ability of spilling data blocks in and out versus the comparably slow high latency Main Memory in the background, while providing a fast low latency interface towards the ZZYX core, the system performance is significantly increased. The block move operations with the ability to burst multiple data words during the transfer are far more efficient in terms of bandwidth and energy consumption than traditional single word data accesses.

On the other hand, the fine granular structure of multiple Local Memory units with integrated address generators are provide fast data access with lower overhead than traditional large cache structures with only one or a small number of address generators.

Local Memory units allow for more efficient use of the expensive (in terms of cost and energy consumption) fast local memory than traditional cache structures, as the Local Memories are specifically allocated and used by the software, while lots of expensive (in terms of cost and energy consumption) memory inside the general purpose cache is wasted due to caching of just any kind of data, which may lead to lots of cache misses, flushes and reloads.

The status and error information, which may be accessed via status registers by the software or issue processor exceptions, provided by the described local memories lead to more secure and stable software implementations and greatly improve the stability of the executed application.

Both status registers and processor exceptions may be handled by software debugging environments (such as GNU GDB) and/or the operating system.

Accessing the vast amount of Load/Store units, including those comprising Local Memories, in parallel is critical as the registers file may be used up by exchanging data with the memory hierarchy. Furthermore the input interface of the Register File may become complicated, power consuming and slow, with the required additional multiplexers.

In order to avoid such issues, the ZZYX processor accesses at least some, preferably each of the Load/Store units as dedicated registers.

Storing requires addressing the selected Load/Store unit. All operands will be forwarded to the chosen Load/Store unit. An example opcode could look as such:

STORE(8, 16, 32) #unit, data-reg, address-reg (8,16,32) means the STORE opcode handles byte operations, 16-bit or 32-bit operations;

unit addresses the Load/Store unit;

data-reg: a constant data value, or the register containing the data to be stored;

address-reg: a constant address value, or the register containing the target address.

Obviously the Load/Store unit could be implemented for supporting indirect addressing, which would either require a second address (base address) in the opcode or a separated base address registers. One preferred embodiment will be described subsequently. Also constant values could be supported for one or both, address and data.

Preferably constants are limited to a few bits and extended to the full width, so that they fit into the field of a register address and don't require a larger opcode format. Such small constants are typically well suited to handle the most common cases, like address indexes in a small vicinity of the base address or typical preload constants like 1, 0, or −1.

Load opcodes are accordingly defined, but do not require a data target register indication. The target is implicitly selected by the unit address (#unit) of the load/store unit. As the load/store units are handled as separated registers, the loaded data can be accessed by reading the dedicated according register. For example, a ZZYX processor comprising 8 Load/Store units would provide 8 Load/Store registers, accessible as ls0 . . . ls7.

An example opcode could look as such:

LOAD(8, 16, 32) #unit, address-reg (8,16,32) means the LOAD opcode handles byte operations, 16-bit or 32-bit operations;

unit addresses the Load/Store unit;

address-reg: a constant address value, or the register containing the source address.

EXAMPLE

LOAD32 #3, address-reg

. . .

ADD r0, r2, ls3

The data is loaded by the Load/Store unit #3 from the memory location defined the value in the address-reg (again, indirect addressing may be implemented). After the load, the data is available in the register ls3. In other words, the Load/Store unit #3 is accessible like a standard register. The Register File is extended by the load/store registers, in this case 1s3. This holds for both, read (load) and write (store) accesses to the 1s-registers. Then the loaded data in 1s3 is added to register r2 and the result is stored in r0.

In order to provide a consistent syntax for to the assembler, the Load/Store units may be indicated by the according register reference (1s(unit)) instead of the unit number (#unit), for instance load8 #5, r3 could be replaced by load8 1s5, r3; store16 #7, r2, r6 could be replaced by store16 1s7, r2, r6.

Load/Store units could (and preferably do) support indirect addressing or even multidimensional addressing.

Indirect addressing simply adds the address provided by the opcode to a base address.

Multidimensional addressing enables more advance addressing modes, such as for instance xvalue+xbase+((yvalue+ybase)*xwidth). Preferably Load/Store units support DMA like addressing, such allowing self contained loading or storing of data.

Loading DMAs load data from the memory into the target load/store register 1s(target). If previously loaded data has not be read from the register yet, the DMA stalls and waits unit the data has been read.

Store DMAs store data to the memory from the. If no new data is available yet, the DMA stalls and waits unit the data is available.

The DMAs may support FIFOs for load and/or store data for providing greater independency between the ALU-Block and the load/store accesses. One major benefit of FIFOs is the better support of burst data transfers making the memory access more efficient. This also allows for greater efficiency of arbiters in the memory hierarchy arbitrating the data access, as block transfers are arbitrated instead of single cycle data transfers.

Preferably FIFOs can be switched on or off depending on the requirements of the memory transfers.

All features of such complex Load/Store units cannot be accessed by a load or store instruction of reasonable size and complexity. In order to keep the opcode format simple and dense, either special opcodes or descriptor tables may be implemented for setting up the definition of the Load/Store unit. Furthermore the subsequently described pre-opcodes may be used for providing access to rarely used features.

Typically the following setup might be possible:
i. operation modes, such as the addressing mode (direct; indirect; linear; 2-,3-,4-, (multi-) dimensional);
ii. X-, Y-, (multi) base addresses;
iii. Single transfer mode or automatic DMA transfer mode;
iv. data FIFO on/off.

Redundancy

Redundancy is not only beneficial for reducing the risk of failure in the field and/or required for mission critical system, with smaller process geometries defects on the dies become more likely. In one embodiment of the ZZYX processor it may support additional redundant elements on the chip. The level of redundancy may depend on the manufacturing yield and analysis of implemented processors. While Instruction Fetch, Decode and Issue units are likely too small to impose high risk of defects, the small size enables duplication at low cost.

All those elements which exist more than once are ideally suited for redundancy.

For example may an additional Load/Store unit be located on the chip. The addressing of the units and the assignment of the LSDR may be implemented flexible (e.g. using multiplexer or crossbar structures and/or runtime definable decoders).

Also the ALU-Block may be extended with redundant ALUs, e.g. may one redundant ALU be implemented per row, which may be selectively replace a defect one in the row. This may be implemented with multiplexer structures. U.S. Pat. No. 6,697,979 Vorbach et al. (which is fully embedded into this specification by reference for detailed disclosure) shows a redundancy model suited for the ALU-Block, regardless of the completely different processor models.

The FIFO data registers (FDR) may comprise one additional register stage per FIFO, thus enabling to bypass a defect FIFO stage using multiplexers. The according implementation is very similar to Vorbach et al, therefore no detailed explanation is required.

All memories, such as Local Memories, Caches, Lookup-Tables, and/or DRAMs preferably comprise redundant memory structures for replacing faulty ones.

ZZYX System Overview

Figure 7:
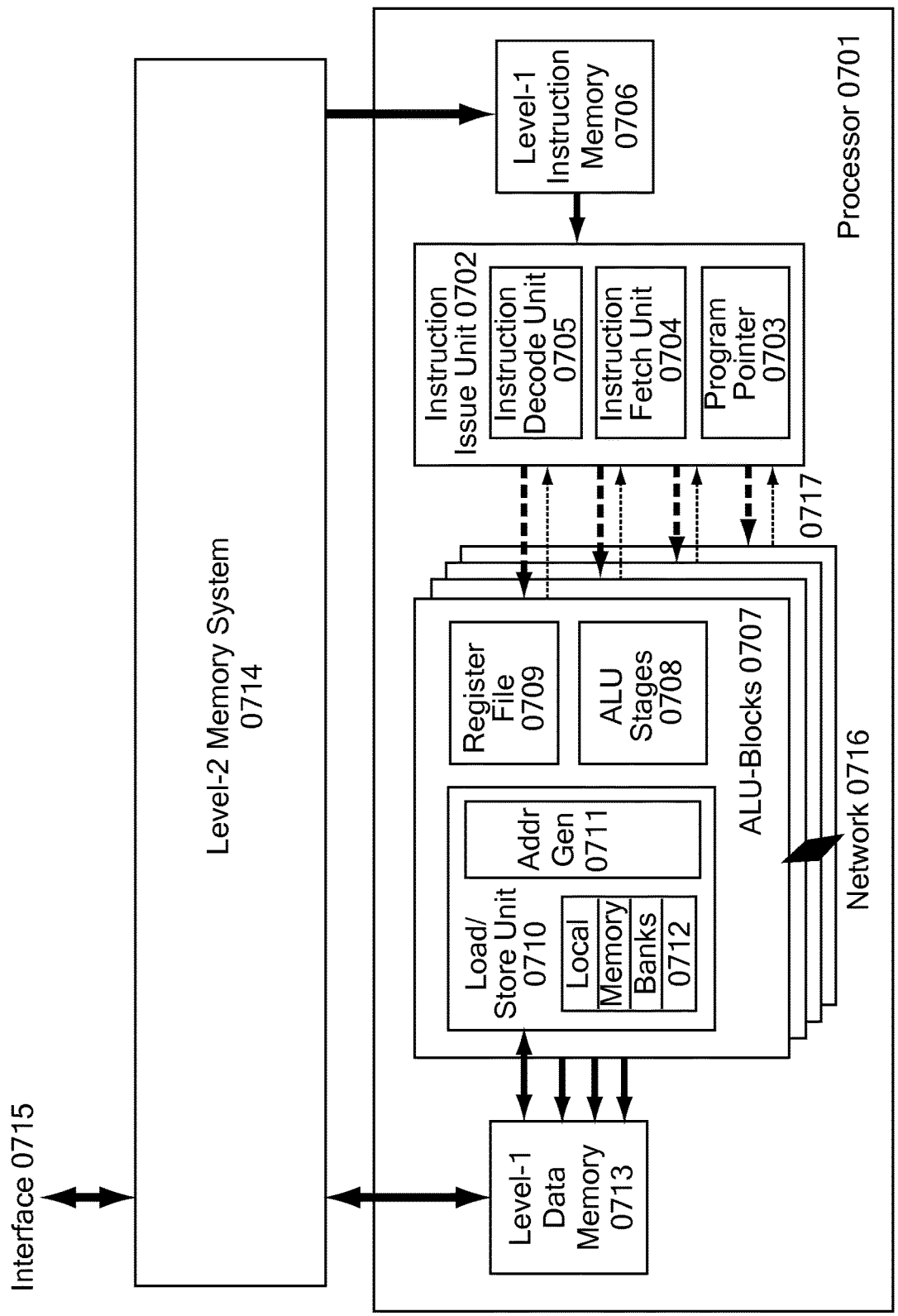
FIG. 7 is a block diagram of an example of an overview of a processor system including a memory hierarchy.

FIG. 7 provides an overview of an exemplary ZZYX System, including the memory hierarchy. The ZZYX processor (0701) comprises an Instruction Issue Unit (0702). The Instruction Issue units includes the processor's program pointer (0703), an Instruction Fetch Unit (0704, IFU) for loading instructions from the Level-1 instruction memory (0706), which is preferably implemented as Level-1 Instruction Cache. The loaded instructions are decoded in an Instruction Decode Unit (0705, IDU).

The exemplary embodiment comprises 4 ALU-Blocks (0707), each of which comprising the ALU Stages (0708), the Register File (0709), and the Load/Store Unit (0710).

The Load/Store Unit (0710) comprises multiple Address Generators (0711) for Global Addresses (GAG) and Local Addresses (LAG). Local Memory Banks are (0712) provided for the Local Address Generators, which may be implemented for example as Dual- or Multi-Port-, Double-Buffer-, or cache memory. As previously described, the local memories may comprise a block transfer unit for loading and unloading data. The Load/Store units exchange data with the Level-1 data memory (0713), which is preferably implemented as Level-1 (L1) Data Cache. The Level-1 (L1) Data Memory or the Load/Store Unit may comprise means for bypassing the Level-1 (L1) data memory (0713), such providing higher data efficiency for data held local in the Local Memory Banks.

Level-1 instruction memory (0706) and Level-1 (L1) data memory (0713) are connected to the Level-2 (L2) memory system (0714), which is preferably implemented as Level-2 (L2) cache. Again bypass means may be implemented for data transfers bypassing the Level-2 (L2) memory system, so as to allow higher efficiency of such data transfers which are not worth to cache, for example streaming data. At level-2 (L2) data transfers handled by Local Address Generators (LAG) and Global Address Generators (GAG) may be bypassed.

The level-2 (L2) memory system connects via an interface (0715) to subsequent lower memory, such as Level-3 memory or the main memory.

It is obvious that the Level-2 (L2) memory system might be implemented inside or outside the ZZYX processor (0701), as all subsequent lower memory hierarchies.

Die Stacks

Usually it is highly inefficient to implement memory off-chip, which means not on the same die as the processor and/or the processor cores. Bandwidth decreases as capacity is increasing, at the same time the power dissipation for memory transfers increases significantly due to the higher buffer loads.

However, die stacking provides a promising option. While by today some cost and manufacturing issues limit the availability of this technology, in the near future mass production seems feasible: Two or more die are vertically stacked and interconnected. The interconnection may be done by wire bonding or bumping, but Through-Substrate-Vias or Through-Silicon-Vias (TSVs) would be the ideal solution in terms of density and capacity—and therefore bandwidth and power dissipation.

Ideally the memory hierarchies are implemented by a die stack. While the Level-1 cache, as the most bandwidth and latency critical memory, should be closely implemented to the processor cores and therefore on the same die, Level-2 and possibly Level-3 caches may be implemented on a second die; possible Level-3 cache even on a third one.

Taken power restrictions and the need for memory space into consideration, the implementation of the Level-3 cache, maybe even the Level-2 cache, as dynamic memory (DRAM) may be preferable. Based on recent developments, the implementation of memories based on, or comprising, nano technology such as metal nanotubes and/or carbon nanotubes may increase the efficiency significantly. E.g. are carbon nanotubes highly effective conductors, making them ideally for replacing or enhancing e.g. the deep-trench capacitors of DRAM memory cells. Even Flash-Memory may by a useful alternative for implementing at least some of the cache hierarchies in future.

Die stacks offer the advantage of having large amount of memories on one or a plurality of dies in a close vicinity of the ZZYX processor, which may comprise one or a plurality of cores. One or a plurality of dies in the stack may comprise SRAM or DRAM, e.g. for caching or buffering of the main memory. In embedded systems, even the complete main memory may be implemented on one or a plurality of DRAM dies. Dies in the stack may also comprise other memories, such as flash memories.

Another significant benefit is the capability to transmit very wide data words between the dies. While chip to chip communication is highly limited by the low pin count and high capacities, die to die communication enables the transmission of a large amount of signals. Capacity is low, which significantly reduces power consumption for the data transmission and theoretically enables even higher transmission frequencies.

However, for further reduction of the power dissipation, it is preferred not to increase the transmission frequency, but use wider data words. As e.g. TSVs are comparably small, a large amount of signals can be transferred between the dies, enabling wide data words.

Optimally blocks of data are transferred within the memory hierarchy, which is typically done be data burst sequences. Having wide data words, the amount of burst cycles decreases significantly. Instead of arranging burst sequences into multi clock cycle "sequences" of data packets "sequentially" transferred over a bus system at high clock frequency, bursts may be arranged as burst fronts, arranging a plurality of data words into one or a few very large burst word, transmitted in one or only very few clock cycles at low frequency. The low frequency reduces the design effort as, e.g. cross-talk effects are minimized. Simultaneously slower signal transmission buffers may be used comprising slower but more power efficient transistors.

The DRAM being located in the die stack in one embodiment may provide sufficient memory for embedded systems, which typically have well specified memory requirements and no need to upgrade the memory size in the field.

Computers, Servers and other devices require large memory space and the potential to upgrade the memory in the field.

This would limit the use of DRAM for buffers and potentially caches. However enhance virtual Memory Management may offer highly efficient use for die stack DRAMs (DSDs).

In one embodiment an advanced Memory Management Unit operates two levels of virtual memory. While in prior art, the complete physical main memory is identical, it is regarded inventive to implement two different sets of physical memory.

A first set is handled equivalent to Memory Management Units of the prior art. A Translation Lookaside Buffer (eTLB) translates between pages stored in the large external physical memory (eMEM) and the virtual memory space. The external physical memory is external, located outside the processor chip and is not located within or part of the die stack. In relation with die stacks the term processor or processor chip is used to reference to the whole die stack including the processor or multi-core processor die and other dies, such as memory dies.

Additionally a second set of physical memory limited in size is located within the processor inside or as part of the die stack or even on the processor die. This internal physical memory (iMem) is managed by a second Translation Lookaside Buffer (iTLB). The eMEM is not only significantly larger than the size limited iMEM but may also be extendable, while the iMEM typically has a fixed non-extendable size.

Often used "high-priority" pages may be transferred into the iMEM. Also pages offering a significant performance benefit if being fast accessible at low latency may be transferred into the iMEM. All other "standard" pages are located in the eMEM.

Various options exist to manage the page classification. For example a) pages may be classified explicitly in the source code by the programmer and/or the compiler as "high-priority", e.g. either by pure knowledge of the data structure and nature of the algorithm or by detailed profiling of the behavior of the algorithm;

b) the application program itself, the operating system and/or the MMU may profile the access statistics of the pages at runtime and attach respective priority flags to them, e.g. setting respective bits in the page descriptor table;

c) additional to b) the page information could even be stored together with the application program, either be altering the binary of the program or in a separated initialization file, which supports the optimal handling of the pages immediately at the next start of the program.

Explicit classification, as e.g. used in the above example a), may be done be marking variables, such as pointer or arrays or data structures with compiler hints e.g. int a /* internal */ or using advanced compiler commands, e.g. for variable declaration (e.g. istruct for defining an internal (iMEM) structure).

Memory instantiation routines e.g. malloc( ) may be extended by an additional parameter classifying the allocated memory as internal or external (i.e. malloc (e, . . . ) for external (eMEM), malloc(i, . . . ) for internal (iMEM)); may be implemented using different function calls, e.g. malloc( ) for standard external (eMEM)

memory instantiation and imalloc( ) for internal (iMEM) memory instantiation;

our indication may be given by compiler hints, e.g. malloc( )/* external */ for standard external (eMEM) memory instantiation and malloc( )/* internal */ for internal (iMEM) memory instantiation.

The most efficient approach, in particular for porting existing code, is to keep the existing semantics and/or syntax unchanged for external (eMEM) accesses. Thus the majority of the code remains unchanged. Only those parts of the code, which are optimized for internal (iMEM) are changed with according hints, special function calls and/or special instructions.

FIG. 22 shows a highly integrated processor (HIP, 2201), which may be implemented as large single die or a stack of at least two dies comprising i) a processing unit having one or more processor cores (2202);
ii) at least one Memory Management Unit (MMU, 2203);
iii) a cache subsystem (2204);
iv) and a internal memory system (iMEM, 2205), typically implemented as dynamic random access memory (DRAM).

A large external system main memory (eMEM, 2206), usually implemented as DRAM, is located outside the highly integrated processor (HIP). Data is transmitted between the system main memory and the HIP. Further data is transmitted between the system main memory (2206) and a mass (virual) memory (2207), which may be any kind of auxiliary store, for example a hard drive, flash drive and/or DVD/BluRay drive; and/or the vast memory resources of the Internet.

In the preferred embodiment the MMU (2203) comprises a first Translation Lookaside Buffer (eTLB, 2208) for managing the mapping of the virtual address space onto the external memory system (eMEM, 2206) and a second Translation Lookaside Buffer (iTLB, 2209) managing the mapping of the virtual address space onto the internal memory system (iMEM, 2205).

Depending on the target market and the application two major strategies for managing the virtual memory space may be used:

1. eMEM is the main data memory. Typically data is transferred between the processing unit (2202) and the eMEM. In case a page is selected for being located in the iMEM, it will be either moved from the eMEM to the iMEM or directly be loaded from the mass memory (2207) into the iMEM. High priority pages may be first transmitted to the eMEM, and in case sufficient free space exists in the iMEM, they may be subsequently moved from the eMEM to the iMEM. In case the iMEM becomes full, high-priority pages may be moved back from the iMEM to the eMEM.

2. iMEM is the main data memory. Typically data is transferred between the processing unit (2202) and the iMEM. Pages may be transferred directly between the mass memory (2207) and the iMEM. Only pages selected for being located in the eMEM and/or low-priority pages are moved to eMEM. All other pages are preferably kept in the iMEM and only selectively moved to the eMEM in case the iMEM becomes full.

The selection of which pages are moved back and forth between the iMEM and eMEM may be made based on the same page replacement algorithms as for pages that are moved in the prior art between the physical memory and the virtual (mass) memory. Actually the same page replacement algorithms may be applied for moving pages between eMem and the virtual (mass) memory (2207).

Examples for page replacement algorithms are: The theoretically optimal page replacement algorithm (also known as OTP ore clairvoyant replacement algorithm), Not recently used, First-in First-out, Second-chance, Clock (and variants thereof), Least recently used (and variants thereof), Random, Not frequently used, and Aging. For further details see "22C:116, Lecture Notes, Sep. 8, 1995, Douglas W. Jones, University of Iowa Department of Computer Science, which is fully embedded into this specification by reference for detailed disclosure.

Whenever a page is being moved between iMEM and eMEM the according TLBs (iTLB and eTLB) are updated, which means the reference for the removed page is deleted and for the newly received page is added. Thus TLB entries are moved (2210) between the two TLBs. In one embodiment one or more Direct Memory Access (DMA) controllers (2211) manage data transfers between iMEM and eMEM; one or more Direct Memory Access (DMA) controllers (2212) manage data transfers between eMEM and the virtual (mass) memory (2207). While the DMA controllers autonomously transfer data, they are under control of the MMU, which defines their operation and synchronizes the DMA transfers with the content of the respective TLB.

Die Stack Cooling

The die of the stack may be cooled using metal fan-outs. Preferably the more power consuming die will be arranged on the outside edges of the stack for better heat distribution. This is known.

Carbon nanotubes have high thermal conductivity, with typical axial thermal conductivity in the range of approximately 3000 W/mK to 6000 W/mK may be used to fan out the heat, in particular from the inner die. For that purpose, cross-die-carbon-nanotube-chimneys and/or cross-die-carbon-nanotube-thermosiphons (termed hereinafter "Chimneys Or Thermosiphons", abbreviated to (COTs)) cross multiple die and lead, similar to TSVs, through the substrate and/or polysilicon of one or more of the die are suggested.

Chimneys and thermosiphons of the prior art are described in the US patent application US2007/0138623A1, Maveety et al., which is fully embedded into this specification by reference for detailed disclosure.

In the prior art chimneys and/or thermosiphons are implemented on top of the active die circuitry that heat the die in the inactive backside of the die, which is not applicable on multi-die-stacks.

According to this aspect of the invention, which might be used in connection with the ZZYX processor or any other processor, memory or chip implementation, the COT (or several COTs) goes through the whole die, with no active circuitry on top or underneath. In contrast to the prior art, keep-out areas are defined where a COT will be implemented, within which no active or passive circuitry (such as transistors, resistors, capacitors, memristors or wiring) is placed. However, heat generating circuitry is located in a close vicinity of the COT. Thus, instead of a pure axial heat transfer by the nano tube known in the art it is suggested to first transfer heat radially into the nano tube arrangement and to then transfer the heat axially along the nano tube arrangement axis.

To form a stack of die having COTs, on each die those areas have to be blocked as keep-out areas, which exactly lie vertically on top of each other in the die-stack.

It is suggested that no removal process or CNT growing is performed on a single die. Instead, first the stack of die is assembled. Then capillary tubes or cavities for the Carbon- Nanotubes (CNT) are manufactured using a removal process known per se in the art, for example by chemical or plasma etching, micro machining, laser drilling or other ablation methods. The cavities thus produced will go through the whole stack of dies, or may leave only a thin bottom at the lowermost layer; therefore it is required that the keep-out areas of the single dies were exactly placed such that they are positioned vertically exactly on top of each other in the assembled die stack.

It is preferred not to excavate the bottom die completely, but to leave some remaining die material, on which in a next step a catalyst can be placed as seed layer to grow the CNT subsequently. The Carbon-Nanotubes (CNT) will be grown through all dies of the die stack for implementing either thermosiphons or chimneys. Both thermosiphons and chimneys can be implemented in a similar way; for details see Maveety et al. describing the process for both in a non-stacked arrangement using purely axial heat transfer.

COTs, as required for the inventive structure, have to reach lengths of approximately 200 μm to 5000 μm for growing through a complete die stack, depending on the thickness of the dies, the number of dies in the stack, the type of interconnection and so forth. While Maveety et al state that CNTs can be grown to lengths of approximately 100 μm, which is not sufficient, Shanov et al describe in US2008/0095695 (which is fully embedded into this specification by reference for detailed disclosure) methods to grow large CNTs of up to 18000 μm length. It is surprising that these methods disclosed by Shanov not only can be applied to growth from the bottom of cavities or recessions in die stacks, but that the CNTs produced in such manner are highly efficient in heat transfer from the vicinity of the keep out area.

FIG. 21a shows an according implementation of a chimney or thermosiphon. A die (2101) comprising an active area (2102) producing significant heat which shall be distributed through a chimney or thermosiphon. First (1) a keep-out area (2103) is defined preferably at a central position for ideal heat distribution. No active and/or passive components such as transistors are located inside the keep-out area.

In a second step (2), the capillary tube (2104) is formed by the removal process and in the third (3) step the CNT (2105) is grown in the capillary tube.

FIG. 21e shows 3 COT architectures which may be manufactured for the bottom die. 1) shows the structure according to the prior art. The bottom die is not to completely excavated, but some remaining die material is left (2113), on which a catalyst (2114) is placed as seed layer to grow the CNT (2115) subsequently.

However as the COT reaches through the whole die stack (refer to FIGS. 21b,c,d) it will become an issue in the prior art to place the catalyst precisely on the deep bottom of the tube.

As a keep-out area with no components inside is defined anyhow at the location of the COT, the cavity may be extended to form a capillary tube as for all other dies according to this invention. The suggested capillary tube reaches now through the whole die stack. As shown in 2), next the catalyst (2114(1)) is placed, either covering the whole bottom of the die (2101), or alternatively (compare 3)) the catalyst (2114(2)) may be placed only at the location of the capillary tube.

The catalyst layer may be subsequently removed, so that the COT would reach through the whole die stack, with openings on both sides. Depending on physical or implementation preferences, the openings may be closed by an additional process (e.g. when implementing thermosiphons).

Manufacturing COTs according to FIG. 21e 2) and 3) may not only be beneficial for die stacks, but may also increase the yield and/or reduce cost and/or add flexibility when applied on single die chips.

While the FIGS. 21b, c, d show the placement of the catalyst (2114) according to the prior art, it is explicitly pointed out, that the bottom cavity may be a capillary tube and the catalyst may be implemented according to one of FIG. 21e 2) or 3).

Depending on the manufacturing technology and/or interconnection technology, open space will exist inbetween the dies of the stack with no filling material between the dies of the stack but gas. For example, when dies are interconnected by metal bumps, typically only gas surrounds the bumps to electrically insulate one die from another. The gas may become critical when producing CNTs, depending on the manufacturing process of the COT; e.g. it is easily understood that precise chemical etching through multiple die will be massively disturbed, if not made impossible, if the etching chemicals spread through the gas filled space. Therefore, preferably open space is filled with an insulating filler material during production of the stack, at least before manufacturing the COT. For example, an insulating passification could be used.

FIG. 21b shows a stack comprising 4 dies (2116a, b, c, d) connected by conventional wire-bonds (2110). One chimney or thermosiphon (COT, 2111) crosses all 4 dies of the stack. High heat producing areas (2112) are located in a close vicinity of the chimney or thermosiphon (COT, 2111), ideally COT is located at centric position. Ideally each of the dies are designed such that their high heat producing areas are ideally positioned to 2111. A 3-dimensional design chain, including respective design environment, is preferred.

The bottom die is not to completely excavated, but some remaining die material is left (2113), on which a catalyst (2114) is placed as seed layer to grow the CNT (2115) subsequently.

FIG. 21c shows the respective stack of dies interconnected with bumps (2120). The gaps between the bumps have been filled with an isolating filler material (2121).

FIG. 21d shows the respective stack of dies interconnected with TSVs (2130).

The figures are not drawn to any scale. Sizes and ratios are only exemplary to provide an understanding of the structure. Only one chimney or thermosiphon is shown. Realistic implementations may have multiple COTs (2111) in very high heat producing areas and/or further COTs in other high heat producing areas. While COTs support better heat distribution from inner layers of a die stack, preferably are high heat producing dies located at the edges of the stack.

Preferably design tools are enhanced to support 3 dimensional planning of die stacks. Floorplanning may support the definition of high heat producing areas. Either the size requirements are known upfront, e.g. from synthesis and power simulation results, or some areas might be predefined without detailed knowledge of the ultimate need. 3 dimensional floorplanning is preferred for enabling the coherent 3 dimensional definition and placement of high heat producing areas for all dies of a stack. After the areas have been consistently defined or located and placed within the 3 dimensional stack, the keep-out areas for the COTs are set consistently for all dies.

The place and route tools respect the COT keep-out areas and do neither place components in nor route wires through them.

Design rules defining the size of the keep-out areas, distances between keep-out and surrounding components or wires and distances between capillary tubes or cavities and the edges of the keep-out areas. Design rule checking tools are extended to check those parameters.

While according to prior art, the COTs were manufactured as additional step within the die manufacturing process, the manufacturing process changes. The dies are manufactured and stacked, then in an additional process the capillary tubes/cavities are build, the seed catalyst is placed and the CNT is grown.

Core to Core Data Transmission

The ALU-Blocks exchange data not only via the memory hierarchy, bus also are interconnected by a network (0716) supporting the flexible concatenation of ALU-Blocks as required by a specific application at runtime.

While the arrows in FIG. 7 mainly show the data transfer between the units, the bi-directional arrows (0717) between the ALU-Blocks (0707) and the Instruction Issue Unit (0702) indicate the transfer of status information from the ALU-Blocks to the Instruction Issue Unit, so as to allow conditional processing and conditional branching.

No Memory Management Unit (MMU) is shown in this exemplary embodiment. However standard Memory Management strategies and units can be adapted for the ZZYX processor and according units can be inserted in the data and/or instruction memory structure.

According to FIG. 7 ALU-Blocks have at least two ways to intercommunicate.

1. via an interconnecting bus system (0716), which is described in more detail in FIGS. 8 (0803); and
2. via shared data in the memory hierarchy, for example 0713 and 0714, which is discussed in FIG. 9 in more detail (Local Memory, 0903, and 0906). Shared data has to be synchronized, for example by coherency protocols or semaphores.

Operations Modes and Compiler Techniques

The most straight forward and typical processor model of the ZZYX Architecture is the superscalar or VLIW mode. Both modes are well known from today's state of the art processors. Unless additional optimization routines are implemented in the compiler, it may produce superscalar or VLIW code, which runs sufficiently on the processor.

Special emphasis is laid on multithreading using both, optimization tools and according programming techniques. On a single ALU-Block (AB) processor all threads are executed sequentially.

However a processor comprising multiple ALU-Blocks supports the execution of as many threads as embedded ALU-Blocks are available in parallel.

In the first instance the programmer can multi cycle kernel the program code into multiple threads. A software API is provided preferably by the processor manufacturer comprising typical interfacing and communication routines for handling the threads. Such routines comprise for instance the handling of the set of registers, in particular in the FIFO mode.

Both Programmers and advanced compilers are capable of optimizing loops. In particular the following steps are useful to optimize and transform loops efficiently onto the ZZYX processor:

1. Detect loops with no or limited internal data feedback; or optimize loops to meet the according limitations
2. Separate original loop control, comprising loop header and (if existing) loop footer.
3. Partitioning loop body into multi cycle kernels fitting into the ALU-Block.
4. Add modified inner loop control to each of the multi cycle kernels. The loop control is a derivative of the original loop control, having a limited execution time, which is in line with the storage capabilities of the Register Files FIFOs; and using the same exit or break criteria as the original loop control.

Special emphasis is required to have the same number of iterations for all inner loop controls of all multi cycle kernels. Else it would be impossible to generate one common outer loop control.

5. Derive a new outer loop control from the original loop control in accordance, e.g. with the number of iterations, with the inserted inner loop control.

Figure 5:
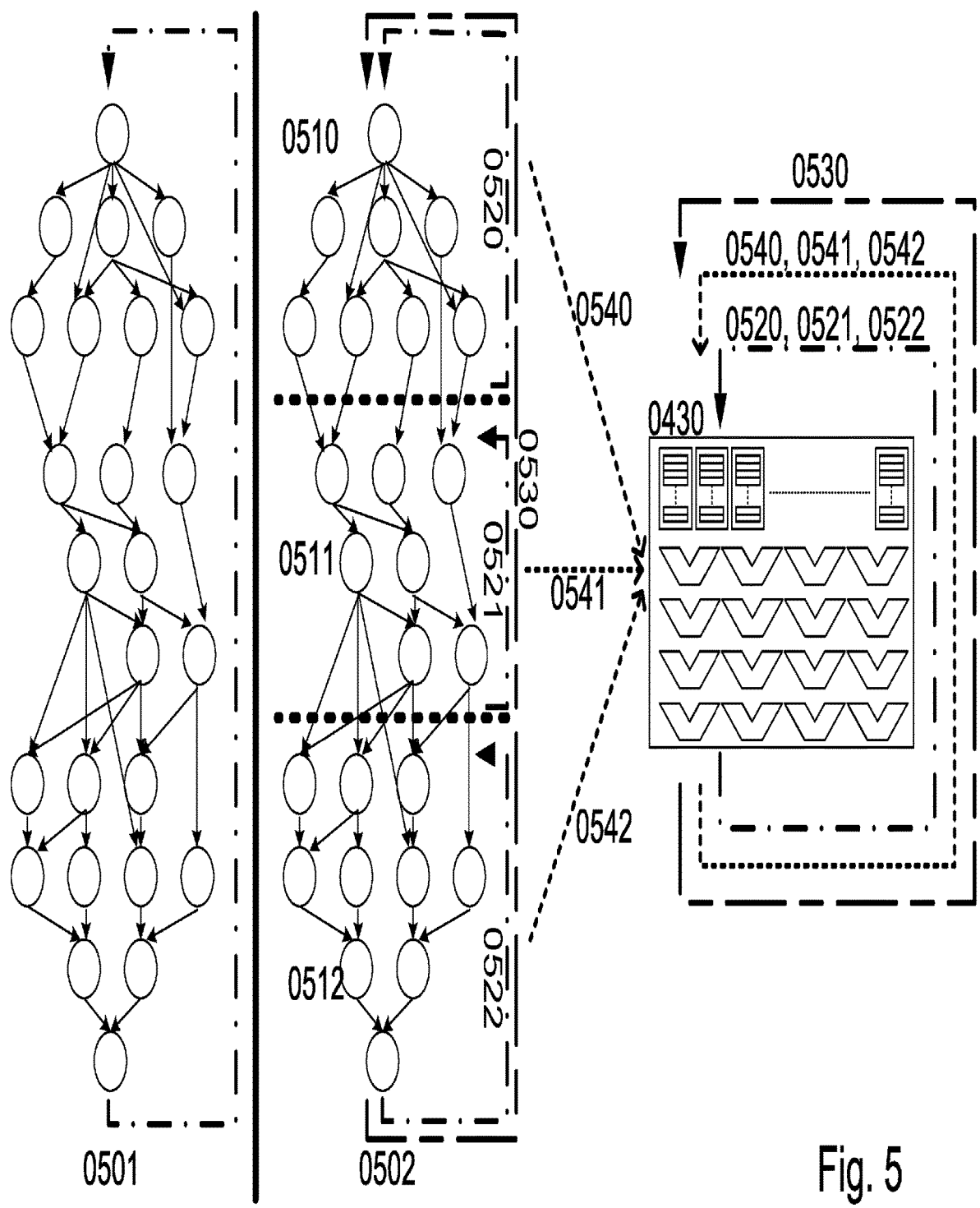
FIG. 5 is a diagrammatic illustration of an example of code generation and execution of loops on a single ALU-Block processor and controlled by loop controls.

FIG. 5 shows the code generation and execution of such loops on a single ALU-Block (0430) processor.

First a data flow and control flow graph of a loop is generated by the compiler (0501). Next (0502) the inner loop is partitioned into inner multi cycle kernels (0510, 0511, 0512) and each respective inner loop control (0520, 0521, 0522) is inserted. The new outer loop control (0530) is computed based on the original outer loop control and the inserted inner loop controls.

Object code is generated from the graphs and emitted.

At runtime time the loop is executed on the ALU-Block of the processor by executing at first the first multi cycle kernel (0510) on the ALU-Block as many times as defined by the according inner loop control (0520), next the second multi cycle kernel (0511) and so on; until the sequence of partitioned loops 0510, 0511, 0512 is computed, controlled by each respective loop control 0520, 0521, 0522).

While executing a loop, the once fetched and issued set of instructions remains the same, stable, and unchanged for as many times as defined by the according inner loop control (0520). Afterwards processing continues with a new set of instructions, either with the next multi cycle kernel of the loop or the code behind the loop.

After the last multi cycle kernel has been executed, execution restarts with the first multi cycle kernel again, in accordance with the outer loop control, until the loop finally terminates.

The results of a multi cycle kernel are stored in the set of registers. As the registers operate in FIFO mode, enough storage resources for multiple loop iterations exist. To keep the inner loop control in line with the storage capabilities, which means the number of iterations must not exceed the depth of the FIFO, is an absolute critical limitation for the inner loop generation. Summarizing the loop is computed by the step of sequentially mapping (0540, 0541, 0542) the 3 multi cycle kernels, one after the other (0510, 0511, 0512) onto the ALU-Block and executing each mapped multi cycle kernel in accordance with its loop control (0520, 0521, 0522). The respectively next multi cycle kernel is mapped and executed after a current multi cycle kernel has been terminated by its inner loop control. Ultimately the new outer loop control (0530) determines further iterations through the sequence of inner multi cycle kernels or the termination of the loop by reaching the exit criteria.

Figure 6:
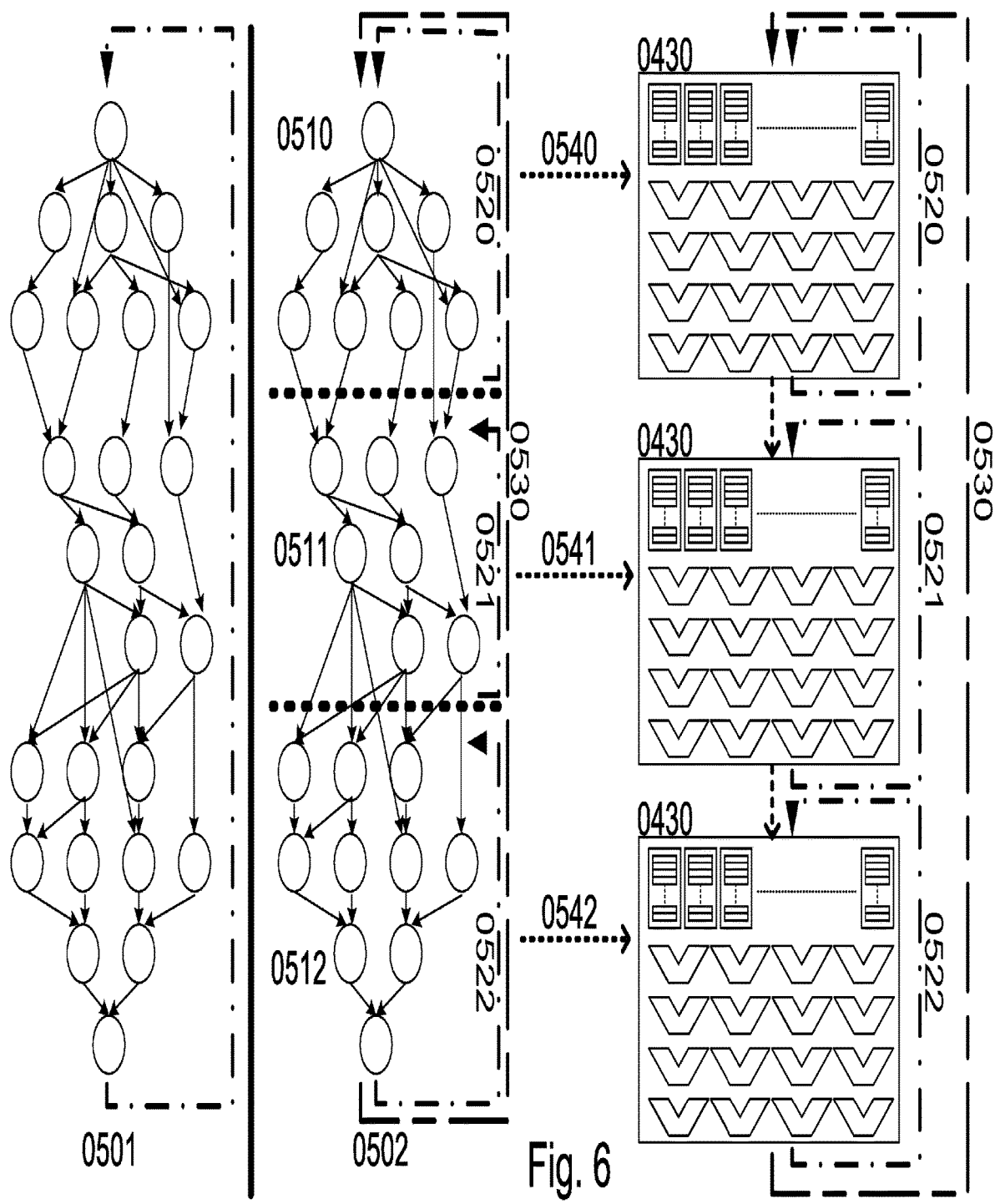
FIG. 6 is a diagrammatic illustration of an example of code generation and execution of loops on a three-ALU-Block processor and controlled by loop controls.

FIG. 6 shows the execution of the same graphs on a processor comprising 3 ALU-Blocks (0430). The multi cycle kernels are mapped linear onto multiple ALU-Blocks by the Core-Scheduler (see FIG. 17*b*) in accordance with the execution graph 0502. Each multi cycle kernel 0510, 0511, 0512 is mapped onto an ALU-Block and executed in accordance with each respective inner loop control (0520, 0521, 0522). Instead of writing the results computed by a multi cycle kernel back into the internal Register File of the ALU-Block executing this multi cycle kernel, the result data is written into the Register File of the subsequent ALU- Block. The subsequent ALU-Block is using this data as operand data and is operating in parallel to the first ALU-Block delivering the results.

Summarizing, the loop is computed by the step of parallel mapping (0540, 0541, 0542) the 3 multi cycle kernels, (0510, 0511, 0512) onto 3 ALU-Blocks and executing each mapped multi cycle kernel in accordance with its loop control (0520, 0521, 0522). Result data of a multi cycle kernel is directly transmitted to the respective next multi cycle kernel via the FIFOs. Ultimately the new outer loop control (0530) determines further iterations through the parallelized inner multi cycle kernels or the termination of the loop by reaching the exit criteria.

The inner loop control of the multi cycle kernels for the execution model shown in FIG. 6 remains the same as in FIG. 5. Also the outer loop control is the same in both execution models. However, obviously the sequential execution of the multi cycle kernels is unrolled into simultaneous parallel execution of all multi cycle kernels. The same binary code is executable on ZZYX processors according to FIG. 5 or FIG. 6 without any changes or limitations.

The two corner cases are described only, either the complete sequential execution of multi cycle kernels of inner loops or the complete unrolling of the multi cycle kernels onto as many ALU-Blocks as required. However it is obvious for one skilled in the art, that using the exactly same schemes also multi cycle kernels can be grouped into sets of multi cycle kernels in accordance with the amount of available ALU-Blocks on a ZZYX processor. One set after another is sequentially mapped onto the ALU-Blocks. All multi cycle kernels within a set are executed in parallel, the sets are mapped and executed sequential.

The two corner cases described have two levels of hierarchy: 1) one multi cycle kernel and 2) all multi cycle kernels.

The third case introduces an additional level: 1) one multi cycle kernel, 3) a set of multi cycle kernels and 2) all sets of multi cycle kernels (equal to all multi cycle kernels).

The hierarchies are only virtual, as they do not exist in the binary code but are only generated by the Instruction Issue unit.

It shall be explicitly mentioned, that the object code for the processor in FIG. 6 is exactly the same as for the one in FIG. 5. Obviously inner and outer loop control remain the same. However the API controlling the data transfer between the multi cycle kernels and the scheduling of the multi cycle kernels has to be executed differently. This is done by the Instruction Issue unit automatically and will be described later on. The Instruction Issue unit decodes the API functions in accordance with the capabilities of the processor and enables transparent execution of the same object code on different processor having various amounts and organizations of ALU-Blocks.

Software Model and Exemplary Embodiment of Assembly Language

The ZZYX assembler language references to the following registers:

r[n]: VLIW Data Register (VDR) number n
f[n]: FIFO Data Register (FDR) number n
ls[n]: LS Unit Data Register (LSDR) number n
a[row,col]:Result of the ALU-Block ALU located at row (row), column (col)

The mnemonics use 3 address code of the form:
Mnemonic <target>, <source 0>, <source 1>

The basic assembly structure is similar to those known in the state of the art. Yet, the specific ALUs in a row have to be addressed. Specific rows have to be addressed, the End-Of-Code token must be set.

The position of a specific ALU is defined by the delimiter "|". Within an assembly code line, the very left opcode defines the operation of the ALU in column 0. Using the delimiter I the next opcode defines the operation of the ALU in column 1, and so on:

ALU col 0| ALU col 1| ALU col 2| . . . |ALU col n

The first line of an assembly code defines the first row within the ALU-Block, the second line the second row, and so on:

Line 0=row 0
Line 1=row 1
. . .
Line n=row n

The pseudo-instruction CYCLE defines the end of a ALU-Block description and set the End-Of-Code token. After CYCLE, the assembly code starts at row 0 of the next partition again.

Most opcodes may support conditional execution. A prefix in the assembly code determines the condition, e.g. NE for Not Equal, EQ for Equal, CY for Carry, NC for Not Carry, NE for Negative, NN for Not Negative. Examples:

ADD r1, r2, r3: Non conditional addition
CY ADD r1, r2, r3: Add only if carry flag is set As described in detail, instructions are sequentially issued to the rows of ALUs in the ALU-Block (AB) and the data processing within the ALU-Block is pipelined. Yet, the preferred embodiment of the software model and assembly language is such, that all opcodes of a multi-sequence kernel or partition are apparently being simultaneously executed at each clock cycle. Preferably pipelining effects are hidden from the programmer for ease of programming. This is possible as the register file content can be pipelined along the datapath strictly in sync with data processing. For example, if it takes 1 clock cycle for a ALU stage to process data and the processing results are available as operands to the subsequent ALU stage, the Register File pipeline is build such, that it delays exactly by one clock cycle. If it would for example take 3 clock cycles for operands to be processed in an ALU stage, the respective Register File pipeline would delay the transfer of the Register File by exactly 3 clock cycles to remain in sync.

Figure 27:
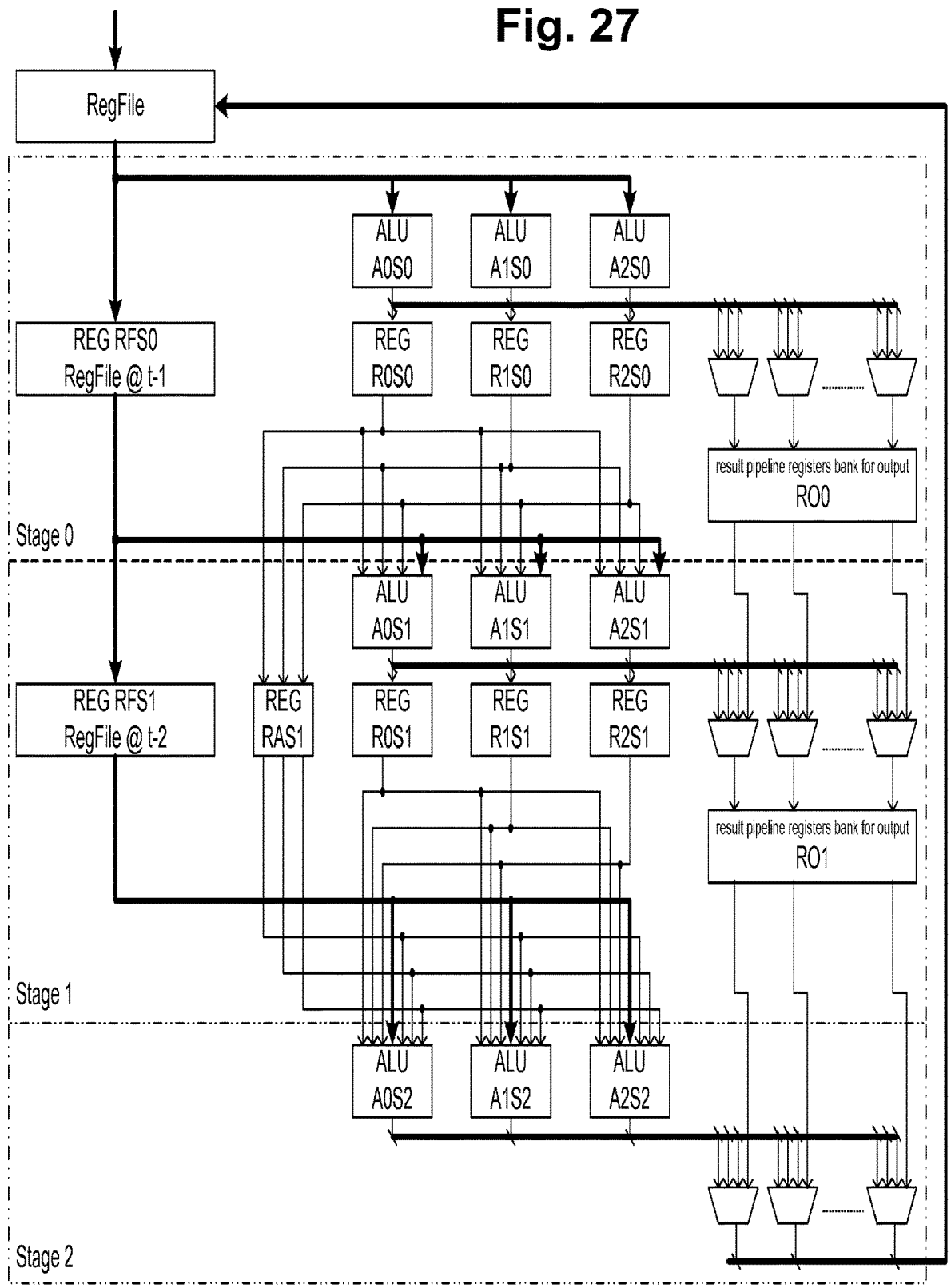
FIG. 27 is a diagrammatic illustration of a simplified 3×3 ALU-Block.

An example is given in FIG. 27 which shows a simplified 3×3 ALU-Block for better understanding of the basic interconnection and structure. While a 3×3 ALU-Block is clearly not preferred it allows outlining the ALU-Block basics in a reasonable complexity. Shown are the ALUs of stage 0 (ALU{0,1,2}S0) and the respective pipeline registers (R{0, 1,2}S0), also a second stage is shown (ALU{0,1,2}S1, R{0,1,2}S1) and a third final stage (ALU{0,1,2}S2).

Each ALU stage has access to the results of all ALUs upstream, stage 2 receives the result data of stage 0 in sync with the data processing in stage 1 via a pipeline register RAS1. The register file is pipelined from one stage to the next via RFS0 and RFS1, which keeps the register values in sync with the pipeline stages. As said, this significantly simplifies the software model, as it appears to the programmer, that all instructions within a multi-cycle kernel or partition are executed simultaneously as they get the same input data at each stage, although the stages are processed in a sequential manner due to the pipeline.

The processed results are written back to the Register File (RegFile) by an output pipeline (RO0, RO1), which keeps the write-back to the register file for each stage in sync.

While the architecture of FIG. 27 is perfectly suited for processing multi-cycle kernels and partitions, it is inefficient for e.g. superscalar or VLIW processing. Processing results of the first ALU stage are transferred through all subsequent stages. Only the first stage is active but the subsequent stages toggle and increase the dynamic power dissipation.

Also the result data of the first ALU stage is transmitted through the output pipeline, adding unnecessary latency for writing back the results to the Register File, thus making the scheduling of the VLIW instructions complex and inefficient.

Figure 27A:
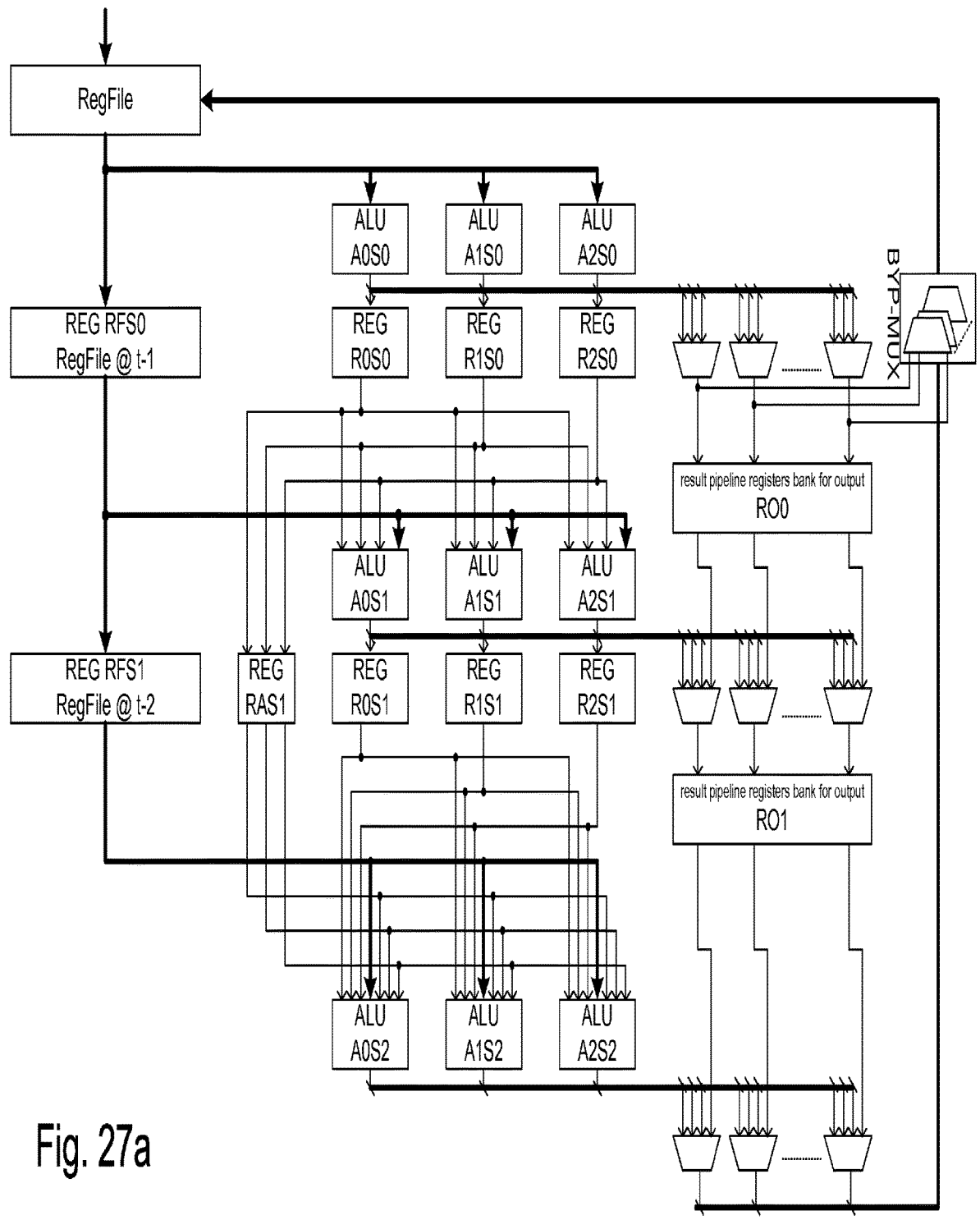
FIG. 27*a* is a diagrammatic illustration of another simplified 3×3 ALU-Block including a bypass multiplexer.

Therefore the ZZYX architecture comprises a bypass multiplexer directly after the first stage, e.g., see FIG. 27*a*. The result data produced in superscalar or VLIW modes are directly transferred to the Register File without latency. By disabling the pipeline registers (R{0,1,2}S0), RAS1 and also the Register File pipeline RFSO the subsequent stages are passivated. As the registers keep their output value, the toggling of signals is stopped. Downstream registers do not necessarily need to be disabled, but could be. Additionally or alternatively the unused ALU stages may be grouped into an element for power saving measures and their power supply could be completely switched off or they could be supplied with a lower voltage when unused, e.g. in superscalar or VLIW modes.

In case the embodiment supports extended superscalar processing, e.g. according to FIG. 3*c*1, the BYP-MUX may be located at a more downstream position, according to the extended superscalar capabilities. Also the disabling of the pipeline registers and the size of the element is accordingly adapted. Both modes, superscalar and extended superscalar, may be selectively used, which may be optimally supported by 2 BYP-MUX located at the respective positions. Obviously the pipeline register enables can be accordingly adapted. The downstream data path may be split into two separately controllable elements, which support power saving measures in accordance to the currently used mode, superscalar or extended superscalar.

While the transparency of the pipeline in the programming model significantly simplifies the programmers understanding and algorithm implementation, debugging tools may preferably display the correct code issue sequence and data processing pipeline.

Loop Control and Stop Criterion

Known loop optimization such as Strip Mining and Loop Tiling can be applied, however the algorithms are modified in two respects:

a) The amount of iterations of the inner loop is limited to the capabilities of the FIFO. Either the inner loops produced by the compiler's loop optimizer will have a fixed amount of iterations for matching the depth of the FIFO registers in the Register File (e.g. 16 cycles, 16-word deep FIFO registers), which leads to a virtual inner loop control such as for (n=0; n<FIFO depth−1; n++). Or, when possible simply the full or empty flags of the FIFOs are chosen for building the loop control, which leads to a virtual inner loop such as while (input_FIFO !=empty) or while (output_FIFO !=full) or combined while ((input_FIFO !=empty) && (output_FIFO !=full)).

b) The number of instructions in the inner loops has to be adjusted to the capabilities of the ALU-Block by a partitioner. This may require an iterative approach, between partitioning the loop and mapping it into the ALU-Block, in order to achieve the optimum number of instructions. Mapping in this context means the transformation of a graph into opcodes and scheduling those opcode by mapping the opcodes into specific ALUs of the ALU-Block. However, as the ALU-Block's architecture is well defined with fixed limitations, such as preferred data flow direction, amount of busses, conditional execution capabilities, the predictability of the mapping capabilities is a great advantage of the ZZYX architecture; which either greatly reduces the number of iterations or even enables a compiler technology not requiring such iterations between the partitioner and the mapper.

Anyhow the impact of the stop criterion of the outer loop on the inner loop control has to be taken into consideration. Cycling through the inner loops at the time of the last iteration of the outer loop, the stop criterion of the inner loops may be influenced by the calculated stop criterion of the outer loop. A simple example is given below:

for (i=0; i<250; i++) {do anything} may be split by combination of algorithms such as Strip Mining or Loop Tiling with a partitioner into code like the following:

```
i=0
while (i<250) {
    for (ii=0; ii<16; ii++) {i++; do part1 of anything}
    for (ii=0; ii<16; ii++) {do part2 of anything}
    for (ii=0; ii<16; ii++) {do part3 of anything}
}
```

The stop criterion of the total loop is tied into the first multi cycle kernel, which means the stop criterion while (i<250) and the increment i++ is merged and partitioned into part1.

However the outer loop stop criterion has to be forwarded to the inner loops tailing the first inner loop, which leads to code like the following:

```
i = 0
exit = 16
while (i < 250) {
    for (ii=0; ii<exit; ii++) {
        if ++i = 250 {exit = ii}
        do part1 of anything
    for (ii=0; ii<exit; ii++) {
        do part2 of anything
    for (ii=0; ii<exit; ii++) {
        do part3 of anything
}
```

While the correctness of the execution is ensured by the plurality of partitioned ii-counters, it is quite inefficient to execute the counter in each multi cycle kernel in software.

The hardware could be implemented using a termination-control-counter (TCC), which records the maximum amount of loop iterations (LOOPMAX) during the execution of the loop header and/or one (preferably the first one) of the multi cycle kernels.

At each subsequent multi cycle kernel the termination-control-counter (TCC) repeats the same number of steps and terminates execution at the recorded maximum value of loop iterations (LOOPMAX).

The counter may be controlled by the following exemplary instructions:

loopref [n]: Monitors the loop iterations of the loop header (header) and/or during execution of a multi cycle kernel. The final amount of iterations is stored in a register (LOOPMAX) inside the TCC hardware and defines the maximum number of iterations, whenever the TCC is used. In the preferred embodiment loopref[n] is implemented as conditional branch operation, which is used from implementing the reference loop.

loopset [n]: Sets the (LOOPMAX) register with a value. The value might be an immediate or any data from a register of the Register File.

loopclr [n]: Clears the (LOOPMAX) register.

loopprpt [n]: The recorded amount of iterations are repeated, the TCC starts at 0 and counts up to LOOPMAX. When LOOPMAX is reached, the iterations are stopped. A signal is generated indicating the termination of the loop, based on which the next instruction is issued by the Instruction Fetcher.

loopjmp [n]<adr>: Jumps to the specified address or increments the program pointer by one to the following instruction. If LOOPMAX of TCC [n] is reached or the loop terminated flag is set, the loop terminates and the jump is not executed. Loopjmp may stop the loop iterations, the effects of looprpt are disabled. If LOOPMAX is not reached, the instruction branches to the address <adr>. The command is may be used to implement outer loops.

looptrm [n]: Sets the loop terminated flag of TCC [n]. If the flag is set the TCC will indicate termination when checked.

An exemplary implementation of an exemplary loop is shown below. It is used to explain some of the loop instructions in more detail.

```
loopstartup:
LOOPCLR #1| LOOPCLR #2
MOV r11, 255
CYCLE
loopheader:
ADD r10, r10, 0x1
CMP r0, r10
NZ SUB r11, r11, 0x1|EQ LOOPTRM #2
NZ LOOPREF #1, loopheader|EQ LOOPRPT #1
CYCLE
loop:
multi-cycle kernel 1
CYCLE
multi-cycle kernel 2
CYCLE
. . .
multi-cycle kernel n
CYCLE
looptail:
LOOPJMP #2, loopstartup
exit:
. . .
```

Loopstartup: clears the loop termination counters #1 and #2. The register r11 is loaded with the integer value 255 according to the maximum depth of the FIFO Data Registers (FDR).

A control variable is implemented using register r10. The maximum value is preset in register r0 and r10 linearly increments in the interval from 0 to the value in r0.

Loopheader: increments r10 and compares it with r0. If the register values are Not Zero (NZ) (the compare opcode CMP set the Zero flag if the two operands are equal) the loop processing continues (stop criterion is not met) and r11 is decremented. If the values are equal, the loop is terminated and the loop_terminated flag of TCC #2 is set.

The decrementing counter in register r11 defines the LSI (Loop Segment Iteration) of the inner loop, which is limited to the size of the FIFO Data Register (FDR) in this example.

Again Not Zero is checked. In case the conditional SUB opcode was enabled, the zero flag has been set by SUB, else it has been forwarded from CMP.

If the Zero flag is still not set, neither r0 is equal r10 nor r11 is 0: (r0≠r10) AND (r11≠0). The stop criterion is not met yet. LOOPREF branches to loopheader:, which is processed again.

If either r0 is equal r10 or r11 is 0 ((r0=r10) OR (r11=0)) the stop criterion is met and the loop terminates. If r10 is equal r11 the outer loop stop criterion is met and LOOPTRM sets the loop terminated flag of TCC #2. LOOPREF exists to loop: and LOOPRPT starts the replaying the loop iterations recorded by LOOPREF.

loop: comprises n multi-cycle kernels. Each kernel is executed for as many iterations as have been recorded by LOOPREF in loopheader:. Although LOOPRPT is only used in loopheader: and not repeated within the multi-cycle kernel, TCC #1 will be used to compute the stop criterion for each of the multi-cycle kernels. After one multi-cycle kernel has been terminated, TCC #1 restarts counting from 0 to the recorded LOOP_MAX for the next multi-cycle kernel. After LOOPRPT has been set, it remains valid and in use for all subsequent multi-cycle kernels until it is cleared, stopped by LOOPJMP and/or another LOOPRPT opcode uses another TCC.

looptail: checks the loop terminated flag of TCC #2. In case the flag is not set, processing continues with loopheader:, else with the next subsequent instructions (exit:).

As already demonstrated, there may be more than one termination-control-counters (TCC) implemented. Preferred are 8 for typical processors and 4 for cost sensitive devices. However, more than 8 might be implemented in high end processors. Preferably a plurality of termination-control-counters (TCCs) are implemented, such supporting multiple or nested loops. Assuming n TCCs are implemented in an embodiment of a ZZYX processor, [n] references to the termination-control-counter (TCC) controlled by the exemplary instructions above.

Another alternative to control subsequent inner loops by applying FIFO level checks instead of loop termination-control-counter(s) (TCC(s)) is shown below. The major benefit of this kind of transformation is the use of the implicit FIFO level flags, and by such not requiring forwarding of the variable ii from one inner loop to the next.

```
i = 0
while (i < 250) {
    for (ii=0; ii<16; ii++) {
        if ++i = 250 {break}
        do part1 of anything and output to FIFO[0]}
    while (input_from_FIFO[0] != empty) {
        do part2 of anything and output to FIFO[1]}}
    while (input_from_FIFO[1] != empty) {
        do part3 of anything and output}
}
```

The control variables ii have to be explicitly calculated in each of the inner loops. However as the most typical inner loop control will be based either on a fixed amount of iterations (for (ii=0; ii<exit; ii++)) or on checking the FIFO conditions (while (input FIFO !=empty) or while (output_FIFO !=full) or combined while ((input_FIFO !=empty) && (output_FIFO !=full))) special hardware is provided by the ZZYX processor to handle those cases without wasting precious ALU resources:

Both alternatives, controlling the loop exit by i) the level flags of one or more FIFO(s) (e.g. exit if FIFO is empty); and ii) one or more loop termination-control-counter(s) (TCC(s)) set by the loop control and counting the number of execution steps in accordance with the stop criterion are preferably implemented and/or supported by the ZZYX core. Depending on the software and/or application one of the alternatives or both are used.

The termination-control-counter (TCC) may be construed by using ALUs of the ALU-Block. However, preferably the termination-control-counter (TCC) is implemented dedicatedly in hardware and controlled by instructions to save ALU resources. The termination-control-counter (TCC) is started and preset by an instruction within the loop control code and counts during the execution of each of the multi cycle kernels. If the termination-control-counter (TCC) reaches the stop criterion the execution of the related multi cycle kernel is stopped and the execution of the next multi cycle kernel starts.

The termination-control-counter (TCC) may be disabled by or after the last of the multi cycle kernels or implicitly by the first non-dataflow command after the loop which is executed as a typical processor instruction (e.g. RISC or VLIW) for only one single cycle.

Preferably a plurality of Termination-Control-Counters are implemented for supporting a plurality of loops and/or complex loops and/or nested loops.

Summarizing one or more loop termination-control-counter(s) (TCC(s)) may operate as follows in one implementation:

i. The termination-control-counter (TCC) value might be used to generate the stage_terminated signal, either exclusively or in conjunction with other status signals, such as FIFO full or FIFO empty, Address Generator or DMA signals such as end of transfer or end of block;
ii. the termination-control-counter (TCC) operation is defined by the loop control code;
iii. the termination-control-counter (TCC) is enabled for each subsequent multi cycle kernel operating in Matrix Mode; and controls their termination;
iv. all subsequent multi cycle kernel operating in Matrix Mode are controlled by the previously set termination-control-counter (TCC) definition;
v the termination-control-counter (TCC) does not influence or terminate instructions not executed in Matrix Mode, e.g. it has no influence on VLIW operations;
vi. the termination-control-counter (TCC) definition could be reset by the first subsequent non-Matrix-Mode operation, such as VLIW, however preferably the termination-control-counter (TCC) is just disabled for such operations but holds its definitions for any subsequent Matrix-Mode operation, until the termination-control-counter (TCC) is explicitly re-defined or reset by software.

In another implementation loop termination-control-counter(s) (TCC(s)) may operate as follows:

i The loopref instruction operates as the previously described loop instruction but additionally records the number of loop iterations.
ii. Subsequently the looprpt instruction repeats exactly the number of recorded iterations. Looprpt may be used in Matrix Mode or in VLIW Mode, which allows for an efficient implementation of loops also of sequential operations in processor modes and processors according to the state of the art.

In addition to termination-control-counters (TCCs) a termination instruction may be implemented. The instruction terminates the execution of a loop, when a certain condition is met. Usually it is implemented by a compare operation and/or evaluation of the status flags of the processor and/or the ALUs in the ALU-Block.

Compilation Code for the ZZYX Processor

This compilation approach describes the compilation of a sequential program to a ZZYX processor. The goal of the presented sequence of transformations is the parallel, pipelined execution of innermost loops in the Matrix mode while the remaining, rather irregular program code is executed in the Superscalar/VLIW mode. (Standard compilation methods apply for the VLIW mode. They are therefore not presented here.)

Preprocessing and Conditions

Known loop transformations (loop unrolling, fusion, exchange etc.) can be applied beforehand to get suitable innermost loops. Hence in the following we only consider innermost FOR-loops of the form (1) for (i=0; i<N; i++)
    F(i);

where N is the loop iteration count and F(i) is the loop body. (The syntax of the C programming language is used as an example for all imperative programming languages.) A generalization for other loop types will be presented in Section 5 below.

As a prerequisite for this approach, it must be possible to generate a DFG (data-flow graph) of F(i), i.e. no MAY alias must exist in the loop body.

Loop Transformations

First, the known strip-mining loop transformation is applied to loop (1), i.e. the loop is split into smaller loops of a fixed (maximum) iteration count ssize, resulting in loop nest (2). The peculiarity of this transformation is that we use the length of the register FIFOs in the ZZYX processor for the parameter ssize.

(2) for (i=0; i<N; i+=ssize)
    for (j=i; j<min(N, i+ssize); j++)
        F(j);

Note that this transformation is always applicable since the order of the loop iterations remains unchanged.

Next, the known loop distribution transformation is applied to the new innermost loop (induction variable j). Thereby the DFG of F(i) is distributed into smaller DFGs F1, F2, F3, . . . , Fk in such a special way that the resulting DFGs F1, F2 etc. can be mapped to a single ALU-Block (AB) of the ZZYX processor. (See Section 4 below for details of the mapping.) The distribution can be performed on the graphical representation of the DFG or on the program code. (In the latter case, the loop body F(j) equals {F1(j); F2(j); . . . Fk(j)}. However, the distribution of the DFG is more flexible since it may also cut a bigger expression of a single instruction in F(j), thereby generating auxiliary variables for the partial expressions.) In any case, the dependences of the original loop must be preserved, i.e. no DFG feedback loops are allowed across loop distributions. Therefore this transformation is not always applicable or may not result in mappable distributions.

Loop distribution leads to the following loop nest:

(3)    for (i=0; i<N; i+=ssize) {
           for (j=i; j<min(N, i+ssize); j++) // 1st pipel. run
               F1(j);
           for (j=i; j<min(N, i+ssize); j++) // 2nd pipel. run
               F2(j);
           ...
           for (j=i; j<min(N, i+ssize); j++) // kth pipel. run
               Fk(j);
       }

The new inner loops (with loop bodies Fp(j) for p=1 . . . k) can be mapped to a single ALU-Block and run in Matrix mode (pipelined) without repeated instruction loads.

Note that all DFG edges originating in Fp and ending in Fq for p<q represent scalar variables (or scalar auxiliary variables) which must be vectorized, i.e. replaced by one-dimensional arrays of size ssize. E.g., in loop nest (2), a variable v is defined (written) in F1 and immediately used (read) in F3. In loop nest (3), v is replaced by v[ssize]. In F1, each inner loop iteration defines a value v[j]. Only after the loops of F1 (and F2) have executed, F3 reads v[j] from the vectorized variable. The values are always accessed in linear order. However, in a ZZYX implementation, the variables need not be vectorized explicitly, and no vector access needs to be programmed. The values are stored in the register FIFOs of length ssize and are automatically accessed in the correct (linear) order.

Finally, loop nest (3) is normalized as follows:

```
(4)     for (i=0; i<ceil(N/ssize); i++) {
            for (j'=0; j'<min(ssize, N-i*ssize); j'++) {
                j=i*ssize+j';
                F1(j);
            }
            ...
            for (j'=0; j'<min(ssize, N-i*ssize); j'++) {
                j=i*ssize+j';
                Fk(j) ;
            }
        }
```

Now all loops start with the induction variable value zero and have an increment of one. Therefore they can easily be mapped to the ALU-Blocks as detailed below.

Note that the entire transformation (strip-mining and distribution) is not required if the entire loop body can be mapped to a single ALU-Block. In this case, the register FIFOs are not used and the restriction to strip size ssize is not necessary.

Execution on and Mapping to ALU-Blocks

For each pipeline run (i.e. innermost loop with induction variable j or j'), an ALU-Block is configured once and starts executing immediately until the last iteration is finished. The finishing condition is j<min(N, i+ssize) or j'<min(ssize, N−i*ssize) for loop nest (3) or (4), respectively.

Scalar inputs (e.g. initial values of accumulators) must be set before the pipeline execution starts. The same applies to constant inputs unless they are part of the opcode. Scalar results (e.g. accumulator outputs) must be stored to registers or memories after pipeline execution has finished.

For each loop distribution or partial loop body Fp, its DFG(Fp) is mapped to an ALU-Block (AB) in top-down direction. Refer to FIG. A for an example of a DFG consisting of two distributions F1 and F2 which are mapped to two AB pipeline configurations. The graph edges cut by the distribution (i.e. the direct connections from F1 to F2) transfer a value for each loop iteration. They are mapped to register FIFOs. For long top-down connections, registers (represented by black squares in FIG. A) are automatically inserted in each row, thereby guaranteeing balanced pipelines.

An optimization of this mapping method for "slim" DFGs (with small width and large length/depth of the DFG) is the following wrap-around mapping. Instead of mapping operators to the next AB, it continues mapping at row one of the same AB. Note that flushing the operator pipeline requires more cycles if this mapping method was used. The configuration of the next pipeline must be delayed accordingly.

FIG. B shows a wrap-around mapping of the DFG from FIG. A. F1 is mapped as in FIG. A, but F2 is wrapped around. Thereby the entire DFG can be mapped to one AB and hence the loop transformations are not required. The edges cut between F1 and F2 are directly connected (through register FIFOs or normal registers). In the extreme case, linear DFGs like FIR-filters can be mapped with several wrap-arounds, cf. FIG. C.

Extension to Other Loop Types

The method presented so far is restricted to FOR-loops. Now consider the following WHILE-loop:

(5) while (cond) do
    F( );

By adding a new induction variable j', a WHILE-loop variant of strip-mining can be applied:

```
(6)     while (cond) do {
            j'=0;
            while (j'<ssize && cond) do {
                j'++;
                F( );
            }
        }
```

Now, a variant of loop distribution can be applied to the inner WHILE-loop:

```
(7)     while (cond) do {
            j'=0;
            while (j'<ssize && cond) do {
                j'++;
                F1( );
            }
            ssize = j'; // reduce ssize if cond is false
            for (j'=0; j'<ssize; j'++)
                F2( );
            ...
            for (j'=0; j'<ssize; j '++)
                Fk( );
        }
```

Note the following:
cond must be computed in the first distribution. If it is computed at the end of F, a big feedback loop exists and F cannot be distributed.
Subsequent distributions (pipeline runs) must not execute more iterations than allowed. Therefore ssize must be reduced to the number of allowed pipeline runs for later pipeline runs if cond is set to false during the first pipeline run.

Finally, DO-WHILE-LOOPS can be transformed to WHILE-loops and transformed as above. The DO-WHILE-loop
(8) do F( );
    while (cond);
is transformed to
(9) F( );
    while (cond)
      do F( );

Removing Simple Loop-Carried Dependences

Note that the non-cyclic loop-carried dependence from omega to alpha as illustrated in FIG. 10 can be removed by a well-known preprocessing step as follows. The original loop is:

```
(10)    for (i=0; i<N; i++) {
            alpha; beta; ...; omega;
        }
```

The first instance of alpha is removed from the loop body and moved to a loop prelude. Then, the loop iteration count is decreased by one and alpha of loop i is included in loop i−1 (for i=1 . . . N−1). Finally, the remainder of the last original loop iteration is added as a postlude:

```
(11)        alpha;
            for (i=0; i<N-1; i++) {
               beta; omega; alpha;
            }
``` beta; . . . ; omega;

Now the dependence from omega to alpha occurs within the same loop iteration.

Handling Initiation Intervals Larger than One

The method presented above is restricted to an initiation interval II=1, i.e. one loop iteration starts every cycle. However, II>1 is required in the following cases:

A feedback cycle from loop-carried dependences involving more than one operator exists. (Note: one-operator-cycles can be handled by local register feedback.)

The available load/store-units or AGs or DMA channels are not sufficient to service all memory requests of loop body Fp (even after memory access optimizations).

In these situations, the following solutions are possible:

Applies only to cyclic feedback loops:

Do nothing and execute each operator in the pipeline only every II-th cycle.

Applies to both situations:

II different instructions are folded on every hardware operator, the instructions are changed every cycle, and local registers are used for intermediate results. This results in better area utilization.

Combination of the above solutions:

In order to handle missing load/store units without implementing a full multi-context array, a solution is to only fold II memory accesses on the given load/store units (for an implementation-dependent maximal II), but not to fold different operators on the ALUs. This effectively results in more load/store units with lower throughput.

Conclusion and Benefits

In the text above, reference has been made to the data flow direction and it has been stated that in the ZZYX architecture disclosed herein, data flows preferably in one direction only.

In this respect, the following is noted:

As described, the

ZZYX architecture will comprise

ALU-Blocks consisting of a number of—preferably pipelined—ALU stages (also termed as—preferably pipelined—ALU rows) each ALU stage consisting of a number of ALUs, each ALU comprising an ALU core (also terms embedded ALU) and additional circuitry.

It should be noted that in some instances in the present disclosure, deviations in the terms as found in the hierarchy shown above might occur.

Now, as will be obvious from the disclosure above, in a preferred embodiment, within a given ALU-Block, ALUs within one ALU stage may receive as operand input the data output from ALUs of ALU stage upstream thereof as well as from the register file of the ALU-Blocks upstream of the first ALU stage.

In an embodiment preferred in view of compiler technology, each ALU of a given stage will be capable of receiving the output from ANY ALU of ANY alu stage above.

However, from a hardware perspective, it might be preferred if a given ALU in a given ALU stage will be capable of receiving the output only from selected ALUs from ALU stages upstream. E.g., in an ALU-Block comprising 4 stages of ALUs with each stage comprising 4 ALUs (that is, a 4×4 ALU-Block) it would be possible to connect the outer left ALU in stage 2 to the register file of the ALU-Block and all ALUs of stage one except for the outer right ALU of stage 1. Furthermore, the outer right ALU in stage 2 would be connected to the register file of the ALU-Block and all ALUs of stage one except for the outer left ALU of stage 1. This reduces the number of interconnections, multiplexer stages, the delay occurring and so forth. In the same way, the ALUs in stages 3 and 4 could be connected to a reduced number of ALUs in stages 1 and 2 or 1, 2 and 3 respectively.

Here again, it becomes obvious that although in most instances in the text above, reference is made to a connection of one ALU to all ALUs of all stages above, such disclosure may not be necessarily verbally construed as to limit the scope of the disclosure and invention; instead, such terminology has only been used so as to allow for easier understanding and also in view of the fact that allowing for operand input from all ALUs of all ALU stages above within a given ALU-Block simplifies the compiler and software tools; thus, such reference simply indicates that a best mode of invention has been disclosed.

Regardless of whether or not each ALU in a given ALU stage may receive operands from each and every ALU in any stage upstream or will be capable of receiving operands only from selected ALUs, the data is defined to flow in one direction. Now, it has been stated that this is preferred to have data flow in one direction. However, it should be noted that certain algorithms require operations such as accumulations of terms A×B+C or even (A×(B+D))+C (where x indicates a multiplication and A,B,C and D are operands). Now, in order to effect such accumulations, it might be useful to provide for a feedback of the result of (A×(B+D))+C. In cases where the data flow direction is strictly maintained, the only "reverse" data flow will occur back into the register file of the ALU-Block. Data processsing could be improved in such cases by providing an intra-ALU-Block feedback path from ALUs in downstream stages to ALUs in upstream stages. Here, by feeding data back not to each and every stage upstream of a given stage but only to e.g. the stage directly upstream and/or the stage upstream of the stage directly upstream will suffice to give a significantly improved performance for most algorithms that profit from feedback at all. Therefore, it is preferred to have an intra-ALU-Block feedback path to stages directly upstream or the stage the next upstream but one. Again, it is not necessary to provide such feedback from all ALUs within a stage to all ALUs within respective upstream stages to which data is fed back. It is highly preferred if this feeding back of data is the only deviation of the architecture disclosed from the one-directionality of data streams streaming downstream within a given ALU-Block.

With respect to the number of ALU stages and the number of ALUs within a given stage, it is obvious that the advantages of the present invention will be most obvious if the ALU-Block has more than two stages and more than two ALUs per stage.

Here, any number of stages and ALUs>3 could be implemented. However, given standard algorithms and the hardware complexity increasing with both the number of stages and with the number of ALUs within a stage, a very highly preferred size of the ALU-Block is 4×4. This is sufficient to execute the most relevant algorithms in a highly efficient manner and will not result in overly complex hardware, even if—as preferred—all ALUs in a given stage are connected to all ALUs of all upstream stages and even if in that case—as further preferred—all stages are—preferrably selectably-pipelined and/or if feedback paths within the ALUs are provided; as indicated above, it is highly preferred if this feeding back of data is the only deviation of the architecture disclosed from the one-directionality of data streams streaming downstream within a given ALU-Block and this holds in particular for the preferred embodiment of a 4stageX4Alu—ALU-Block arrangement and with pipelining of all stages.

It should be noted however, that in cases where not all ALUs within a given ALUstage of an ALU-Block are connected to all ALUs of all ALUstages of the given ALU-Block and/or where not all stages are pipelined, it might be possible to increase the size of the ALU-Block to e.g. 8×8 without overly increasing the hardware complexity of the architecture.

It is not necessary to provide for pipelining between all stages and/or to provide for unconditional pipelining and/or to provide for pipelining at all. It should be noted that some algorithms such as the CABAC algorithms executed in a low clocked, asynchronous operation mode will have a much higher performance and data throughput than executed in a synchronous, pipelined arrangement. Therefore, it is not absolutely necessary to provide for pipelining at all. Furthermore, the possibility exists to use pipelining e.g. only between every other stage or between every third or fourth stage and so forth. E.g. the ALU-Block could be built to look like stage 1-pipeline-stage 2-pipeline-stage 3-pipeline-stage 4-pipeline-stage 5 pipeline-stage 6-pipeline-stage 7-pipeline-stage 8 or be built e.g. like stage 1-stage 2-pipeline-stage 3-stage 4-pipeline-stage 5-stage 6-pipeline stage 7-stage 8.

Also, the arrangement of pipelines need not be regular, e.g.

stage 1-pipeline-stage 2-pipeline-stage 3-pipeline-stage 4-pipeline-stage 5-stage 6-pipeline-stage 7-pipeline-stage 8

However, the preferred arrangement will strongly depend on algorithms of particular importance.

Given this, it might be possible to e.g. built an 8×8 ALU-Block consisting of a quadruple of 4×4 ALUs where not all ALUs are connected to all ALus of stages upstream; thus there might be provided as an 8×8 ALU-Block a left upper 4×4 Alusubblock
    having 4 stages, each stage having 4 ALUs, the stages being e.g. arranged as
        stage 1-
        stage 2
        -pipeline-
        stage 3
        stage 4
a right upper 4×4 ALusubblock
    having 4 stages, each stage having 4 ALUs, the stages being e.g. arranged as
        stage 1-
        stage 2
        -pipeline-
        stage 3
        stage 4
a left lower ALU-Block
    having 4 stages, each stage having 4 ALUs, the stages being e.g. arranged as
        stage 1-
        stage 2
        -pipeline-
        stage 3
        stage 4
a right lower ALU-Block
    having 4 stages, each stage having 4 ALUs, the stages being e.g. arranged as
        stage 1
        stage 2
        -pipeline-
        stage 3
        stage 4

Then, an ALU within an upper one of the 4×4 Alu subblock is connected to all ALUs in upstream stages within the same ALU-Subblock whereas no connections to ALUs of the other upper Alusubblock will be provided.

Then, the ALUs of both first stages of the lower 4×4 Alusubblock will be connectable to all ALUs of the upper Alusubblocks, independent of whether the ALU in the lower subblock is e.g. placed in the right lower subblock and the ALU it is to be connected to is in the upper left subblock or in the right subblock. All ALus in subsequent stages of the lower subblock will only be connectable to ALus in upstream stages of the same side lower subblock.

Again, it should be noted that the 8×8 embodiment disclosed above is only an example, although this example has been described because it is a highly preferred one in view of the processing performance obtainable with a given hardware silicon area.

In more general terms, it will be obvious that advantages might be obtained by splitting an ALU-Blocks into first level subblocks and by splitting up such first level subblocks further into second level subblocks, and, if necessary, by splitting an n-th level subblock into n+1level subblocks and by arranging interconnections such that there are only inter-subblock ALU connections for stages in any ALU subblock other than the first stage of such an ALU subblock while providing intrasubblock-connections only for ALus in first stages in a given Alusubblock of a given Alu subblock level.

As obvious, "first stage" will refer to "first stage in the (main) direction of data flow, btw. Accordingly, what is suggested in more general terms is a hierarchic arrangement of AluSubblocks in an ALU. Programming such hierarchic arrangements will not differ from programming of a non hierarchic arrangement. Simply by restricting the register allocations in the compiler, the necessary adaptions can be made.

It should also be noted that in a preferred embodiment, it is possible to bypass all or at least some of the pipeline stages. This allows using an ALU-Block in either synchronous mode and/or in asynchronous mode. Such selectable pipelineability can be implemented by use of multiplexers and/or latches.

Whereas different possbilities of implementing the architecture have been disclosed, it should be noted that despite the vast possibilities offered such as comprising pipelines or not or such as interconnecting a given ALU in a downstream stage with either all ALUs in stages upstream thereof or with only some of the ALus in some of the stages upstream thereof, the topology once selected and implemented in hardware will not be subject to changes but will be permanent. This is an important feature of a ZZYX device. Although considered per se as inventive and although considered advantageous in connection with other features such as a pipelined access to the register file for downstream data stages, it is not an indispensable feature necessary to obtain all or even a single advantage of e.g. pipelined access to the register file for downstream data stages, nanocarbontube cooling of die stacks or other features of the present disclosure considered inventive per se.

Permanently implemented topology is in contrast to busses where a limited number of interconnections are provided for selectively connecting an output of one element to an input of another element and where the connection from a first to a second element can be hampered by the use of the very bus elements needed for the connection of said first to said second element e.g. for connecting a third element to a fourth element, where the group of first and second elements is disjunct from the group of third and fourth elements.

A permanently implemented topology can be construed to mean that in case an ALU can receive as an input operand data from one given particular data source, a connection line from said data source to said ALU input will be present as hardwired connection and the only step necessary to select such hardwired connection is e.g. selection of an operand multiplexer input. A hardwired connection is considered to be still present in cases e.g. where a register stage is provided in the line for pipelining.

A simple embodiment of the invention which may not have best performance but allows a fast understanding of features relevant or advantageous will be explained with respect to FIG. 27.

Here, a 3×3 ALU-Block is shown. The 3×3 ALU-Block shown will receive operand data in the register file RegFile in the upper left corner.

The ALU-Block has three stages. The first stage is S0, the second stage is S1, the third stage is S2.

The three ALUs in the first stage S0 are designated as A1S0, A2S0 and A3S0.

The three ALUs in the second stage S1 are designated as A1S1, A2S1 and A3S1.

The three ALUs in the second stage S2 are designated as A1S2, A2S1.

From the RegFile register, operands may be transferred to the three ALUs AOSO, A1S0 and A2S0 of first stage S0. Furthermore, the operands in the input operand register file RegFile will be automatically transferred to the REGRFS0. At the given time of clock cycle t, the REGRFS0 will contain the content of the input operand register file RegFile at clock cycle time t−1, that is one clock cycle earlier. From REGRFS0, operands may be transferred to the three ALUs AOS1, A1S1 and A2S1 of second stage S1.

The data in REGRFS0 will be automatically transferred to the REGRFS1 Regfile. At a given time clock cycle t, the REGRFS1 will contain the content of the input operand register file RegFile at clock cycle time t−2, that is two clock cycles earlier. From REGRFS1 Regfile, operands may be transferred to the three ALUs AOS2, A1S2 and A2S2 of second stage S2.

A result pipeline register bank for output RO0 is provided for the result output of ALUs of first stage S0.

A result pipeline register bank for output RO1 is provided for the result output of ALUs of second stage S1.

There is no result register bank for output of the last stage S2.

The number of registers constituting the result pipeline register bank for output RO0 corresponds to the number of registers in the RegFile; however, in a practical implementation, there will be more registers in each pipeline register bank for output than registers in the RegFile, so that data can be more easily outputted to other data sinks such as I/O devices and so forth. The same holds for the number of registers in result pipeline register bank for output RO1.

Now, for each register in result pipeline register bank for output RO0 there is provided a multipexer; each of these multiplexers has three inputs; the first input of each multiplier is connected to the output of the first ALU in the stage, the second input of each multiplier is connected to the output of the second Alu in the stage and the third input is connected to the output of the third ALu in the stage.

Thus, the output of Alu A0S0 is fed to a pipelineregister REG R0S0 and to the first input of multiplexers of result pipeline register bank for output RO0.

The output of Alu ALSO is fed to pipelineregister REG R1S0 and to the second input of multiplexers of result pipeline register bank for output RO0.

The output of Alu A2S0 is fed to a pipelineregister REG R0S0 and to the third input of multiplexers of result pipeline register bank for output RO0.

In the second stage, the number of registers in result pipeline register bank for output RO1 also corresponds to the number of registers in the RegFile register; again, in a practical implementation, there will be more registers in each result pipeline register bank for output than registers in the RegFile register, so that data can be more easily outputted to other data sinks such as I/O devices and so forth.

Again, for each register in result pipeline register bank for output RO1 there is provided an input multipexer; now, however, each of these multiplexers has not only three inputs but one more input, the fourth input being fixedly connected to the corresponding register in the result pipeline register for output of the upstream stage. Thus, the first input of each multiplier is connected to the output of the first ALU in the stage, the second input of each multiplier is connected to the output of the second Alu in the stage and the third input is connected to the output of the third ALu in the stage, while every fourth input of a multiplexer of result pipeline register bank for output RO1 is connected to the corresponding register of result pipeline register bank for output of the upstream stage, in the embodiment described RO0.

Thus, the output of Alu A0S1 in the second stage is fed to a pipelineregister REG R0S1 and to the first input of multiplexers of result register bank for output R01.

The output of Alu A1S1 in the second stage is fed to pipelineregister REG R1S0 and to the second input of multiplexers of result register bank for output R01.

The output of Alu A2S1 in the second stage S1 is fed to a pipelineregister R0S0 and to the third input of all multiplexers of result register bank for output R01.

From the pipelineregister Reg R0S0, data can be transferred to any ALU of stage 1. Thus, R0S0 can transfer data to A0S1, A1S1 and A2S1.

The same holds for the other pipelineregisters in that stage, R1So and R2S0. Thus, RISC) can transfer data to A0S1, A1S1 and A2S1 and R2S0 can transfer data to A0S1, A1S1 and A2S1.

The ability to transfer the data is established by respectively providing a dedicated hardwire connection.

Then, in order to allow that the ALUs in the third stage 2 do not only have access to results produced in the stage directly upstream thereof, but also to the results from first stage S0, pipeline registers R0S0, RISC R2S0 of first stage 0 are not only fed to A0S1, A1S1, A2S1 but also to a further register REG RAS1. The output of REG RAS1 can be fed to ALUs of the third stage, A0S2, A1S2, A2S2.

Accordingly, the first ALU of the second stage A1S1 may receive input data from R0S0, RISC or R2S0. Furthermore, the first ALU A1S1 of the second stage might also receive data from REGRFS@t−1. In order to enable receipt of data, as will be obvious from the disclosure above, a hardwired connection is provided from R0S0, RISC or R2S0 and from REGRFS@t−1 to respective inputs of ALU A1S1 with a possibility of selecting the respective input at ALU A1S1 by use of multiplexers.

IT will now already be obvious that the second ALU of second stage A2S1 will also be able to receive input data from R0S0, RISC or R2S0. Furthermore, the ALU A2S1 of the second stage might also receive data from REGRFS@t−1. The same will hold for the third ALU of the second stage.

The first ALU of third stage, A1S2 will receive data input from Reg RFS1 holding the RegFile @t−2 (two clock cycles earlier), from each of the pipeline registers ROS1, R1S1 and R2S2 as well as the input from REG RAS1.

The output of ALUs of the third stage, A0S2, A1S2, A2S2 will be distributed to inputs of a number of multiplexers. The number of multiplexers provided corresponds to the number of registers in the RegFile register; again, in a practical implementation, there will be more multiplexers than registers in the RegFile register, so that data can be more easily outputted to other data sinks such as I/O devices and so forth.

Each multiplexer will have four inputs, one input for each of the three ALUs and one input from the result register bank for output of the stage immediately upstream thereof.

From the number of multiplexers, a feedback datapath is provided back to respective registers of the RegFile and data can also be outputted of the ALU-Block.

It should be noted that none of the interconnections need to be configured in a buslike manner. All interconnections described are hardwired as explicitly mentioned in some cases or obvious. A given input will be selectable by corresponding use of multiplexers that in some cases are even shown explicitly.

From the above, what should be emphasized in particular as being important per se and/or in combination is the following:

The interconnections have a hardwired topology which cannot and need not be changed by configuration. This allows for very simply translation of high level language code such as C++ or the like into assembler code. No routing tools are required, the operand selection in this hardwired topology can be carried out by providing an operand selection field in the opcode so as to select an operand at execution time via a multiplexer. Since this is done traditionally in microprocessors, the basics of a software development chain need not be altered. Also, this is highly area-efficient compared to a configurable bus network in a dynamically runtime reconfigurable processor.

The Regfile content is transferred via pipelined registers (RegRFS0, RegRFS1) in a manner that allows subsequent (downstream) stages access to this content without forcing a programmer to consider timing behaviour.

FIG. 27a closely corresponds to FIG. 27. However, there is one important difference that allows for more energy efficient operation in the superscalar or VLIW mode.

In the VLIW or superscalar mode, only the first stage ALUs will be used for data processing. In the embodiment of FIG. 27, each result produced in the first stage S0 must be transferred via result register bank outputs RO0 and result register bank outputs RO1 back to the RegFile. This creates a large latency and is not energy efficient. In the embodiment shown in FIG. 27a, a bypass multiplexer is provided in the feedback path leading from the last stage number of multiplexers back to the RegFile. This bypass multiplexer allows for the selection of either the data from the last stage number of multiplexers or from the number of multiplexers in front of the result pipeline register bank. This avoids the latency and the energy consumption caused by having to use the additional, latency-causing circuitry.

It will be obvious that any part of the ALU-Block not used in superscalar or VLIW mode could be set to a low power consumption mode such as a sleep mode where power supply voltage is reduced and/or clock propagation to certain parts is disabled. This is possible not only in case of VLIW mode but in any case where certain parts of the ALU-Block are not needed.

The overall benefits of the ZZYX Architecture are many fold: High density of the ALU-Block compared to Reconfigurable Processors due to the reduction of the complex data and control network to an highly efficient directed data path. The preferred dataflow direction limits bus overhead and, together with a tight synchronization between the processing in the ALU-Block and the Instruction Issue, optimizes Instruction Issue to zero overhead, compared to significant reconfiguration overhead of Reconfigurable Processors. Straight forward compilation, without requiring of Place and Route passes. Software written for ZZYX processors is scaleable on object code level, while configurations of Reconfigurable Processors do not scale but require recompilation or even new development of the algorithm; and Microprocessors require the complex and costly splitting and handling of threads.

The ZZYX processor comprises an n by m (n*m) array of ALUs, which
1. is capable of repeating once issued instructions for a plurality of clock and/or execution cycles
2. is capable of keeping issued instructions unchanged but operating for a plurality of clock and/or execution cycles
3. has a fixed data, non configurable data path
4. data path has one preferred data flow direction
5. data path has one preferred data flow direction, supporting data feedbacks in the opposite direction for implementing small and efficient loops has a VLIW mode, in which ALUs are directly connected to the register set and the computed results are directly returned to the register set
6. has a VLIW mode, in which exactly one row of ALUs is operating
   a. and other ALUs of the remaining ((n−1)*m) matrix are bypassed
   b. and other ALUs of the remaining ((n−1)*m) matrix are disabled
   c. and the clock supply for each of the pipeline stages may be gated
   d. and the clock supply for the ALUs of the remaining ((n−1)*m) matrix is disabled
   e. and the power supply for the ALUs of the remaining ((n−1)*m) matrix is disabled The Register File comprises a plurality of data registers. At least some of the registers are FIFOs for storing data vectors: The FIFO depth is selectable separately for each of these registers.

The FIFO registers work like normal processor registers if the depth is set to 1.

The processor comprises a plurality of load/store units all may work independently and in parallel.

The load/store units are connected to the data path like processor registers and are addressable as registers by the opcode.

The load/store units get data from and/or write data to the data path via FIFOs.

The load/store units may have related local memories, dedicated to the specific load/store unit.

The processor may comprise an instruction dispatcher issuing instructions sequentially to rows of ALUs of an ALU-Block.

The instruction dispatcher is reset to the first row of ALUs by an-control token with the instructions.

The instruction dispatcher of a processor core may dispatch instructions for one or a plurality of other processor cores.

The processor may be manufactured using a stack of dies, at least some dies comprising memories. The dies are preferably interconnected by wide bus systems. The interconnection is preferably using through-silicon-vias (TSV).

The die stack may be cooled by carbon nanotubes chimneys or thermosiphons, whose capillary tubes go through the whole die stack.

The processor may support power saving measures, such as switching of the power supply to some elements. The control of the power measurements may base on prefetched instructions and/or an instruction lookahead. The elements are surrounded by isolators for outputs and maybe for the inputs do avoid the distribution of faulty signals. The elements may comprise power islands, which remain supplied even when the power supply of other components of the element is switched off. Selectively the power supply may be switched of or reduced to a lower voltage only high enough to ensure the correctness of stored data values.

Pipelining effects may be hidden from the programmer for ease of programming, as the register file content is pipelined along the datapath strictly in sync with data processing.

The invention claimed is:

1. A microprocessor comprising:
   an arrangement of a plurality of data processing units;
   a plurality of data load units operative to load data from data memory;
   an instruction fetch unit operative to fetch instructions from instruction memory;
   an instruction decode unit operative to decode the fetched instructions for execution on the microprocessor; and
   an instruction issue unit operative to issue the decoded instructions, in instruction order of source code, to the data processing units,
   one or more of the data processing units operative to process the issued instructions upon arrival, at the one or more data processing units, of operand data of the data via a bus from a data load unit of the plurality of data load units or from a different data processing unit of the plurality of data processing units.

2. The microprocessor of claim 1 wherein the instruction issue unit is operative to issue instructions by linearly advancing through a two-dimensional array of the plurality of data processing units in a row-wise and column-wise order in which one or more opcodes are issued to a first row of the two-dimensional array of the plurality of data processing units in successive columns and then one or more successive opcodes are issued to a next row of the two-dimensional array of the plurality of data processing units in the successive columns.

3. The microprocessor of claim 2 wherein the one or more opcodes are issued to the first row of the two-dimensional array of the plurality of data processing units until the first row is completed or a termination is detected, and then the one or more successive opcodes are issued to the next row of the two-dimensional array of the plurality of data processing units.

4. The microprocessor of claim 1 wherein the microprocessor is implemented on a single silicon die.

5. The microprocessor of claim 1 wherein the microprocessor is implemented on a stack of silicon dies.

6. The microprocessor of claim 1 wherein the arrangement of the plurality of data processing units is an array having more than one dimension.

7. A method for processing instructions by a microprocessor, the method comprising:
   loading data from data memory using a plurality of data load units;
   fetching instructions from instruction memory using an instruction fetch unit;
   decoding the fetched instructions for execution on the microprocessor using an instruction decode unit;
   issuing the decoded instructions, in instruction order of source code, to a plurality of data processing units using an instruction issue unit; and
   processing, by one or more of the plurality of data processing units, the issued instructions upon arrival, at the one or more data processing units, of operand data of the data via a bus from a data load unit of the plurality of data load units or from a different data processing unit of the plurality of data processing units.

8. The method of claim 7 wherein issuing the decoded instructions includes linearly advancing through a two-dimensional array of the plurality of data processing units in a row-wise and column-wise order in which one or more opcodes are issued to a first row of the two-dimensional array of the plurality of data processing units in successive columns and then one or more successive opcodes are issued to a next row of the two-dimensional array of the plurality of data processing units in the successive columns.

9. The method of claim 8 wherein the one or more opcodes are issued to the first row of the two-dimensional array of the plurality of data processing units until the first row is completed or a termination is detected, and then the one or more successive opcodes are issued to the next row of the two-dimensional array of the plurality of data processing units.

10. The method of claim 7 wherein the microprocessor is implemented on a single silicon die.

11. The method of claim 7 wherein the microprocessor is implemented on a stack of silicon dies.

12. The method of claim 7 wherein the plurality of data processing units are arranged in an array having more than one dimension.

* * * * *